US011936998B1

(12) United States Patent
Tsai et al.

(10) Patent No.: US 11,936,998 B1
(45) Date of Patent: Mar. 19, 2024

(54) DIGITAL PIXEL SENSOR HAVING EXTENDED DYNAMIC RANGE

(71) Applicant: Meta Platforms Technologies, LLC, Menlo Park, CA (US)

(72) Inventors: Tsung-Hsun Tsai, Redmond, WA (US); Lu Jie, Redmond, WA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/072,840

(22) Filed: Oct. 16, 2020

Related U.S. Application Data

(60) Provisional application No. 62/953,663, filed on Dec. 26, 2019, provisional application No. 62/953,658, (Continued)

(51) Int. Cl.
*H04N 25/59* (2023.01)
*H04N 25/60* (2023.01)

(52) U.S. Cl.
CPC ............ *H04N 25/59* (2023.01); *H04N 25/60* (2023.01)

(58) Field of Classification Search
CPC ...... H04N 5/3559; H04N 5/357; H04N 5/363; H04N 5/3745; H04N 5/3597; H04N 5/378;
(Continued)

(56) References Cited

U.S. PATENT DOCUMENTS 4,596,977 A    6/1986  Bauman et al.
5,053,771 A   10/1991  McDermott
(Continued)

FOREIGN PATENT DOCUMENTS

CN    1490878 A    4/2004
CN    1728397 A    2/2006
(Continued)

OTHER PUBLICATIONS

U.S. Appl. No. 15/719,345, "Final Office Action", dated Apr. 29, 2020, 14 pages.
(Continued)

*Primary Examiner* — Yogesh K Aggarwal
(74) *Attorney, Agent, or Firm* — Kilpatrick Townsend & Stockton LLP

(57) ABSTRACT

In one example, an apparatus comprises: a photodiode configured to generate a charge in response to light within an exposure period, a charge sensing unit configured to accumulate at least a part of the charge as an overflow charge, a quantizer, and a controller configured to: within a first time within the exposure period, control the quantizer to perform a first quantization operation to quantize the overflow charge accumulated at the charge sensing unit to generate a first measurement output; within a second time after the first time, and within the exposure period, control the quantizer to perform a second quantization operation to quantize the overflow charge accumulated at the charge sensing unit to generate a second measurement output; and generate a digital output to represent an intensity of the light based on at least one of the first measurement output or the second measurement output.

15 Claims, 43 Drawing Sheets

Related U.S. Application Data filed on Dec. 26, 2019, provisional application No. 62/953,436, filed on Dec. 24, 2019, provisional application No. 62/916,403, filed on Oct. 17, 2019.

(58) Field of Classification Search
CPC ...... H04N 5/36; H04N 5/03; H01L 27/14603; H01L 27/14612; H01L 27/14636
USPC ........ 348/294–324; 250/208.1; 257/290–292
See application file for complete search history.

(56) References Cited

U.S. PATENT DOCUMENTS

| | | | |
|---|---|---|---|
| 5,650,643 A | 7/1997 | Konuma | |
| 5,844,512 A | 12/1998 | Gorin et al. | |
| 5,963,369 A | 10/1999 | Steinthal et al. | |
| 6,181,822 B1 | 1/2001 | Miller et al. | |
| 6,384,905 B1 | 5/2002 | Barrows | |
| 6,522,395 B1 | 2/2003 | Bamji et al. | |
| 6,529,241 B1 | 3/2003 | Clark | |
| 6,864,817 B1 | 3/2005 | Salvi et al. | |
| 6,963,369 B1 | 11/2005 | Olding | |
| 7,326,903 B2 | 2/2008 | Ackland | |
| 7,362,365 B1 | 4/2008 | Reyneri et al. | |
| 7,659,772 B2 | 2/2010 | Nomura et al. | |
| 7,659,925 B2 | 2/2010 | Krymski | |
| 7,719,589 B2 | 5/2010 | Turchetta et al. | |
| 7,880,779 B2 | 2/2011 | Storm | |
| 7,956,914 B2 | 6/2011 | Xu | |
| 8,134,623 B2 | 3/2012 | Purcell et al. | |
| 8,144,227 B2 | 3/2012 | Kobayashi | |
| 8,369,458 B2 | 2/2013 | Wong et al. | |
| 8,426,793 B1 | 4/2013 | Barrows | |
| 8,754,798 B2 | 6/2014 | Lin | |
| 8,773,562 B1 | 7/2014 | Fan | |
| 8,779,346 B2 | 7/2014 | Fowler et al. | |
| 8,946,610 B2 | 2/2015 | Iwabuchi et al. | |
| 9,001,251 B2 | 4/2015 | Smith et al. | |
| 9,094,629 B2 | 7/2015 | Ishibashi | |
| 9,185,273 B2 | 11/2015 | Beck et al. | |
| 9,274,151 B2 | 3/2016 | Lee et al. | |
| 9,282,264 B2 | 3/2016 | Park et al. | |
| 9,332,200 B1 * | 5/2016 | Hseih et al. | ....... H04N 5/35581 |
| 9,343,497 B2 | 5/2016 | Cho | |
| 9,363,454 B2 | 6/2016 | Ito et al. | |
| 9,478,579 B2 | 10/2016 | Dai et al. | |
| 9,497,396 B2 | 11/2016 | Choi | |
| 9,531,990 B1 | 12/2016 | Wilkins et al. | |
| 9,800,260 B1 | 10/2017 | Banerjee | |
| 9,819,885 B2 | 11/2017 | Furukawa et al. | |
| 9,832,370 B2 | 11/2017 | Cho et al. | |
| 9,909,922 B2 | 3/2018 | Schweickert et al. | |
| 9,948,316 B1 | 4/2018 | Yun et al. | |
| 9,955,091 B1 | 4/2018 | Dai et al. | |
| 9,967,496 B2 | 5/2018 | Ayers et al. | |
| 10,003,759 B2 | 6/2018 | Fan | |
| 10,015,416 B2 | 7/2018 | Borthakur et al. | |
| 10,090,342 B1 | 10/2018 | Gambino et al. | |
| 10,096,631 B2 | 10/2018 | Ishizu | |
| 10,154,221 B2 | 12/2018 | Ogino et al. | |
| 10,157,951 B2 | 12/2018 | Kim et al. | |
| 10,321,081 B2 | 6/2019 | Watanabe et al. | |
| 10,345,447 B1 | 7/2019 | Hicks | |
| 10,419,701 B2 | 9/2019 | Liu | |
| 10,574,925 B2 | 2/2020 | Otaka | |
| 10,594,974 B2 | 3/2020 | Ivarsson et al. | |
| 10,598,546 B2 | 3/2020 | Liu | |
| 10,608,101 B2 | 3/2020 | Liu | |
| 10,686,996 B2 | 6/2020 | Liu | |
| 10,726,627 B2 | 7/2020 | Liu | |
| 10,750,097 B2 | 8/2020 | Liu | |
| 10,764,526 B1 | 9/2020 | Liu et al. | |
| 10,804,926 B2 | 10/2020 | Gao et al. | |
| 10,812,742 B2 | 10/2020 | Chen et al. | |
| 10,825,854 B2 | 11/2020 | Liu | |
| 10,834,344 B2 | 11/2020 | Chen et al. | |
| 10,897,586 B2 | 1/2021 | Liu et al. | |
| 10,903,260 B2 | 1/2021 | Chen et al. | |
| 10,917,589 B2 | 2/2021 | Liu | |
| 10,951,849 B2 | 3/2021 | Liu | |
| 10,969,273 B2 | 4/2021 | Berkovich et al. | |
| 11,004,881 B2 | 5/2021 | Liu et al. | |
| 11,057,581 B2 | 7/2021 | Liu | |
| 11,089,210 B2 | 8/2021 | Berkovich et al. | |
| 11,595,598 B2 | 2/2023 | Liu et al. | |
| 11,595,602 B2 | 2/2023 | Gao et al. | |
| 11,729,525 B2 | 8/2023 | Liu | |
| 2002/0067303 A1 | 6/2002 | Lee et al. | |
| 2002/0113886 A1 | 8/2002 | Hynecek | |
| 2002/0118289 A1 | 8/2002 | Choi | |
| 2003/0001080 A1 | 1/2003 | Kummaraguntla et al. | |
| 2003/0020100 A1 | 1/2003 | Guidash | |
| 2003/0049925 A1 | 3/2003 | Layman et al. | |
| 2004/0095495 A1 | 5/2004 | Inokuma et al. | |
| 2004/0118994 A1 | 6/2004 | Mizuno | |
| 2004/0251483 A1 | 12/2004 | Ko et al. | |
| 2005/0046715 A1 | 3/2005 | Lim et al. | |
| 2005/0057389 A1 | 3/2005 | Krymski | |
| 2005/0104983 A1 | 5/2005 | Raynor | |
| 2005/0206414 A1 | 9/2005 | Coffin et al. | |
| 2005/0237380 A1 | 10/2005 | Kakii et al. | |
| 2005/0280727 A1 | 12/2005 | Sato et al. | |
| 2006/0023109 A1 | 2/2006 | Mabuchi et al. | |
| 2006/0146159 A1 | 7/2006 | Farrier | |
| 2006/0157759 A1 | 7/2006 | Okita et al. | |
| 2006/0158541 A1 | 7/2006 | Ichikawa | |
| 2007/0013983 A1 | 1/2007 | Kitamura et al. | |
| 2007/0076109 A1 | 4/2007 | Krymski | |
| 2007/0076481 A1 | 4/2007 | Tennant | |
| 2007/0092244 A1 | 4/2007 | Pertsel et al. | |
| 2007/0102740 A1 | 5/2007 | Ellis-Monaghan et al. | |
| 2007/0131991 A1 | 6/2007 | Sugawa | |
| 2007/0208526 A1 | 9/2007 | Staudt et al. | |
| 2007/0222881 A1 | 9/2007 | Mentzer | |
| 2008/0001065 A1 | 1/2008 | Ackland | |
| 2008/0007731 A1 | 1/2008 | Botchway et al. | |
| 2008/0042888 A1 | 2/2008 | Danesh | |
| 2008/0068478 A1 | 3/2008 | Watanabe | |
| 2008/0088014 A1 | 4/2008 | Adkisson et al. | |
| 2008/0191791 A1 | 8/2008 | Nomura et al. | |
| 2008/0226170 A1 | 9/2008 | Sonoda | |
| 2008/0226183 A1 | 9/2008 | Lei et al. | |
| 2008/0266434 A1 | 10/2008 | Sugawa et al. | |
| 2009/0002528 A1 | 1/2009 | Manabe et al. | |
| 2009/0033588 A1 | 2/2009 | Kajita et al. | |
| 2009/0040364 A1 | 2/2009 | Rubner | |
| 2009/0091645 A1 | 4/2009 | Trimeche et al. | |
| 2009/0128640 A1 | 5/2009 | Yumiki | |
| 2009/0140305 A1 | 6/2009 | Sugawa | |
| 2009/0219266 A1 | 9/2009 | Lim et al. | |
| 2009/0224139 A1 | 9/2009 | Buettgen et al. | |
| 2009/0237536 A1 | 9/2009 | Purcell et al. | |
| 2009/0244346 A1 | 10/2009 | Funaki | |
| 2009/0245637 A1 | 10/2009 | Barman et al. | |
| 2009/0261235 A1 | 10/2009 | Lahav et al. | |
| 2009/0321615 A1 | 12/2009 | Sugiyama et al. | |
| 2010/0013969 A1 | 1/2010 | Ui | |
| 2010/0140732 A1 | 6/2010 | Eminoglu et al. | |
| 2010/0194956 A1 | 8/2010 | Yuan et al. | |
| 2010/0232227 A1 | 9/2010 | Lee | |
| 2010/0276572 A1 | 11/2010 | Iwabuchi et al. | |
| 2011/0049589 A1 | 3/2011 | Chuang et al. | |
| 2011/0122304 A1 * | 5/2011 | Sedelnikov | ............ H04N 5/335 348/294 |
| 2011/0149116 A1 | 6/2011 | Kim | |
| 2011/0155892 A1 | 6/2011 | Neter et al. | |
| 2011/0254986 A1 | 10/2011 | Nishimura et al. | |
| 2012/0016817 A1 | 1/2012 | Smith et al. | |
| 2012/0039548 A1 | 2/2012 | Wang et al. | |
| 2012/0068051 A1 | 3/2012 | Ahn et al. | |
| 2012/0092677 A1 | 4/2012 | Suehira et al. | |
| 2012/0105475 A1 | 5/2012 | Tseng | |
| 2012/0105668 A1 | 5/2012 | Velarde et al. | |
| 2012/0113119 A1 | 5/2012 | Massie | |
| 2012/0127284 A1 | 5/2012 | Bar-Zeev et al. | |

(56) References Cited

U.S. PATENT DOCUMENTS

| | | |
|---|---|---|
| 2012/0133807 A1 | 5/2012 | Wu et al. |
| 2012/0138775 A1 | 6/2012 | Cheon et al. |
| 2012/0153123 A1 | 6/2012 | Mao et al. |
| 2012/0188420 A1 | 7/2012 | Black et al. |
| 2012/0200499 A1 | 8/2012 | Osterhout et al. |
| 2012/0205520 A1 | 8/2012 | Hsieh et al. |
| 2012/0212465 A1 | 8/2012 | White et al. |
| 2012/0241591 A1 | 9/2012 | Wan et al. |
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2012/0305751 A1 | 12/2012 | Kusuda |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0082313 A1 | 4/2013 | Manabe |
| 2013/0113969 A1 | 5/2013 | Manabe et al. |
| 2013/0126710 A1 | 5/2013 | Kondo |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0214127 A1 | 8/2013 | Ohya et al. |
| 2013/0214371 A1 | 8/2013 | Asatsuma et al. |
| 2013/0218728 A1 | 8/2013 | Hashop et al. |
| 2013/0221194 A1 | 8/2013 | Manabe |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0293752 A1 | 11/2013 | Peng et al. |
| 2013/0299674 A1 | 11/2013 | Fowler et al. |
| 2014/0021574 A1 | 1/2014 | Egawa |
| 2014/0042299 A1 | 2/2014 | Wan et al. |
| 2014/0042582 A1 | 2/2014 | Kondo |
| 2014/0070974 A1 | 3/2014 | Park et al. |
| 2014/0078336 A1 | 3/2014 | Beck et al. |
| 2014/0085523 A1 | 3/2014 | Hynecek |
| 2014/0176770 A1 | 6/2014 | Kondo |
| 2014/0211052 A1 | 7/2014 | Choi, II |
| 2014/0232890 A1 | 8/2014 | Yoo et al. |
| 2014/0247382 A1 | 9/2014 | Moldovan et al. |
| 2014/0306276 A1 | 10/2014 | Yamaguchi |
| 2014/0368687 A1 | 12/2014 | Yu et al. |
| 2015/0070544 A1 | 3/2015 | Smith et al. |
| 2015/0077611 A1 | 3/2015 | Yamashita et al. |
| 2015/0083895 A1 | 3/2015 | Hashimoto et al. |
| 2015/0085134 A1 | 3/2015 | Novotny et al. |
| 2015/0090863 A1 | 4/2015 | Mansoorian et al. |
| 2015/0172574 A1 | 6/2015 | Honda et al. |
| 2015/0179696 A1 | 6/2015 | Kurokawa et al. |
| 2015/0189209 A1 | 7/2015 | Yang et al. |
| 2015/0201142 A1 | 7/2015 | Smith et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0281613 A1 | 10/2015 | Vogelsang et al. |
| 2015/0287766 A1 | 10/2015 | Kim et al. |
| 2015/0309311 A1 | 10/2015 | Cho |
| 2015/0309316 A1 | 10/2015 | Osterhout et al. |
| 2015/0312461 A1 | 10/2015 | Kim et al. |
| 2015/0312502 A1 | 10/2015 | Borremans |
| 2015/0312557 A1 | 10/2015 | Kim |
| 2015/0350582 A1 | 12/2015 | Korobov et al. |
| 2015/0358569 A1 | 12/2015 | Egawa |
| 2015/0358571 A1 | 12/2015 | Dominguez Castro et al. |
| 2015/0358593 A1 | 12/2015 | Sato |
| 2015/0381907 A1 | 12/2015 | Boettiger et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0028980 A1 | 1/2016 | Kameyama et al. |
| 2016/0037111 A1 | 2/2016 | Dai et al. |
| 2016/0078614 A1 | 3/2016 | Ryu et al. |
| 2016/0088253 A1 | 3/2016 | Tezuka |
| 2016/0100113 A1 | 4/2016 | Oh et al. |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0197117 A1 | 7/2016 | Nakata et al. |
| 2016/0204150 A1 | 7/2016 | Oh et al. |
| 2016/0210785 A1 | 7/2016 | Balachandreswaran et al. |
| 2016/0240570 A1 | 8/2016 | Barna et al. |
| 2016/0249004 A1 | 8/2016 | Saeki et al. |
| 2016/0255293 A1 | 9/2016 | Gesset |
| 2016/0277010 A1 | 9/2016 | Park et al. |
| 2016/0307945 A1 | 10/2016 | Madurawe |
| 2016/0307949 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | McCarten |
| 2017/0039906 A1 | 2/2017 | Jepsen |
| 2017/0041571 A1 | 2/2017 | Tyrrell et al. |
| 2017/0053962 A1 | 2/2017 | Oh et al. |
| 2017/0059399 A1 | 3/2017 | Suh et al. |
| 2017/0062501 A1 | 3/2017 | Velichko et al. |
| 2017/0069363 A1 | 3/2017 | Baker |
| 2017/0070691 A1 | 3/2017 | Nishikido |
| 2017/0099422 A1 | 4/2017 | Goma et al. |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1 | 4/2017 | Wang et al. |
| 2017/0141147 A1 | 5/2017 | Raynor |
| 2017/0154909 A1 | 6/2017 | Ishizu |
| 2017/0170223 A1 | 6/2017 | Hynecek et al. |
| 2017/0195602 A1 | 7/2017 | Iwabuchi et al. |
| 2017/0201693 A1 | 7/2017 | Sugizaki et al. |
| 2017/0207268 A1 | 7/2017 | Kurokawa |
| 2017/0228345 A1 | 8/2017 | Gupta et al. |
| 2017/0251151 A1 | 8/2017 | Hicks |
| 2017/0270664 A1 | 9/2017 | Hoogi et al. |
| 2017/0272667 A1 | 9/2017 | Hynecek |
| 2017/0272768 A1 | 9/2017 | Tall et al. |
| 2017/0280031 A1 | 9/2017 | Price et al. |
| 2017/0293799 A1 | 10/2017 | Skogo; Marten et al. |
| 2017/0310910 A1 | 10/2017 | Smith et al. |
| 2017/0318250 A1 | 11/2017 | Sakakibara et al. |
| 2017/0324917 A1 | 11/2017 | Mlinar et al. |
| 2017/0338262 A1 | 11/2017 | Hirata |
| 2017/0339327 A1 | 11/2017 | Koshkin et al. |
| 2017/0346579 A1 | 11/2017 | Barghi |
| 2017/0350755 A1 | 12/2017 | Geurts |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0152650 A1 | 5/2018 | Sakakibara et al. |
| 2018/0167575 A1 | 6/2018 | Watanabe et al. |
| 2018/0175083 A1 | 6/2018 | Takahashi |
| 2018/0176545 A1 | 6/2018 | Aflaki Beni |
| 2018/0204867 A1 | 7/2018 | Kim et al. |
| 2018/0220093 A1 | 8/2018 | Murao et al. |
| 2018/0224658 A1 | 8/2018 | Teller |
| 2018/0227516 A1 | 8/2018 | Mo et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0376046 A1 | 12/2018 | Liu |
| 2018/0376090 A1 | 12/2018 | Liu |
| 2019/0035154 A1 | 1/2019 | Liu |
| 2019/0046044 A1 | 2/2019 | Tzvieli et al. |
| 2019/0052788 A1 | 2/2019 | Liu |
| 2019/0052821 A1 | 2/2019 | Berner et al. |
| 2019/0056264 A1 | 2/2019 | Liu |

(56) References Cited

U.S. PATENT DOCUMENTS

| | | |
|---|---|---|
| 2019/0057995 A1 | 2/2019 | Liu |
| 2019/0058058 A1 | 2/2019 | Liu |
| 2019/0098232 A1 | 3/2019 | Mori et al. |
| 2019/0104263 A1 | 4/2019 | Ochiai et al. |
| 2019/0104265 A1 | 4/2019 | Totsuka et al. |
| 2019/0110039 A1 | 4/2019 | Linde et al. |
| 2019/0123088 A1 | 4/2019 | Kwon |
| 2019/0141270 A1 | 5/2019 | Otaka et al. |
| 2019/0149751 A1 | 5/2019 | Wise |
| 2019/0157330 A1 | 5/2019 | Sato et al. |
| 2019/0172227 A1 | 6/2019 | Kasahara |
| 2019/0172868 A1 | 6/2019 | Chen et al. |
| 2019/0191116 A1 | 6/2019 | Madurawe |
| 2019/0246036 A1 | 8/2019 | Wu et al. |
| 2019/0253650 A1 | 8/2019 | Kim |
| 2019/0327439 A1 | 10/2019 | Chen et al. |
| 2019/0331914 A1 | 10/2019 | Lee et al. |
| 2019/0335151 A1 | 10/2019 | Rivard et al. |
| 2019/0348460 A1 | 11/2019 | Chen et al. |
| 2019/0355782 A1 | 11/2019 | Do et al. |
| 2019/0363118 A1 | 11/2019 | Berkovich et al. |
| 2019/0371845 A1 | 12/2019 | Chen et al. |
| 2019/0376845 A1 | 12/2019 | Liu et al. |
| 2019/0379388 A1 | 12/2019 | Gao et al. |
| 2019/0379827 A1 | 12/2019 | Berkovich et al. |
| 2019/0379846 A1 | 12/2019 | Chen et al. |
| 2020/0007800 A1* | 1/2020 | Berkovich ............ H03M 1/18 |
| 2020/0053299 A1 | 2/2020 | Zhang et al. |
| 2020/0059589 A1 | 2/2020 | Liu et al. |
| 2020/0068189 A1 | 2/2020 | Chen et al. |
| 2020/0186731 A1 | 6/2020 | Chen et al. |
| 2020/0195875 A1 | 6/2020 | Berkovich et al. |
| 2020/0217714 A1 | 7/2020 | Liu |
| 2020/0228745 A1 | 7/2020 | Otaka |
| 2020/0374475 A1 | 11/2020 | Fukuoka et al. |
| 2021/0026796 A1 | 1/2021 | Graif et al. |
| 2021/0099659 A1 | 4/2021 | Miyauchi et al. |
| 2021/0185264 A1 | 6/2021 | Wong et al. |
| 2021/0227159 A1 | 7/2021 | Sambonsugi |
| 2021/0368124 A1 | 11/2021 | Berkovich et al. |
| 2023/0080288 A1 | 3/2023 | Berkovich et al. |
| 2023/0092325 A1 | 3/2023 | Tsai et al. |
| 2023/0239582 A1 | 7/2023 | Berkovich et al. |

FOREIGN PATENT DOCUMENTS

| | | |
|---|---|---|
| CN | 1812506 A | 8/2006 |
| CN | 101753866 A | 6/2010 |
| CN | 103002228 A | 3/2013 |
| CN | 103207716 A | 7/2013 |
| CN | 104125418 A | 10/2014 |
| CN | 104204904 A | 12/2014 |
| CN | 104469195 A | 3/2015 |
| CN | 104704812 A | 6/2015 |
| CN | 104733485 A | 6/2015 |
| CN | 104754255 A | 7/2015 |
| CN | 204633945 U | 9/2015 |
| CN | 105144699 A | 12/2015 |
| CN | 105529342 A | 4/2016 |
| CN | 105706439 A | 6/2016 |
| CN | 205666884 U | 10/2016 |
| CN | 106255978 A | 12/2016 |
| CN | 106791504 A | 5/2017 |
| CN | 107852473 A | 3/2018 |
| CN | 109298528 A | 2/2019 |
| DE | 202016105510 U1 | 10/2016 |
| EP | 0675345 A2 | 10/1995 |
| EP | 1681856 A2 | 7/2006 |
| EP | 1732134 A1 | 12/2006 |
| EP | 1746820 A1 | 1/2007 |
| EP | 1788802 A1 | 5/2007 |
| EP | 2037505 A1 | 3/2009 |
| EP | 2063630 A1 | 5/2009 |
| EP | 2538664 A2 | 12/2012 |
| EP | 2804074 A2 | 11/2014 |
| EP | 2833619 A1 | 2/2015 |
| EP | 3032822 A1 | 6/2016 |
| EP | 3229457 A1 | 10/2017 |
| EP | 3258683 A1 | 12/2017 |
| EP | 3425352 A1 | 1/2019 |
| EP | 3439039 A1 | 2/2019 |
| EP | 3744085 A2 | 12/2020 |
| JP | H08195906 A | 7/1996 |
| JP | 2001008101 A | 1/2001 |
| JP | 2002199292 A | 7/2002 |
| JP | 2003319262 A | 11/2003 |
| JP | 2005328493 A | 11/2005 |
| JP | 2006197382 A | 7/2006 |
| JP | 2006203736 A | 8/2006 |
| JP | 2007074447 A | 3/2007 |
| JP | 2011216966 A | 10/2011 |
| JP | 2012054495 A | 3/2012 |
| JP | 2012054876 A | 3/2012 |
| JP | 2012095349 A | 5/2012 |
| JP | 2013009087 A | 1/2013 |
| JP | 2013055581 A | 3/2013 |
| JP | 2013172203 A | 9/2013 |
| JP | 2013225774 A | 10/2013 |
| JP | 2014107596 A | 6/2014 |
| JP | 2014165733 A | 9/2014 |
| JP | 2014236183 A | 12/2014 |
| JP | 2015065524 A | 4/2015 |
| JP | 2015126043 A | 7/2015 |
| JP | 2015530855 A | 10/2015 |
| JP | 2015211259 A | 11/2015 |
| JP | 2016092661 A | 5/2016 |
| JP | 2016513942 A | 5/2016 |
| JP | 2017509251 A | 3/2017 |
| KR | 100574959 B1 | 4/2006 |
| KR | 20080019652 A | 3/2008 |
| KR | 20090023549 A | 3/2009 |
| KR | 20110050351 A | 5/2011 |
| KR | 20110134941 A | 12/2011 |
| KR | 20120058337 A | 6/2012 |
| KR | 20120117953 A | 10/2012 |
| KR | 20150095841 A | 8/2015 |
| KR | 20160008267 A | 1/2016 |
| KR | 20160008287 A | 1/2016 |
| TW | 201448184 A | 12/2014 |
| TW | 201719874 A | 6/2017 |
| TW | 201728161 A | 8/2017 |
| TW | 1624694 B | 5/2018 |
| WO | 2006124592 A2 | 11/2006 |
| WO | 2006129762 A1 | 12/2006 |
| WO | 2010117462 A1 | 10/2010 |
| WO | 2013099723 A1 | 7/2013 |
| WO | WO-2014055391 A2 | 4/2014 |
| WO | 2014144391 A1 | 9/2014 |
| WO | 2015135836 A1 | 9/2015 |
| WO | 2015182390 A1 | 12/2015 |
| WO | 2016014860 A1 | 1/2016 |
| WO | WO-2016095057 A1 | 6/2016 |
| WO | 2016194653 A1 | 12/2016 |
| WO | WO-2017003477 A1 | 1/2017 |
| WO | WO-2017013806 A1 | 1/2017 |
| WO | WO-2017047010 A1 | 3/2017 |
| WO | 2017058488 A1 | 4/2017 |
| WO | WO-2017069706 A1 | 4/2017 |
| WO | 2017169882 A1 | 10/2017 |
| WO | WO-2017169446 A1 | 10/2017 |
| WO | WO-2019018084 A1 | 1/2019 |
| WO | WO-2019111528 A1 | 6/2019 |
| WO | WO-2019145578 A1 | 8/2019 |
| WO | WO-2019168929 A1 | 9/2019 |

OTHER PUBLICATIONS

U.S. Appl. No. 15/719,345, "Non-Final Office Action", dated Nov. 25, 2019, 14 pages.

U.S. Appl. No. 15/719,345, "Notice of Allowance", dated Aug. 12, 2020, 11 pages.

U.S. Appl. No. 15/719,345, "Notice of Allowance", dated Sep. 3, 2020, 12 pages.

(56) References Cited

OTHER PUBLICATIONS

U.S. Appl. No. 15/847,517, "Non-Final Office Action", dated Nov. 23, 2018, 21 pages.
U.S. Appl. No. 15/847,517, "Notice of Allowance", dated May 1, 2019, 11 pages.
U.S. Appl. No. 15/876,061, "Corrected Notice of Allowability", dated Apr. 28, 2020, 3 pages.
U.S. Appl. No. 15/876,061, "Non-Final Office Action", dated Sep. 18, 2019, 23 pages.
U.S. Appl. No. 15/876,061, "Notice of Allowability", dated May 6, 2020, 2 pages.
U.S. Appl. No. 15/876,061, "Notice of Allowance", dated Feb. 4, 2020, 13 pages.
U.S. Appl. No. 15/983,379, "Notice of Allowance", dated Oct. 18, 2019, 9 pages.
U.S. Appl. No. 16/382,015, "Notice of Allowance", dated Jun. 11, 2020, 11 pages.
U.S. Appl. No. 16/431,693, "Non-Final Office Action", dated Jan. 30, 2020, 6 pages.
U.S. Appl. No. 16/431,693, "Notice of Allowance", dated Jun. 24, 2020, 7 pages.
U.S. Appl. No. 16/436,137, "Non-Final Office Action", dated Dec. 4, 2020, 12 pages.
U.S. Appl. No. 16/454,787, "Notice of Allowance", dated Apr. 22, 2020, 10 pages.
U.S. Appl. No. 16/454,787, "Notice of Allowance", dated Jul. 9, 2020, 9 pages.
U.S. Appl. No. 16/454,787, "Notice of Allowance", dated Sep. 9, 2020, 9 pages.
U.S. Appl. No. 16/566,583, "Corrected Notice of Allowability", dated Dec. 11, 2020, 2 pages.
U.S. Appl. No. 16/566,583, "Final Office Action", dated Apr. 15, 2020, 24 pages.
U.S. Appl. No. 16/566,583, "Non-Final Office Action", dated Jul. 27, 2020, 11 pages.
U.S. Appl. No. 16/566,583, "Non-Final Office Action", dated Oct. 1, 2019, 10 pages.
U.S. Appl. No. 16/707,988, "Non-Final Office Action", dated Sep. 22, 2020, 15 pages.
EP18179846.3, "Extended European Search Report", dated Dec. 7, 2018, 10 pages.
EP18189100.3, "Extended European Search Report", dated Oct. 9, 2018, 8 pages.
PCT/US2018/046131, "International Search Report and Written Opinion", dated Dec. 3, 2018, 10 pages.
PCT/US2019/035724, "International Search Report and Written Opinion", dated Sep. 10, 2019, 12 pages.
PCT/US2019/036484, "International Search Report and Written Opinion", dated Sep. 19, 2019, 10 pages.
PCT/US2019/036575, "International Search Report and Written Opinion", dated Sep. 30, 2019, 16 pages.
PCT/US2019/039758, "International Search Report and Written Opinion", dated Oct. 11, 2019, 13 pages.
PCT/US2019/065430, "International Search Report and Written Opinion", dated Mar. 6, 2020, 15 pages.
Snoeij, "A Low Power Column-Parallel 12-Bit ADC for CMOS Imagers", Institute of Electrical and Electronics Engineers Workshop on Charge-Coupled Devices and Advanced Image Sensors, Jun. 2005, pp. 169-172.
Xu, et al., "A New Digital-Pixel Architecture for CMOS Image Sensor with Pixel-Level ADC and Pulse Width Modulation using a 0.18 Mu M CMOS Technology", Institute of Electrical and Electronics Engineers Conference on Electron Devices and Solid-State Circuits, Dec. 16-18, 2003, pp. 265-268.
U.S. Appl. No. 16/435,451, Final Office Action dated Jul. 12, 2021, 13 pages.
U.S. Appl. No. 16/435,451, Non-Final Office Action dated Feb. 1, 2021, 14 pages.
U.S. Appl. No. 16/436,049, Notice of Allowance dated Oct. 21, 2020, 8 pages.
U.S. Appl. No. 16/566,583, Corrected Notice of Allowability dated Feb. 3, 2021, 2 pages.
U.S. Appl. No. 16/707,988, Notice of Allowance dated May 5, 2021, 14 pages.
U.S. Appl. No. 16/820,594, Non-Final Office Action dated Jul. 2, 2021, 8 pages.
U.S. Appl. No. 16/896,130, Non-Final Office Action dated Mar. 15, 2021, 16 pages.
U.S. Appl. No. 16/896,130, Notice of Allowance dated Jul. 13, 2021, 8 pages.
U.S. Appl. No. 17/150,925, Notice of Allowance dated Jul. 8, 2021, 10 pages.
U.S. Appl. No. 16/707,988, Corrected Notice of Allowability dated Jul. 26, 2021, 2 pages.
European Application No. 19737299.8, Office Action dated Jul. 7, 2021, 5 pages.
Taiwan Application No. 107124385, Office Action dated Sep. 30, 2021, 17 pages (8 pages of Original Document and 9 pages of English Translation).
U.S. Appl. No. 16/899,908, Notice of Allowance dated Sep. 17, 2021, 11 pages.
International Search Report and Written Opinion for International Application No. PCT/US2021/057966, dated Feb. 22, 2022, 15 pages.
Corrected Notice of Allowance dated Mar. 7, 2022 for U.S. Appl. No. 17/150,925, filed Jan. 15, 2021, 2 Pages.
Non-Final Office Action dated Mar. 2, 2022 for U.S. Appl. No. 17/127,670, filed Dec. 18, 2020, 18 pages.
Notice of Allowance dated Mar. 2, 2022 for U.S. Application No. 16/453,538, filed Jun. 26, 2019, 8 pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notification of the First Office Action dated Oct. 28, 2021 for Chinese Application No. 2019800218483, filed Jan. 24, 2019, 17 pages.
International Preliminary Report on Patentability for International Application No. PCT/US2020/044807, dated Feb. 17, 2022, 10 pages.
Notice of Allowance dated Feb. 16, 2022 for U.S. Appl. No. 17/150,925, filed Jan. 15, 2021, 9 pages.
International Search Report and Written Opinion for International Application No. PCT/US2021/054327, dated Feb. 14, 2022, 8 pages.
Advisory Action dated Apr. 7, 2020 for U.S. Appl. No. 15/801,216, filed Nov. 1, 2019, 3 Pages.
Advisory Action dated Oct. 8, 2020 for U.S. Appl. No. 16/210,748, filed Dec. 5, 2018, 4 Pages
Advisory Action dated Oct. 23, 2019 for U.S. Appl. No. 15/668,241, filed Aug. 3, 2017, 5 Pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Cho K., et al., "A Low Power Dual CDS for a Column-Parallel CMOS Image Sensor," Journal of Semiconductor Technology and Science, Dec. 30, 2012, vol. 12 (4), pp. 388-396.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of Allowability dated Apr. 9, 2021 for U.S. Appl. No. 16/255,528, filed Jan. 23, 2019, 5 Pages.
Extended European Search Report for European Application No. 18179838.0, dated May 24, 2019, 17 Pages.
Extended European Search Report for European Application No. 18179851.3, dated Dec. 7, 2018, 8 Pages.

(56) References Cited

OTHER PUBLICATIONS

Extended European Search Report for European Application No. 18188684.7, dated Jan. 16, 2019, 10 Pages.
Extended European Search Report for European Application No. 18188962.7, dated Oct. 23, 2018, 8 Pages.
Extended European Search Report for European Application No. 18188968.4, dated Oct. 23, 2018, 8 Pages.
Extended European Search Report for European Application No. 19743908.6, dated Sep. 30, 2020, 9 Pages.
Final Office Action dated Jul. 7, 2020 for U.S. Appl. No. 16/210,748, filed Dec. 5, 2018, 11 Pages.
Final Office Action dated Jun. 17, 2019 for U.S. Appl. No. 15/668,241, filed Aug. 3, 2017, 19 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Dec. 26, 2019 for U.S. Appl. No. 15/801,216, filed Nov. 1, 2017, 5 Pages.
Final Office Action dated Feb. 27, 2020 for U.S. Appl. No. 16/177,971, filed Nov. 1, 2018, 9 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Preliminary Report on Patentability for International Application No. PCT/US2018/039350, dated Jan. 9, 2020, 10 Pages.
International Search Report and Written Opinion for International Application No. PCT/US2018/039350, dated Nov. 15, 2018, 11 Pages.
International Search Report and Written Opinion for International Application No. PCT/US2018/039352, dated Oct. 26, 2018, 8 Pages.
International Search Report and Written Opinion for International Application No. PCT/US2018/039431, dated Nov. 7, 2018, 12 Pages.
International Search Report and Written Opinion for International Application No. PCT/US2018/045661, dated Nov. 30, 2018, 11 Pages.
International Search Report and Written Opinion for International Application No. PCT/US2018/045666, dated Dec. 3, 2018, 13 Pages.
International Search Report and Written Opinion for International Application No. PCT/US2018/045673, dated Dec. 4, 2018, 13 Pages.
International Search Report and Written Opinion for International Application No. PCT/US2018/064181, dated Mar. 29, 2019, 10 Pages.
International Search Report and Written Opinion for International Application No. PCT/US2019/014044, dated May 8, 2019, 9 Pages.
International Search Report and Written Opinion for International Application No. PCT/US2019/014904, dated Aug. 5, 2019, 7 Pages.
International Search Report and Written Opinion for International Application No. PCT/US2019/019756, dated Jun. 13, 2019, 11 Pages.
International Search Report and Written Opinion for International Application No. PCT/US2019/019765, dated Jun. 14, 2019, 9 Pages.
International Search Report and Written Opinion for International Application No. PCT/US2019/025170, dated Jul. 9, 2019, 11 Pages.
International Search Report and Written Opinion for International Application No. PCT/US2019/027727, dated Jun. 27, 2019, 10 Pages.
International Search Report and Written Opinion for International Application No. PCT/US2019/027729, dated Jun. 27, 2019, 9 Pages.
International Search Report and Written Opinion for International Application No. PCT/US2019/031521, dated Jul. 11, 2019, 8 Pages.
International Search Report and Written Opinion for International Application No. PCT/US2019/034007, dated Oct. 28, 2019, 18 Pages.
International Search Report and Written Opinion for International Application No. PCT/US2019/036492, dated Sep. 25, 2019, 8 Pages.
International Search Report and Written Opinion for International Application No. PCT/US2019/036536, dated Sep. 26, 2019, 13 Pages.
International Search Report and Written Opinion for International Application No. PCT/US2019/039410, dated Sep. 30, 2019, 10 Pages.
International Search Report and Written Opinion for International Application No. PCT/US2019/047156, dated Oct. 23, 2019, 9 Pages.
International Search Report and Written Opinion for International Application No. PCT/US2019/048241, dated Jan. 28, 2020, 16 Pages.
International Search Report and Written Opinion for International Application No. PCT/US2019/049756, dated Dec. 16, 2019, 8 Pages.
International Search Report and Written Opinion for International Application No. PCT/US2019/059754, dated Mar. 24, 2020, 11 Pages.
International Search Report and Written Opinion for International Application No. PCT/US2019/066805, dated Mar. 6, 2020, 9 Pages.
International Search Report and Written Opinion for International Application No. PCT/US2019/066831, dated Feb. 27, 2020, 11 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.
International Search Report and Written Opinion for International Application No. PCT/US2020/059636, datled Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
Kavusi S., et al., "Quantitative Study of High-Dynamic-Range Image Sensor Architecture," Proceedings of Society of Photo-Optical Instrumentation Engineers, Jun. 7, 2004, vol. 5301, 12 Pages, XP055186908.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Jan. 1, 2021 for U.S. Appl. No. 16/715,792, filed Dec. 16, 2019, 15 Pages.
Non-Final Office Action dated May 1, 2019 for U.S. Appl. No. 15/927,896, filed Mar. 21, 2018, 10 Pages.
Non-Final Office Action dated May 1, 2020 for U.S. Appl. No. 16/384,720, filed Apr. 15, 2019, 6 Pages.
Non-Final Office Action dated Oct. 1, 2019 for U.S. Appl. No. 16/286,355, filed Feb. 26, 2019, 6 Pages.
Non-Final Office Action dated Sep. 2, 2021 for U.S. Appl. No. 16/910,844, filed Jun. 24, 2020, 7 Pages.
Non-Final Office Action dated Mar. 4, 2020 for U.S. Appl. No. 16/436,049, filed Jun. 10, 2019, 9 Pages.
Non-Final Office Action dated May 7, 2021 for U.S. Appl. No. 16/421,441, filed May 23, 2019, 17 Pages.
Non-Final Office Action dated Jul. 10, 2019 for U.S. Appl. No. 15/861,588, filed Jan. 3, 2018, 11 Pages.
Non-Final Office Action dated Jul. 10, 2020 for U.S. Appl. No. 16/255,528, filed Jan. 23, 2019, 27 Pages.

(56) References Cited

OTHER PUBLICATIONS

Non-Final Office Action dated May 14, 2021 for U.S. Appl. No. 16/716,050, filed Dec. 16, 2019, 16 Pages.
Non-Final Office Action dated Apr. 21, 2021 for U.S. Appl. No. 16/453,538, filed Jun. 26, 2019, 16 pages.
Non-Final Office Action dated Apr. 21, 2021 for U.S. Appl. No. 17/083,920, filed Oct. 29, 2020, 17 Pages.
Non-Final Office Action dated Dec. 21, 2018 for U.S. Appl. No. 15/668,241, filed Aug. 3, 2017, 16 Pages.
Non-Final Office Action dated Oct. 21, 2021 for U.S. Appl. No. 17/083,920, filed Oct. 29, 2020, 19 Pages.
Non-Final Office Action dated Jul. 22, 2020 for U.S. Appl. No. 16/249,420, filed Jan. 16, 2019, 9 Pages.
Non-Final Office Action dated Jul. 22, 2020 for U.S. Appl. No. 16/369,763, filed Mar. 29, 2019, 15 Pages.
Non-Final Office Action dated Jul. 25, 2019 for U.S. Appl. No. 15/909,162, filed Mar. 1, 2018, 20 Pages.
Non-Final Office Action dated Sep. 25, 2019 for U.S. Appl. No. 16/177,971, filed Nov. 1, 2018, 9 Pages.
Non-Final Office Action dated Apr. 27, 2021 for U.S. Appl. No. 16/829,249, filed Mar. 25, 2020, 9 Pages.
Non-Final Office Action dated Jun. 27, 2019 for U.S. Appl. No. 15/801,216, filed Nov. 1, 2017, 13 Pages.
Non-Final Office Action dated Aug. 29, 2019 for U.S. Appl. No. 15/983,391, filed May 18, 2018, 12 Pages.
Non-Final Office Action dated Jun. 30, 2020 for U.S. Appl. No. 16/436,049, filed Jun. 10, 2019, 11 Pages.
Non-Final Office Action dated Jan. 31, 2020 for U.S. Appl. No. 16/210,748, filed Dec. 5, 2018, 11 Pages.
Notice of Allowance dated Apr. 1, 2021 for U.S. Appl. No. 16/255,528, filed Jan. 23, 2019, 7 Pages.
Notice of Allowance dated Nov. 2, 2021 for U.S. Appl. No. 16/453,538, filed Jun. 26, 2019, 8 Pages.
Notice of Allowance dated Jun. 4, 2020 for U.S. Appl. No. 16/286,355, filed Feb. 26, 2019, 7 Pages.
Notice of Allowance dated Mar. 5, 2020 for U.S. Appl. No. 15/668,241, filed Aug. 3 , 2017, 8 Pages.
Notice of Allowance dated Jan. 7, 2022 for U.S. Appl. No. 16/899,908, filed Jun. 12, 2020, 10 Pages.
Notice of Allowance dated Apr. 8, 2020 for U.S. Appl. No. 15/983,391, filed May 18, 2018, 8 Pages.
Notice of Allowance dated Dec. 8, 2021 for U.S. Appl. No. 16/829,249, filed Mar. 25, 2020, 6 pages.
Notice of Allowance dated Feb. 12, 2020 for U.S. Appl. No. 16/286,355, filed Feb. 26, 2019, 7 Pages.
Notice of Allowance dated Oct. 14, 2020 for U.S. Appl. No. 16/384,720, filed Apr. 15, 2019, 8 Pages.
Notice of Allowance dated Oct. 15, 2020 for U.S. Appl. No. 16/544,136, filed Aug. 19, 2019, 11 Pages.
Notice of Allowance dated Apr. 16, 2021 for U.S. Appl. No. 16/715,792, filed Dec. 16, 2019, 10 Pages.
Notice of Allowance dated Sep. 16, 2020 for U.S. Appl. No. 16/435,449, filed Jun. 7, 2019, 7 Pages.
Notice of Allowance dated Mar. 18, 2020 for U.S. Appl. No. 15/909,162, filed Mar. 1, 2018, 9 Pages.
Notice of Allowance dated Nov. 18, 2020 for U.S. Appl. No. 16/249,420, filed Jan. 16, 2019, 8 Pages.
Notice of Allowance dated Dec. 21, 2021 for U.S. Appl. No. 16/550,851, filed Aug. 2, 2019, 10 pages.
Notice of Allowance dated Dec. 22, 2021 for U.S. Appl. No. 16/910,844, filed Jun. 24, 2020, 7 pages.
Notice of Allowance dated Jan. 22, 2021 for U.S. Appl. No. 16/369,763, filed Mar. 29, 2019, 8 Pages.
Notice of Allowance dated Jun. 23, 2020 for U.S. Appl. No. 15/801,216, filed Nov. 1, 2017, 5 Pages.
Notice of Allowance dated Apr. 24, 2020 for U.S. Appl. No. 16/177,971, filed Nov. 1, 2018, 6 Pages.
Notice of Allowance dated Nov. 24, 2021 for U.S. Appl. No. 16/910,844, filed 24 Jun. 2020, 8 pages.
Notice of Allowance dated Aug. 25, 2021 for U.S. Appl. No. 16/715,792, filed Dec. 16, 2019, 9 Pages.
Notice of Allowance dated Aug. 26, 2020 for U.S. Appl. No. 16/384,720, filed Apr. 15, 2019, 8 Pages.
Notice of Allowance dated Nov. 26, 2019 for U.S. Appl. No. 15/861,588, filed Jan. 3, 2018, 9 Pages.
Notice of Allowance dated Jul. 27, 2020 for U.S. Appl. No. 16/435,449, filed Jun. 7, 2019, 8 Pages.
Notice of Allowance dated Jun. 29, 2020 for U.S. Appl. No. 15/668,241, filed Aug. 3, 2017, 8 Pages.
Notice of Allowance dated Aug. 30, 2021 for U.S. Appl. No. 16/829,249, filed Mar. 25, 2020, 8 pages.
Notice of Reason for Rejection dated Nov. 16, 2021 for Japanese Application No. 2019-571699, filed Jun. 25, 2018, 13 pages.
Office Action dated Jul. 3, 2020 for Chinese Application No. 201810821296, filed Jul. 24, 2018, 17 Pages.
Office Action dated Jul. 7, 2021 for European Application No. 19723902.3, filed Apr. 1, 2019, 3 Pages.
Office Action dated Mar. 9, 2021 for Chinese Application No. 201810821296, filed Jul. 24, 2018, 10 Pages.
Office Action dated Aug. 14, 2019 for European Application No. 18188968.4, filed Aug. 14, 2018, 5 Pages.
Office Action dated Dec. 14, 2021 for Japanese Application No. 2019571598, filed Jun. 26, 2018, 12 pages.
Office Action dated Nov. 26, 2019 for European Application No. 18188684.7, filed Aug. 13, 2018, 9 Pages.
Office Action dated Aug. 28, 2019 for European Application No. 18188962.7, filed Aug. 14, 2018, 6 Pages.
Office Action dated Jun. 28, 2020 for Chinese Application No. 201810821296, filed Jul. 24, 2018, 2 Pages.
Partial European Search Report for European Application No. 18179838.0, dated Dec. 5, 2018, 13 Pages.
Partial International Search Report and Provisional Opinion for International Application No. PCT/US2021/041775, dated Oct. 8, 2021, 12 pages.
Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power Column-Parallel 12-bit ADC for CMOS Imagers," XP007908033, Jun. 1, 2005, pp. 169-172.
Supplemental Notice of Allowability dated Apr. 29, 2020 for U.S. Appl. No. 15/668,241, filed Aug. 3, 2017, 5 Pages.
Tanner S., et al., "Low-Power Digital Image Sensor for Still Picture Image Acquisition," Visual Communications and Image Processing, San Jose, Jan. 22, 2001, vol. 4306, pp. 358-365, XP008014232.
Notice of Allowance dated Aug. 10, 2022 for U.S. Appl. No. 16/896,130, filed Jun. 8, 2020, 8 pages.
Corrected Notice of Allowance dated Mar. 29, 2022 for U.S. Appl. No. 17/150,925, filed Jan. 15, 2021, 2 Pages.
Office Action dated Mar. 17, 2022 for Taiwan Application No. 20180124384, 26 pages.
Non-Final Office Action dated Apr. 13, 2022 for U.S. Appl. No. 16/820,594, filed Mar. 16, 2020, 7 pages.
Office Action dated Mar. 29, 2022 for Japanese Patent Application No. 2020520431, filed on Jun. 25, 2018, 10 pages.
Notice of Allowance dated Aug. 22, 2022 for U.S. Appl. No. 16/435,451, filed Jun. 7, 2019, 08 pages.
Notice of Allowance dates Sep. 22, 2022 for U.S. Appl. No. 17/150,925, filed Jan. 15, 2021, 9 pages.
Notice of Allowance dated Aug. 23, 2022 for U.S. Appl. No. 16/896,130, filed Jun. 8, 2020, 2 pages.
Office Action dated Jul. 12, 2022 for Japanese Application No. 2019-571699, filed Jun. 25, 2018, 5 pages.
Office Action dated Jul. 19, 2022 for Japanese Application No. 2019571598, filed Jun. 26, 2018, 10 pages.

(56) References Cited

OTHER PUBLICATIONS

Office Action dated Sep. 26, 2022 for Korean Patent Application No. 10-2020-7002496, filed on Jun. 26, 2018, 17 pages..
Office Action dated Aug. 30, 2022 for Japanese Patent Application No. 2020505830, filed on Aug. 9, 2018, 5 pages.
International Search Report and Written Opinion for International Application No. PCT/US2021/065174 dated Mar. 28, 2022, 10 pages.
Office Action dated Mar. 15, 2022 for Japanese Patent Application No. 2020505830, filed on Aug. 9, 2018, 12 pages.
Notice of Allowance dated Apr. 19, 2022 for U.S. Appl. No. 16/899,908, filed Jun. 12, 2020, 10 pages.
Notice of Allowance dated Jul. 5, 2022 for U.S. Appl. No. 16/899,908, filed Jun. 12, 2020, 10 pages.
Notice of Allowance dated Jun. 8, 2022 for U.S. Appl. No. 17/150,925, filed Jan. 15, 2021, 10 pages.
Office Action for European Application No. 18179851.3, dated May 19, 2022, 7 pages.
Office Action dated Jul. 5, 2022 for Korean Application No. 10-2020-7002533, filed Jun. 25, 2018, 13 pages.
Office Action dated May 18, 2022 for Taiwan Application No. 108122878, 24 pages.
Corrected Notice of Allowability dated Jan. 9, 2023 for U.S. Appl. No. 17/150,925, filed Jan. 15, 2021, 8 pages.
International Preliminary Report on Patentability for International Application No. PCT/US2021/054327, dated Apr. 20, 2023, 7 pages.
International Preliminary Report on Patentability for International Application No. PCT/US2021/057966, dated May 19, 2023, 12 pages.
Notice of Allowance dated Jun. 1, 2023 for U.S. Appl. No. 16/899,908, filed Jun. 12, 2020, 9 pages.
Notice of Allowance dated Mar. 1, 2023 for U.S. Appl. No. 17/242,152, filed Apr. 27, 2021, 9 pages.
Notice of Allowance dated Dec. 6, 2022 for U.S. Appl. No. 16/896,130, filed Jun. 8, 2020, 8 pages.
Notice of Allowance dated Apr. 7, 2021 for U.S. Appl. No. 16/436,137, filed Jun. 10, 2019, 9 pages.
Notice of Allowance dated Jul. 7, 2023 for U.S. Appl. No. 16/896,130, filed Jun. 8, 2020, 8 pages.
Notice of Allowance dated Dec. 9, 2022 for U.S. Appl. No. 16/435,451, filed Jun. 7, 2019, 8 pages.
Notice of Allowance dated Feb. 10, 2023 for U.S. Appl. No. 16/899,908, filed Jun. 12, 2020, 9 pages.
Notice of Allowance dated Dec. 13, 2022 for U.S. Appl. No. 16/820,594, filed Mar. 16, 2020, 5 pages.
Notice of Allowance dated Jun. 16, 2023 for U.S. Appl. No. 17/242,152, filed Apr. 27, 2021, 9 pages.
Notice of Allowance dated Mar. 17, 2023 for U.S. Appl. No. 16/896,130, filed Jun. 8, 2020, 8 pages.
Notice of Allowance dated Nov. 21, 2022 for U.S. Appl. No. 17/242,152, filed Apr. 27, 2021, 10 pages.
Notice of Allowance dated Oct. 21, 2022 for U.S. Appl. No. 16/899,908, filed Jun. 12, 2020, 10 pages.
Notice of Allowance dated Dec. 22, 2022 for U.S. Appl. No. 17/496,712, filed Oct. 7, 2021, 13 pages.
Notice of Allowance dated Jun. 22, 2023 for U.S. Appl. No. 16/435,451, filed Jun. 7, 2019, 10 pages.
Notice of Allowance dated Apr. 24, 2023 for U.S. Appl. No. 17/496,712, filed Oct. 7, 2021, 12 pages.
Notice of Allowance dated Mar. 27, 2023 for U.S. Appl. No. 16/820,594, filed Mar. 16, 2020, 5 pages.
Office Action dated Nov. 2, 2022 for Taiwan Application No. 107128759, filed Aug. 17, 2018, 16 pages.
Office Action dated Dec. 1, 2022 for Korean Application No. 10-2020-7002306, filed Jun. 25, 2018, 13 pages.
Office Action dated Jun. 1, 2023 for Korean Application No. 10-2020-7002306, filed Jun. 25, 2018, 3 pages.
Office Action dated Nov. 1, 2022 for Japanese Patent Application No. 2020-520431, filed on Jun. 25, 2018, 11 pages.
Office Action dated Mar. 10, 2023 for Chinese Application No. 201880053600.0, filed Jun. 25, 2018, 10 pages.
Office Action dated Feb. 15, 2023 for Chinese Application No. 201980049477.X, filed Jun. 11, 2019, 19 pages.
Office Action dated Nov. 15, 2022 for Taiwan Application No. 108120143, filed Jun. 11, 2019, 8 pages.
Office Action dated Mar. 16, 2023 for Korean Patent Application No. 10-2020-7002496, filed on Jun. 26, 2018, 3 pages.
Office Action dated Sep. 29, 2022 for Taiwan Application No. 108122878, filed Jun. 28, 2019, 9 pages.
Office Action dated Jul. 4, 2023 for Japanese Application No. 2019571598, filed Jun. 26, 2018, 34 pages.
Office Action dated Jan. 5, 2023 for Chinese Application No. 201980043907.7, filed Jun. 28, 2019, 14 pages.
Office Action dated Feb. 7, 2023 for Japanese Application No. 2019-571699, filed Jun. 25, 2018, 5 pages.
Office Action dated May 9, 2023 for Japanese Patent Application No. 2020-5204312, filed on Jun. 25, 2018, 6 pages.
Office Action dated May 9, 2023 for Japanese Patent Application No. 2020-563959, filed on Nov. 12, 2020, 5 pages.
International Preliminary Report on Patentability for International Application No. PCT/US2021/065174 dated Jul. 13, 2023, 9 pages.
Notice of Allowance dated Jul. 19, 2023 for U.S. Appl. No. 16/820,594, filed Mar. 16, 2020, 5 pages.
Office Action dated Jul. 4, 2023 for Korean Application No. 10-2020-7002533, filed Jun. 25, 2018, 3 pages.
Notice of Allowance dated Oct. 2, 2023 for U.S. Appl. No. 16/435,451, filed Jun. 7, 2019, 10 pages.
Notice of Allowance dated Oct. 4, 2023 for U.S. Appl. No. 17/242,152, filed Apr. 27, 2021, 9 pages.
Notice of Allowance dated Sep. 13, 2023 for U.S. Appl. No. 16/899,908, filed Jun. 12, 2020, 9 pages.
Notice of Allowance dated Aug. 18, 2023 for U.S. Appl. No. 17/496,712, filed Oct. 7, 2021, 12 pages.

* cited by examiner

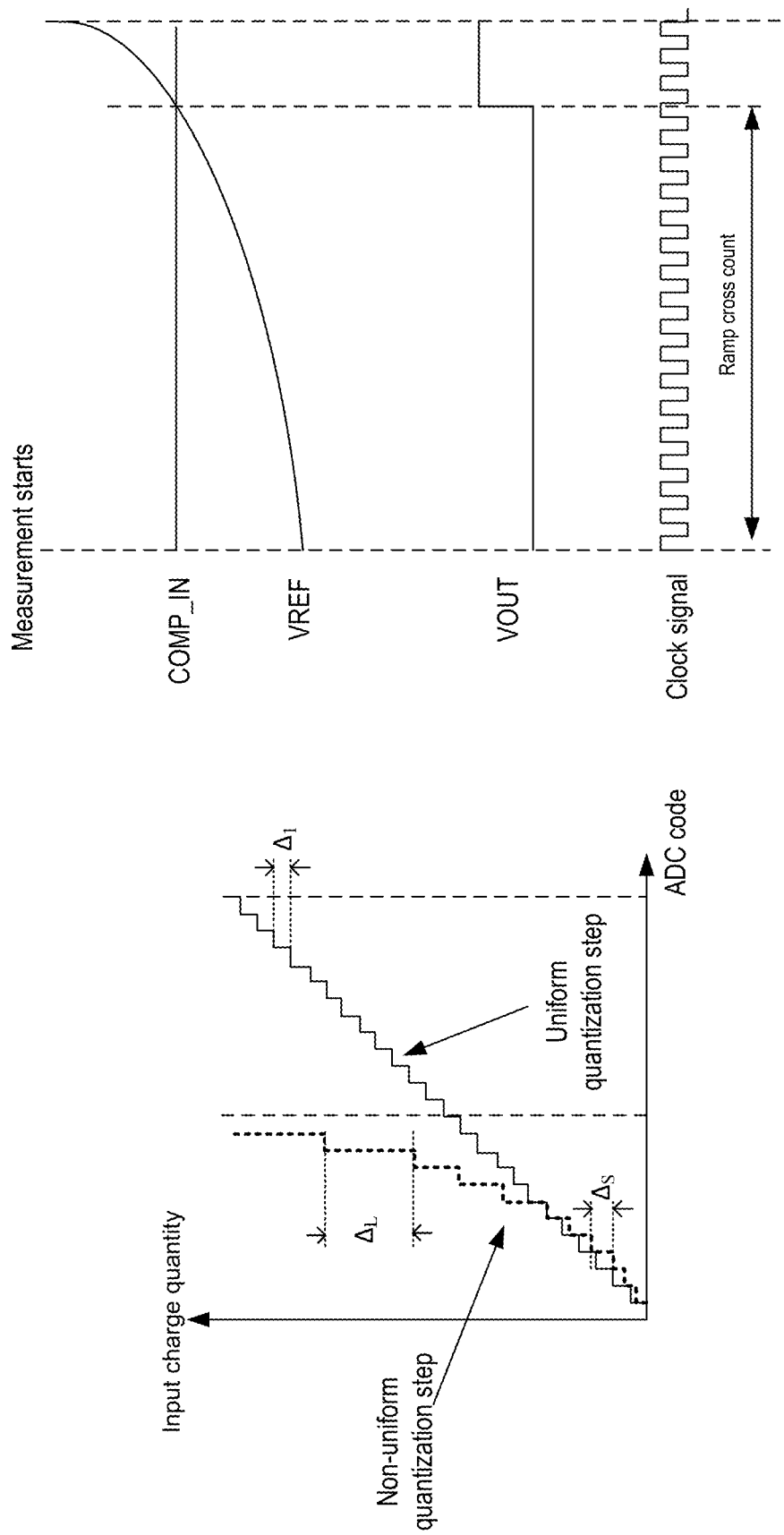

DIGITAL PIXEL SENSOR HAVING EXTENDED DYNAMIC RANGE

RELATED APPLICATION

This patent application claims priority to: (a) U.S. Application No. 62/916,403, titled "A DIGITAL PIXEL SENSOR" and filed on Oct. 17, 2019; (b) U.S. Application No. 62/953,436, titled "SINGLE-EXPOSURE MULTI-LINEAR-QUANTIZATION DIGITAL PIXEL SENSOR" and filed on Dec. 24, 2019; (c) U.S. Application No. 62/953,663, titled "HYBRID LINEAR-QUANTIZATION AND TIME-TO-SATURATION OPERATION IN COMPARATOR-SHARED DIGITAL PIXEL SENSOR" and filed on Dec. 26, 2019; and (d) U.S. Application No. 62/953,658, titled "HYBRID LINEAR-QUANTIZATION AND TIME-TO-SATURATION OPERATION IN DIGITAL PIXEL SENSOR" and filed on Dec. 26, 2019, which are assigned to the assignee hereof and are incorporated herein by reference in their entirety for all purposes.

BACKGROUND

The disclosure relates generally to image sensors, and more specifically to pixel cell structure, including interfacing circuitries for determining light intensity for image generation.

A typical pixel in an image sensor includes a photodiode to sense incident light by converting photons into charge (e.g., electrons or holes). To reduce image distortion, a global shutter operation can be performed in which each photodiode of the array of photodiodes senses the incident light simultaneously in a global exposure period to generate the charge. The charge can be converted by a charge sensing unit (e.g., a floating diffusion) to convert to a voltage, and the voltage can be quantized to generate a digital output to represent an intensity of the incident light. The photodiodes of an image sensor can also detect different frequency components of the incident light for different applications, such as 2D and 3D sensing, to provide digital outputs for generation of 2D and 3D images of a scene.

SUMMARY

The present disclosure relates to image sensors. More specifically, and without limitation, this disclosure relates to a pixel cell. This disclosure also relates to operating the circuitries of pixel cells to generate a digital representation of the intensity of incident light.

In one example, an apparatus is provided. The apparatus comprises: a photodiode configured to generate a charge in response to light within an exposure period and to accumulate at least a first part of the charge as a residual charge; a charge sensing unit configured to accumulate at least a second part of the charge as an overflow charge; a quantizer; and a controller configured to: within a first time within the exposure period, control the quantizer to perform a first quantization operation to quantize the overflow charge accumulated at the charge sensing unit to generate a first measurement output; within a second time after the first time, and within the exposure period, control the quantizer to perform a second quantization operation to quantize the overflow charge accumulated at the charge sensing unit to generate a second measurement output; and generate a digital output to represent an intensity of the light based on at least one of the first measurement output or the second measurement output.

In some aspects, the first quantization operation comprises comparing a first voltage representing a first quantity of the overflow charge with a ramping threshold voltage to determine a third time when the ramping threshold voltage becomes equal to the first voltage and generating the first measurement output based on the third time. The second quantization operation comprises comparing a second voltage representing a second quantity of the overflow charge with the ramping threshold voltage to determine a fourth time when the ramping threshold voltage becomes equal to the first voltage and generating the second measurement output based on the fourth time.

In some aspects, the apparatus further comprises a sample-and-hold circuit selectively coupled between the charge sensing unit and the quantizer. The controller is configured to: control the sample-and-hold circuit to couple with the charge sensing unit to sample a voltage output by the charge sensing unit; at the beginning of the first time, control the sample-and-hold circuit to disconnect from the charge sensing unit to hold the sampled voltage as the first voltage, and control the quantizer to quantize the first voltage when the sample-and-hold circuit is disconnected from the charge sensing unit; control the sample-and-hold circuit to couple with the charge sensing unit to sample a voltage output by the charge sensing unit; and at the beginning of the second time, control the sample-and-hold circuit to disconnect from the charge sensing unit to hold the sampled voltage as the second voltage, and control the quantizer to quantize the second voltage when the sample-and-hold circuit is disconnected from the charge sensing unit.

In some aspects, the controller is configured to: determine that the second quantity of the overflow charge reaches a saturation threshold of the charge sensing unit; and generate the digital output based on the first measurement output but not the second measurement output.

In some aspects, the beginning of the first time and the beginning of the second time are determined based on a duration of the exposure period, a full well capacity of the photodiode, a capacity of the charge sensing unit, a range of intensities to be measured by the first quantization operation and by the second quantization operation, and a target signal-to-noise ratio.

In some aspects, the beginning of the first time and the beginning of the second time are determined based on an intensity of the light that causes a total quantity of the overflow charge accumulated within the exposure period to reach the saturation threshold.

In some aspects, the controller is configured to: generate a first scaled measurement output based on scaling the first measurement output by a ratio between the duration of the exposure period and the first time; generate a second scaled measurement output based on scaling the second measurement output by a ratio between the duration of the exposure period and the second time; and generate the digital output based on at least one of the first scaled measurement output or the second scaled measurement output.

In some aspects, the first quantization operation comprises comparing a first voltage representing a first quantity of the overflow charge with a static threshold voltage representing a saturation threshold of the charge sensing unit to determine a third time when the first voltage becomes equal to the saturation threshold, and generating the first measurement output based on the third time. The second quantization operation comprises comparing a second voltage representing a second quantity of the overflow charge with a ramping threshold voltage to determine a fourth time when the ramping threshold voltage becomes equal to the first voltage, and generating the second measurement output based on the fourth time.

In some aspects, the controller is configured to: based on the first measurement output indicating that the first quantity reaches the saturation threshold, generate the digital output based on the first measurement output but not the second measurement output.

In some aspects, the apparatus further comprises a sample-and-hold circuit selectively coupled between the charge sensing unit and the quantizer. The controller is configured to: control the sample-and-hold circuit to couple with the charge sensing unit to sample a voltage output as the first voltage; at the first time, control the quantizer to quantize the first voltage when the sample-and-hold circuit is coupled with the charge sensing unit; control the sample-and-hold circuit to couple with the charge sensing unit to sample a voltage output by the charge sensing unit; and within the second time, control the sample-and-hold circuit to disconnect from the charge sensing unit to hold the sampled voltage as the second voltage, and control the quantizer to quantize the second voltage when the sample-and-hold circuit is disconnected from the charge sensing unit.

In some aspects, wherein a duration of the first time is based on a target signal-to-noise ratio.

In some aspects, the digital output is a first digital output. The controller is configured to, after the exposure period: control the quantizer to measure at least one of: a total quantity of the residual charge accumulated within the exposure period, or a total quantity of the overflow charge accumulated within the exposure period, to generate a second digital output; and provide one of the first digital output or the second digital output to represent the intensity of the light.

In some aspects, the photodiode is a first photodiode configured to detect a first frequency component of the light; the charge sensing unit is a first charge sensing unit; the charge is a first charge; the overflow charge is a first overflow charge; the residual charge is a first residual charge; the exposure period is a first exposure period; the digital output is a first digital output to represent the intensity of the first frequency component. The apparatus further comprises: a second photodiode configured to generate a second charge in response to a second frequency component of the light within a second exposure period and to accumulate at least a first part of the second charge as a second residual charge; and a second charge sensing unit configured to accumulate at least a second part of the second charge as a second overflow charge within the second exposure period. The controller is configured to: within a third time within the second exposure period, control the quantizer to quantize the second overflow charge accumulated at the second charge sensing unit to generate a third measurement output; within a fourth time after the third time within the second exposure period, control the quantizer to quantize the second overflow charge accumulated at the second charge sensing unit to generate a fourth measurement output; and generate a second digital output based on at least one of the third measurement output or the fourth measurement output. A first start time of the second exposure period is delayed from a second start time of the second exposure period by a start offset, the start offset being based on a total duration of the first quantization operation and the second quantization operation.

In some aspects, the controller is configured to: after the first exposure period ends, control the quantizer to measure at least one of: a total quantity of the first residual charge accumulated within the first exposure period, or a total quantity of the first overflow charge accumulated within the first exposure period, to generate a third digital output. After the second exposure period ends, control the quantizer to measure at least one of: a total quantity of the second residual charge accumulated within the second exposure period, or a total quantity of the second overflow charge accumulated within the second exposure period, to generate a fourth digital output.

In some aspects, the third digital output is generated before the fourth digital output. The second exposure period ends after the first exposure period ends. The first exposure period and the second exposure period have the same duration.

In some aspects, the third digital output is generated after the fourth digital output. The second exposure period ends before the first exposure period ends. The first exposure period is center-aligned with the second exposure period.

In some aspects, the quantizer comprises: an inverter; a first capacitor and a second capacitor, a right plate of each of the first capacitor and the second capacitor being coupled with an input of the inverter; and a switchable feedback path coupled between the input and an output of the inverter. The controller is configured to, during a reset phase: couple a left plate of each of the first capacitor and the second capacitor with a reset voltage, and enable the feedback path to couple the input with the output of the inverter. The controller is further configured to, during a comparison phase: couple the left plate of the first capacitor with an output of the charge sensing unit; couple the left plate of the second capacitor with a reference voltage; and disable the feedback path.

In some aspects, the feedback path comprises one or more diodes.

In some aspects, the apparatus further comprises a memory to store the digital output. The memory receives first signals having a first voltage swing during a write operation to store the digital output. The memory outputs second signals having a second voltage swing during a read operation for the digital output. The first voltage swing is smaller than the second voltage swing.

In one example, a method is provided. The method comprises: enabling a photodiode to generate a charge in response to light within an exposure period and to accumulate at least a first part of the charge as a residual charge; enabling a charge sensing unit to accumulate at least a second part of the charge as an overflow charge; within a first time within the exposure period, controlling a quantizer to perform a first quantization operation to quantize the overflow charge accumulated at the charge sensing unit to generate a first measurement output; within a second time after the first time ends, and within the exposure period, controlling the quantizer to perform a second quantization operation to quantize the overflow charge accumulated at the charge sensing unit to generate a second measurement output; and generating a digital output representing an intensity of the light based on at least one of the first measurement output or the second measurement output.

BRIEF DESCRIPTION OF THE DRAWINGS

Illustrative examples are described with reference to the following figures.

FIG. 11A, FIG. 11B, FIG. 11C, and FIG. 11D illustrate techniques for performing quantization.

Figure 1A:
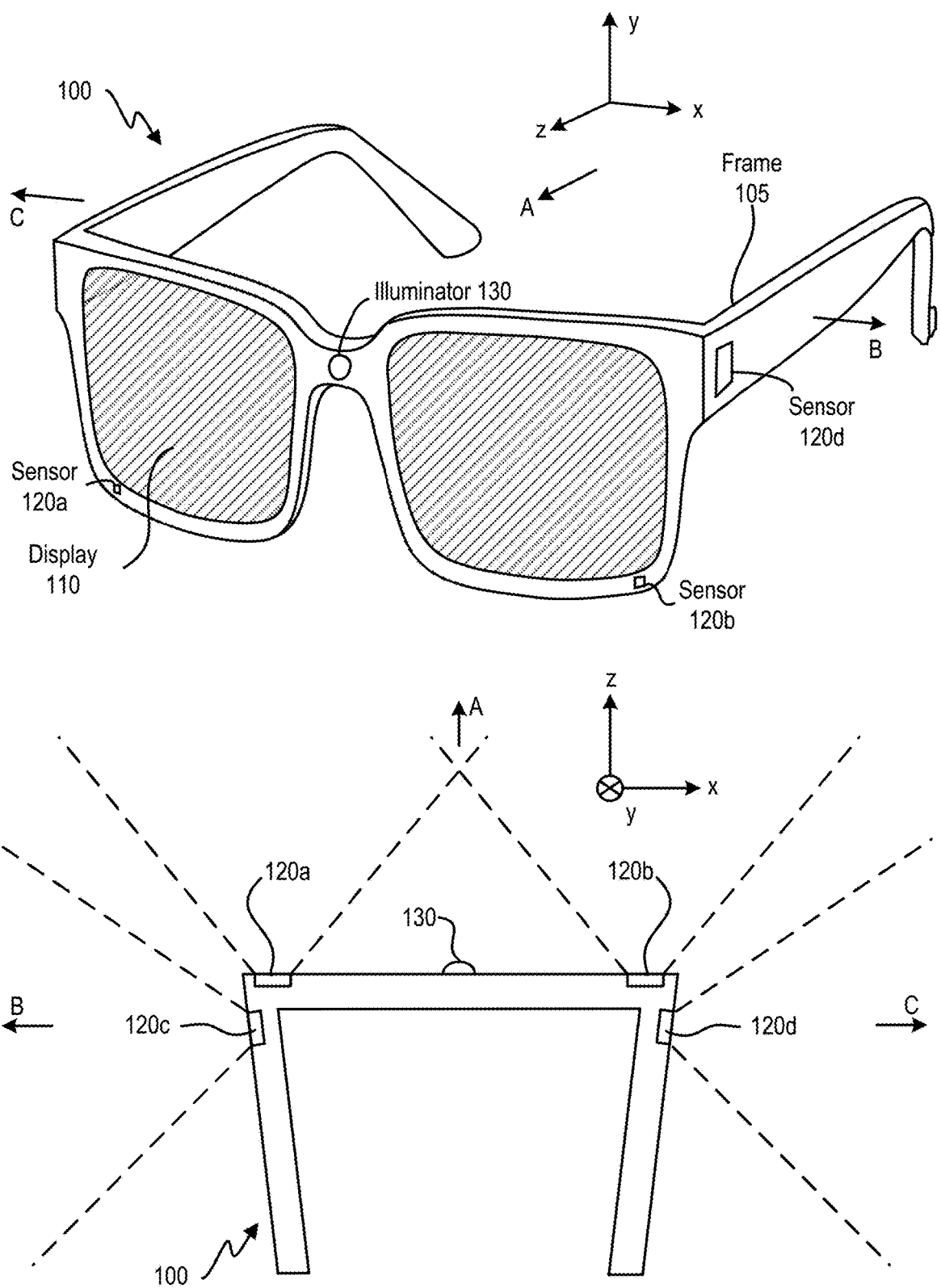
FIG. 1A and FIG. 1B are diagrams of an example of a near-eye display.

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

A typical image sensor includes an array of pixel cells. Each pixel cell includes a photodiode to measure the intensity incident light by converting photons into charge (e.g., electrons or holes). The charge generated by the photodiode can be converted to a voltage by a charge sensing unit, which can include a floating drain node. The voltage can be quantized by an analog-to-digital converter (ADC) into a digital value. The digital value can represent an intensity of light received by the pixel cell and can form a pixel, which can correspond to light received from a spot of a scene. An image comprising an array of pixels can be derived from the digital outputs of the array of pixel cells.

An image sensor can be used to perform different modes of imaging, such as 2D and 3D sensing. The 2D and 3D sensing can be performed based on light of different wavelength ranges. For example, visible light can be used for 2D sensing, whereas invisible light (e.g., infra-red light) can be used for 3D sensing. An image sensor may include an optical filter array to allow visible light of different optical wavelength ranges and colors (e.g., red, green, blue, monochrome) to a first set of pixel cells assigned for 2D sensing, and invisible light to a second set of pixel cells assigned for 3D sensing.

To perform 2D sensing, a photodiode at a pixel cell can generate charge at a rate that is proportional to an intensity of visible light component (e.g., red, green, blue, monochrome) incident upon the pixel cell, and the quantity of charge accumulated in an exposure period can be used to represent the intensity of visible light (or a certain color component of the visible light). The charge can be stored temporarily at the photodiode and then transferred to a capacitor (e.g., a floating diffusion) to develop a voltage. The voltage can be sampled and quantized by an analog-to-digital converter (ADC) to generate an output corresponding to the intensity of visible light. An image pixel value can be generated based on the outputs from multiple pixel cells configured to sense different color components of the visible light (e.g., red, green, and blue colors).

Moreover, to perform 3D sensing, light of a different wavelength range (e.g., infra-red light) can be projected onto an object, and the reflected light can be detected by the pixel cells. The light can include structured light, light pulses, etc. The pixel cells outputs can be used to perform depth sensing operations based on, for example, detecting patterns of the reflected structured light, and/or measuring a time-of-flight of the light pulse. To detect patterns of the reflected structured light, a distribution of quantities of charge generated by the pixel cells during the exposure period can be determined, and pixel values can be generated based on the voltages corresponding to the quantities of charge. For time-of-flight measurement, the timing of generation of the charge at the photodiodes of the pixel cells can be determined to represent the times when the reflected light pulses are received at the pixel cells. Time differences between when the light pulses are projected to the object and when the reflected light pulses are received at the pixel cells can be used to provide the time-of-flight measurement.

A pixel cell array can be used to generate information of a scene. In some examples, each pixel cell (or at least some of the pixel cells) of the pixel cell array can be used to perform collocated 2D and 3D sensing at the same time. For example, a pixel cell may include multiple photodiodes, each configured to convert a different spectral component of light to charge. For 2D sensing, a photodiode can be configured to convert visible light (e.g., monochrome, or for a color of a particular frequency range) to charge, whereas another photodiode can be configured to convert infra-red light to charge for 3D sensing. Having the same set of pixel cells to perform sensing of different spectral components of light can facilitate the correspondence between 2D and 3D images of different spectral components of light generated by the pixel cells. Moreover, given that every pixel cell of a pixel cell array can be used to generate the image, the full spatial resolution of the pixel cell array can be utilized for the imaging.

The 2D and 3D imaging data can be fused for various applications that provide virtual reality (VR), augmented reality (AR) and/or mixed reality (MR) experiences. For example, a wearable VR/AR/MR system may perform a scene reconstruction of an environment in which the user of the system is located. Based on the reconstructed scene, the VR/AR/MR can generate display effects to provide an interactive experience. To reconstruct a scene, the 3D image data can be used to determine the distances between physical objects in the scene and the user. Moreover, 2D image data can capture visual attributes including textures, colors, and reflectivity of these physical objects. The 2D and 3D image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D image data, the VR/AR/AR system can extract certain image features to identify an object. Based on the 3D image data, the VR/AR/AR system can track a location of the identified object relative to the wearable device worn by the user. The VR/AR/AR system can track the head movement based on, for example, tracking the change in the location of the identified object relative to the wearable device as the user's head moves.

To improve the correlation of 2D and 3D image data, an array of pixel cells can be configured to provide collocated imaging of different components of incident light from a spot of a scene. Specifically, each pixel cell can include a plurality of photodiodes and a plurality of corresponding charge sensing units. Each photodiode of the plurality of photodiodes is configured to convert a different light component of incident light to charge. To enable the photodiodes to receive different light components of the incident light, the photodiodes can be formed in a stack which provides different absorption distances for the incident light for different photodiodes, or can be formed on a plane under an array of optical filters. Each charge sensing unit includes one or more capacitors to sense the charge of the corresponding photodiode by converting the charge to a voltage, which can be quantized by an ADC to generate a digital representation of an intensity of an incident light component converted by each photodiode. The ADC includes a comparator. As part of a quantization operation, the comparator can compare the voltage with a reference to output a decision. The output of the comparator can control when a memory stores a value from a free-running counter. The value can provide a result of quantizing the voltage.

One major challenge of including multiple photodiodes in a pixel cell is how to reduce the size and power consumption of the pixel cell, which can impact a number of pixel cells that can be fit into a pixel cell array. The number of pixel cells in a pixel cell array can dominate the available resolution of the imaging. Specifically, in addition to the photodiodes, a pixel cell may include processing circuits to support measurement of the charge generated by each photodiode and to support the generation of a pixel value based on the measurements. Moreover, each pixel cell may also include memory devices (e.g., static random-access memory (SRAM)) to store the measurement results while waiting to fetch the measurement results to the VR/AR/AR application for processing. The processing circuits and memory devices typically have considerable footprints and consume considerable amounts of power. For example, a pixel cell may include a charge sensing unit, which includes one or more charge storage devices (e.g., a floating drain node, a capacitor) to store the charge generated by a photodiode and to convert the charge to a voltage, and a buffer to buffer the voltage. Moreover, the processing circuits may include a quantizer to quantize the voltage to a digital value. The quantizer typically includes a comparator, which includes analog circuits (e.g., differential pair, output stage, current source), which have large footprints and consume lots of power. Further, the memory devices typically include multiple memory banks (e.g., SRAM cells) to store the bits of the measurement result. The memory devices also have significant footprints and can consume lots of power, especially if the memory devices are constructed using high bandwidth transistor devices to improve the operation speed.

Besides footprint and power, there are other performance metrics of an image sensor, such as dynamic range, power, and frame rate. The dynamic range can refer to a range of light intensities measurable by the image sensor. For dynamic range, the upper limit can be defined based on the linearity of the light intensity measurement operation provided by the image sensor, whereas the lower limit can be defined based on the noise signals (e.g., dark charge, thermal noise) that affect the light intensity measurement operation. On the other hand, various factors can affect the frame rate, which can refer to the amount of time it takes for the image sensor to generate an image frame. The factors may include, for example, the time of completion of the quantization operation and various delays introduced to the quantization operation.

To increase the dynamic range of the light intensity measurement operation, the ADC can quantize the voltages based on different quantization operations associated with different intensity ranges. Specifically, each photodiode can generate a quantity of charge within an exposure period, with the quantity of charge representing the incident light intensity. Each photodiode also has a quantum well to store at least some of the charge as residual charge. The quantum well capacity can be set based on a bias voltage on the switch between the photodiode and the charge sensing unit. For a low light intensity range, the photodiode can store the entirety of the charge as residual charge in the quantum well. In a quantization operation to measure residual charge ("PD ADC quantization operation"), the ADC can quantize a first voltage generated by the charge sensing unit from sensing a quantity of the residual charge to provide a digital representation of the low light intensity. As the residual charge is typically much less susceptible to dark current in the photodiode, the noise floor of the low light intensity measurement can be lowered, which can further extend the lower limit of the dynamic range.

Moreover, for a medium light intensity range, the quantum well can be saturated by the residual charge, and the photodiode can transfer the remaining charge as overflow charge to the charge sensing unit, which can generate a second voltage from sensing a quantity of the overflow charge. In a quantization operation to measure the overflow charge ("FD ADC quantization operation"), the ADC can quantize the second voltage to provide a digital representation of the medium light intensity. For both low and medium light intensities, the one or more capacitors in the charge sensing unit are not yet saturated, and the magnitudes of the first voltage and second voltage correlate with the light intensity. Accordingly for both low and medium light intensities, the comparator of the ADC can compare the first voltage or second voltage against a ramping voltage to generate a decision. The decision can control the memory to store a counter value which can represent a quantity of residual charge or overflow charge.

For a high light intensity range, the overflow charge can saturate the one or more capacitors in the charge sensing unit. As a result, the magnitudes of the second voltage no longer track the light intensity, and non-linearity can be introduced to the light intensity measurement. To reduce the non-linearity caused by the saturation of the capacitors, the ADC can perform a time-to-saturation (TTS) measurement operation within the exposure period by comparing the second voltage, which can keep rising or falling as additional charge is accumulated at the charge sensing unit, with a static threshold to generate a decision. When the second voltage reaches the static threshold, a decision can be generated to control the memory to store a counter value. The counter value can represent a time when the second voltage reaches a saturation threshold.

Compared with FD ADC and PD ADC, in which the counter value can be linearly related to the incident light intensity, in TTS measurement the counter value can be non-linearly related to the incident light intensity, where the second voltage reaches the static threshold within a shorter time when the incident light intensity increases and vice versa. Moreover, the duration of the TTS measurement operation, as well as the duration of the exposure period, are typically controlled by a controller based on a clock signal supplied to the controller. In some examples, the controller can completely align the TTS measurement operation with the exposure period, such that they start and end at the same time to have the same duration, and the duration can be set based on the cycle period of the clock signal. The cycle period of the clock signal can be set based on a target operation speed of the controller, which can be adjusted based on, for example, a frame rate, and/or a power target, of the image sensor.

Although the TTS measurement operation can reduce the non-linearity caused by the saturation of the capacitors and increase the upper limit of the dynamic range, various issues can arise if the TTS measurement period aligns completely, or at least scales up linearly, with the exposure period. One potential issue is power consumption. Specifically, during the TTS measurement operation both the voltage buffer of the charge sensing unit and the comparator of the quantizer are powered on to compare the second voltage with the static threshold to generate the decision. Both the voltage buffer and the comparator are analog devices and can consume huge static power when powered on. If the exposure period has a relatively long duration, and the TTS measurement operation is performed within the entirety of the exposure period, both the voltage buffer and the comparator can consume huge amount of power for a long period of time, leading to huge power consumption at the image sensor. The exposure period for the photodiode can be extended due to various reasons. For example, as explained above, the exposure period can be extended due to a lower operation speed of the controller for a lower frame rate or a reduced power target, of the image sensor. Moreover, in a case where the image sensor operates in a low ambient light environment, the exposure period can be extended to allow the photodiode to generate more charge within the exposure period for measurement, which can reduce the signal-to-noise ratio.

Conceptual Overview of Certain Examples

Examples of the present disclosure relate to an image sensor that can address at least some of the issues above. In one example, the image sensor includes a plurality of pixel cells and a controller. Each pixel cell can include one or more photodiodes configured to generate a charge in response to light. The image sensor further includes one or more charge sensing units and one or more quantizers. During an exposure period, the one or more photodiodes can generate charge in response to incident light and can store the store the charge as residual charge until the photodiodes are saturated, and can output the remaining charge as overflow charge. The charge sensing unit can include a capacitor to convert the charge (e.g., overflow charge in the FD ADC mode, residual charge in the PD ADC mode) to a voltage and a voltage buffer to buffer the voltage, whereas the quantizer can quantize the buffered voltage into a digital value. The quantizer can include a comparator, a memory, and a counter. The counter can start when the comparator starts comparing the voltage output by the charge sensing unit against a threshold to generate a decision, and the decision can determine when a counter value from the counter is stored in the memory. In some examples, the charge sensing unit and the quantizer can be part of the pixel cell so that each pixel cell includes its own charge sensing unit and the quantizer. In some examples, at least one of the charge sensing unit or the quantizer can be shared among the plurality of pixel cells.

Various techniques are proposed to reduce the power and footprint of the quantizer and the memory. In one example, the comparator can be implemented using an inverter circuit having a single input and a single output. Specifically, the quantizer further includes a first capacitor and a second capacitor connected with the input of the inverter circuit. The inverter circuit further includes a switchable feedback path. The inverter circuit can operate in two phases, including a reset phase and a comparison phase. In the reset phase, the feedback path can be enabled to connect the input and output of the inverter circuit to store an inverter threshold voltage at the first and second capacitors. In the comparison phase, the feedback path can be disabled. The first capacitor can be electrically coupled across the input of the inverter and the charge sensing unit, whereas the second capacitor can be coupled across the input of the inverter and a reference voltage generator that generates a negative reference voltage. Based on charge sharing between the two AC capacitors, the input voltage of the inverter circuit can become equal to the inverter threshold voltage offset by a difference between the output voltage of the charge sensing unit and the reference voltage. If the output voltage of the charge sensing unit exceeds the reference voltage, the input voltage of the inverter may exceed the inverter threshold, and the inverter can output a logical one. On the other hand, if the output voltage of the charge sensing unit is below the reference voltage, the inverter can output a logical zero. With such arrangements, the inverter can generate an output that represents a comparison result between the output voltage of the charge sensing unit and the inverter threshold.

Compared with an analog comparator that typically has a large footprint and uses a lot of power, an inverter-based comparator can have a much smaller footprint and uses much less power. In addition, the switchable feedback path can include a device having a voltage-dependent impedance, such as a diode, to reduce the thermal noise introduced the first and second AC capacitor, which allows both capacitors to be smaller to achieve a certain noise performance. All these can improve the footprint and power of the quantizer.

In addition, the counter values can be written into the memory via a low swing operation to reduce power consumption in charging and discharging various peripheral components of the memory, such as bit lines. Specifically, each bit cell of the memory may include a pair of cross-coupled inverters that store a pair of differential logic bit states, as well as a pair of pass-gate transistors connected between the inverters and the bit lines to provide to read and write access to the differential logic bit states. The pair of cross-coupled inverters can be connected between a first variable voltage source and a second variable voltage source that sets a voltage swing in the pair of cross-coupled inverters. During the write operation, the first and second variable voltage sources can set a low voltage swing in the pair of cross-coupled inverters, such that the logic states of the pair of cross-coupled inverters can be programmed by a low swing signal in the bit line. The transistors of the inverters can be in a deep sub-threshold state while the inverters store the logic bit state. During the read operation, the first and second variable voltage sources can set a larger voltage swing (e.g., full swing between ground and supply voltage) in the pair of cross-coupled inverters. Such arrangements enable the inverters to drive the bit line with a strong signal, to ensure that the logic state stored in the inverters are read out accurately.

In some examples, a multi-stage bit line driver having limited low-swing between stages can be provided to further increase the driving strength of the bit line signals, which may be necessary, especially in a case where the bit lines are connected to other circuits external to the image sensor. The multi-stage bit line driver may include multiple inverters connected in a ring structure to form a feedback loop to limit the voltage swings between the inverters, while allowing a large voltage swing at the driver output to drive the bit line with a strong signal, to limit power consumption in charging and discharging internal nodes of the driver.

In addition, various techniques are proposed to reduce the power consumption of the TTS measurement operation, while retaining the improvement in the dynamic range brought about by the TTS measurement operation. In one example, instead of measuring the time it takes for the overflow charge to exceed a saturation threshold during the exposure time, multiple linear quantization operations of a quantity of overflow charge stored in the charge sensing unit can be performed at multiple time points within the exposure period. The time points can be determined to ensure that the charge sensing unit is not saturated by overflow charge, yet also has a certain minimum quantity of overflow charge, at at least one of the time points for a range of intensities of light to be measured by the time-to-saturation measurement operation. The time points can be determined based on, for example, the duration of the exposure period, the full well capacity of the photodiode, the capacity of the capacitor of the charge sensing unit, and a target signal-to-noise ratio of the image sensor.

In yet another example, a hybrid TTS and linear quantization operation can be performed within the exposure period, in which a short TTS measurement operation can be performed within a duration at the beginning of the exposure period to target for very high intensity of light, followed by one or more linear quantization operations. The TTS measurement operation can be performed in a fixed duration or in a duration that is separately programmable from that of the exposure period. The TTS measurement operation ("short TTS measurement operation") can be targeted at a higher end of a range of light intensities to be measured by a TTS measurement that extends over the entirety of the exposure period ("long TTS measurement operation"). Following the TTS measurement operations, while within the exposure period, one or more linear quantization operations of a quantity of overflow charge stored in the charge sensing unit can be performed, to target at the rest of the range of light intensities to be covered by the long TTS measurement operation. In both examples, various circuits, such as the voltage buffer of the charge sensing unit and the comparator of the quantizer, need not be enabled through the entirety of the exposure period and can be enabled only during the linear quantization operations. The power consumption can be reduced as a result.

The aforementioned techniques can be applied to an image sensor comprising multiple photodiodes sharing a comparator as well. In one example, the one or more photodiodes of the image sensor can include a first photodiode and a second photodiode. The image sensor further includes a first charge sensing unit, a second charge sensing unit, a quantizer, and a controller. Within a first exposure period, the first photodiode can generate a first charge and accumulate part of the first charge as first residual charge, and store the rest of the first charge as first overflow charge at the first charge sensing unit. Moreover, within a second exposure period, the second photodiode can generate a second charge and accumulate part of the second charge as second residual charge, and store the rest of the second charge as second overflow charge at the second charge sensing unit.

In one example, the start of the second exposure period can be delayed from the start of the first exposure period by a first duration to accommodate for the multiple linear quantization operation or the hybrid TTS and linear quantization operations performed by the shared quantizer. Moreover, the end of the second exposure period can be delayed from the end of the first exposure period by a second duration to accommodate for the FD ADC and PD ADC operations for the first photodiode. In another example, the end of the second exposure period can end before the first exposure period ends to accommodate for the FD ADC and PD ADC operations for the second photodiode, and the first exposure period and the second exposure period can be center aligned. Aligning the centers of the exposure periods can reduce the motion artifacts. This is because the charge generated from an exposure period can represent an average intensity of light received by a photodiode within the exposure period. By aligning the centers of the exposure periods, it becomes more likely that the digital outputs represent the intensities of light captured by the photodiodes at the same time that corresponds to the centers of the exposure periods, rather than the intensities of light captured at different times. As a result, the motion artifacts caused by the different durations of exposure periods can be reduced or at least mitigated.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a simultaneous localization and mapping (SLAM) algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of view, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infra-red light, ultra-violet light), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green, or blue colors). The second pixel array (for IR light sensing) can also be overlaid with a filter that allows only IR light through, with each pixel of the second pixel array being configured to measure intensity of IR lights. The pixel arrays can generate an red-green-blue (RGB) image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensity. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensity associated with different operating environments for near-eye display 100.

Figure 1B:
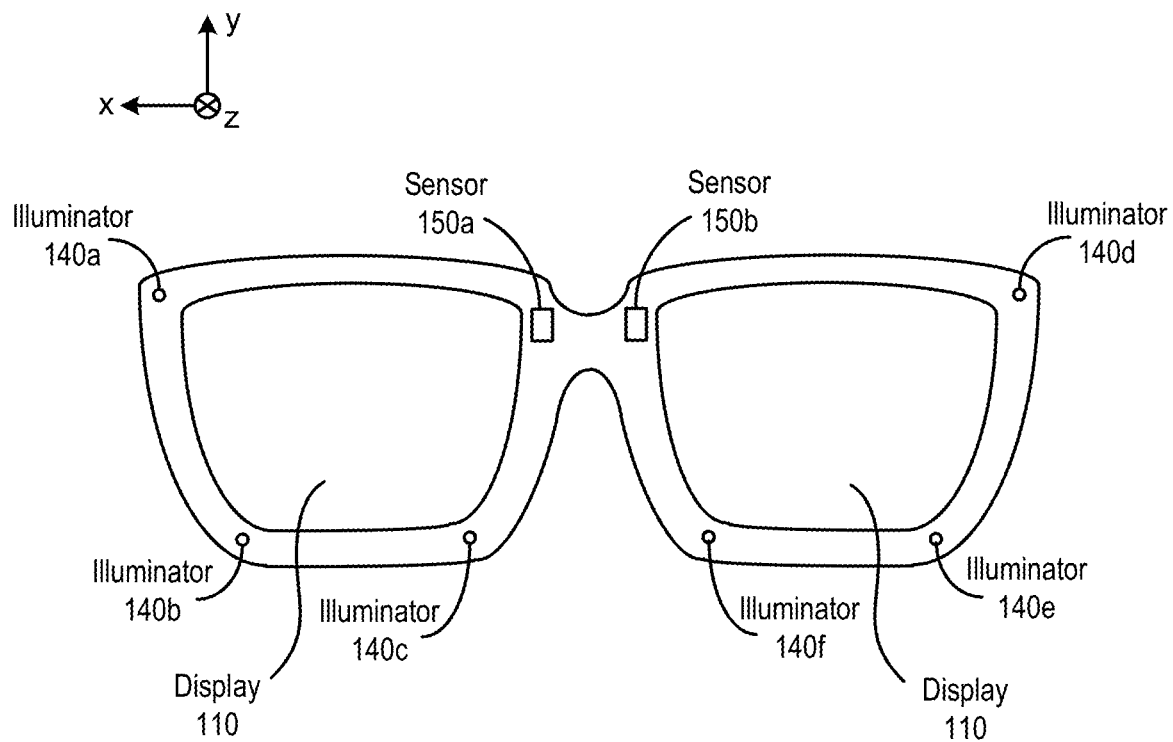

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., near infra-red (NIR)) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 150a-150b may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 150a-150b need to generate images of the eyeball at high speed. For example, the rate at which the image sensors generate an image frame (the frame rate) needs to at least match the speed of movement of the eyeball. The high frame rate requires short total exposure period for all of the pixel cells involved in generating the image frame, as well as high speed for converting the sensor outputs into digital values for image generation. Moreover, as discussed above, the image sensors also need to be able to operate at an environment with low light intensity.

Figure 1B:
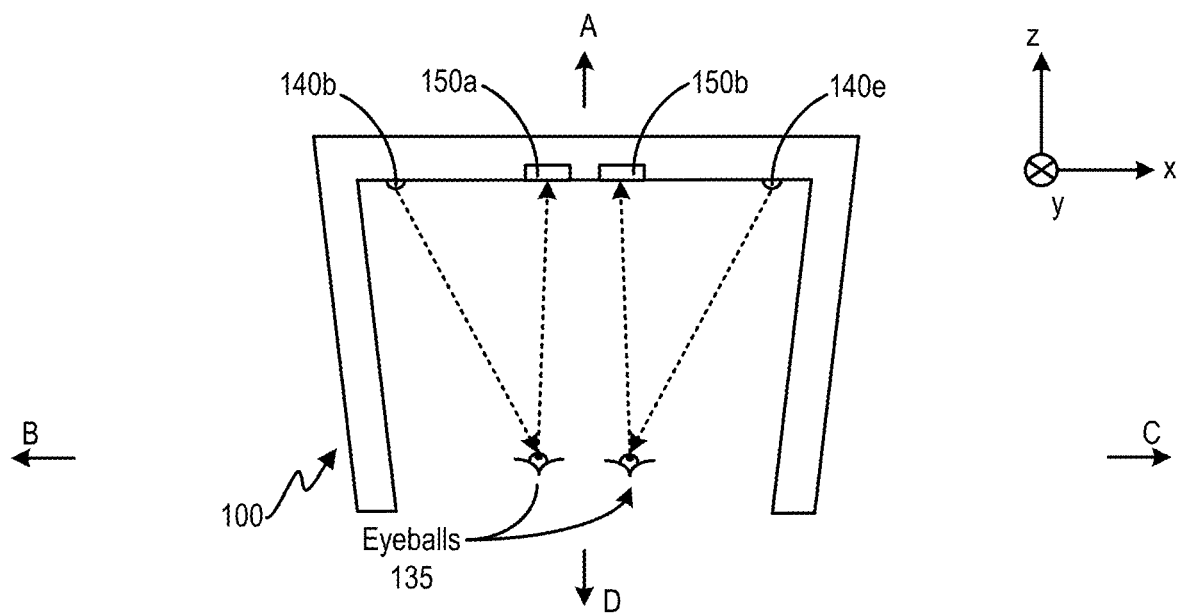
Figure 2:
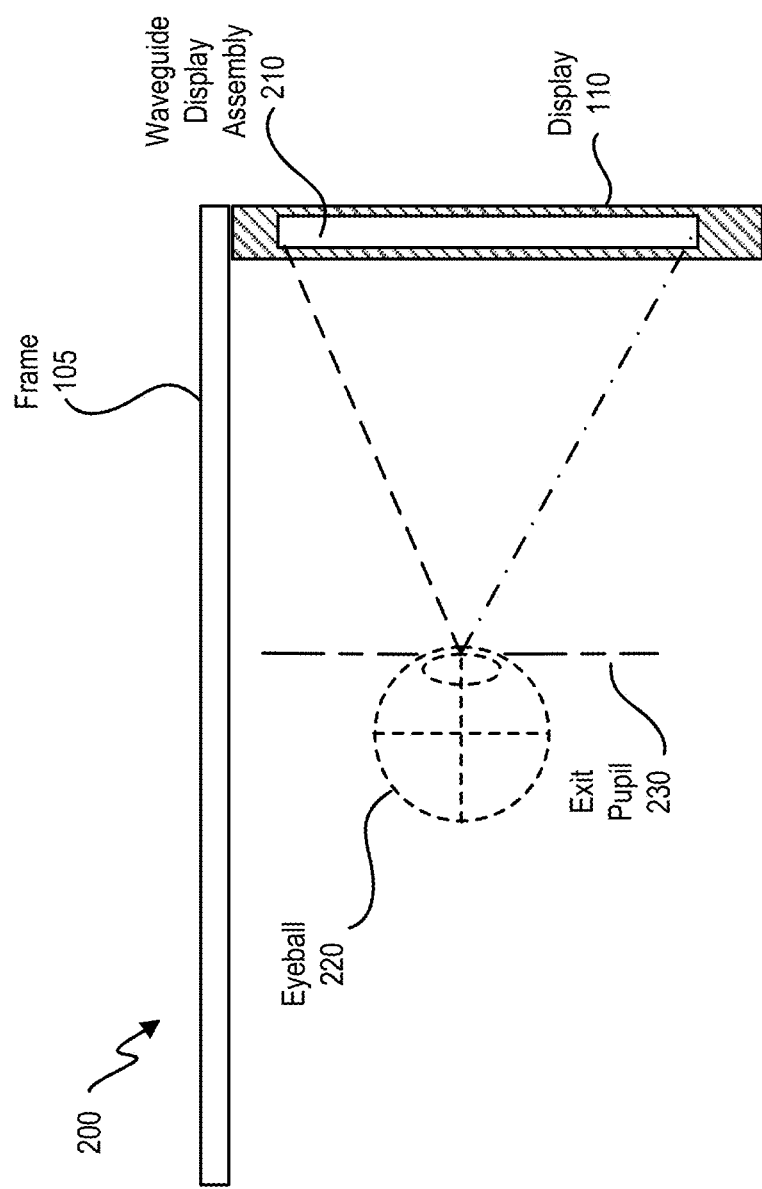
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display and/or a varifocal waveguide display. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
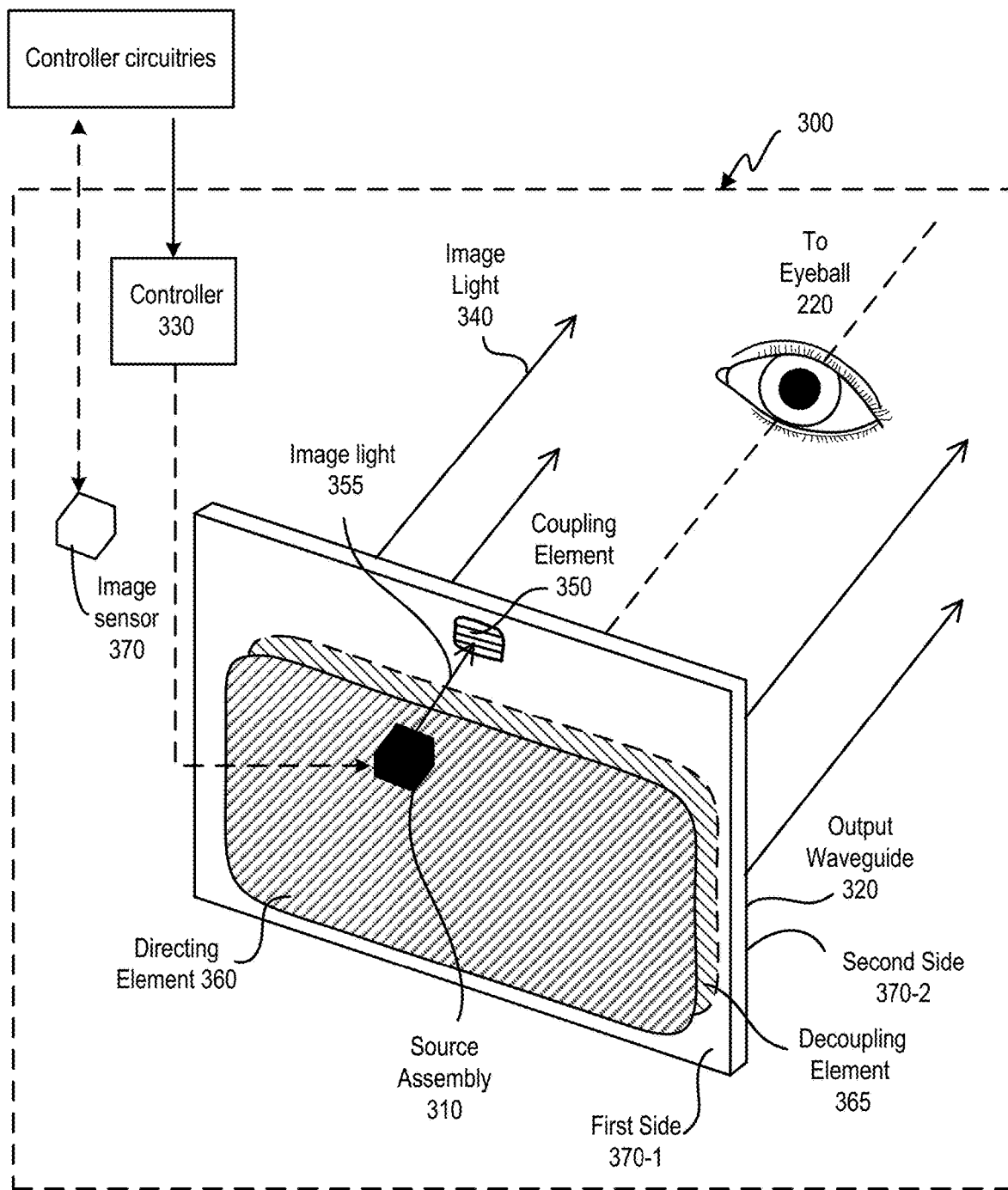
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1, and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365, such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user and/or a gaze point of the user, and determine the content of the images to be displayed to the user. The remote console can transmit instructions to controller 330 related to the determined content. Based on the instructions, controller 330 can control the generation and outputting of image light 355 by source assembly 310.

Figure 4:
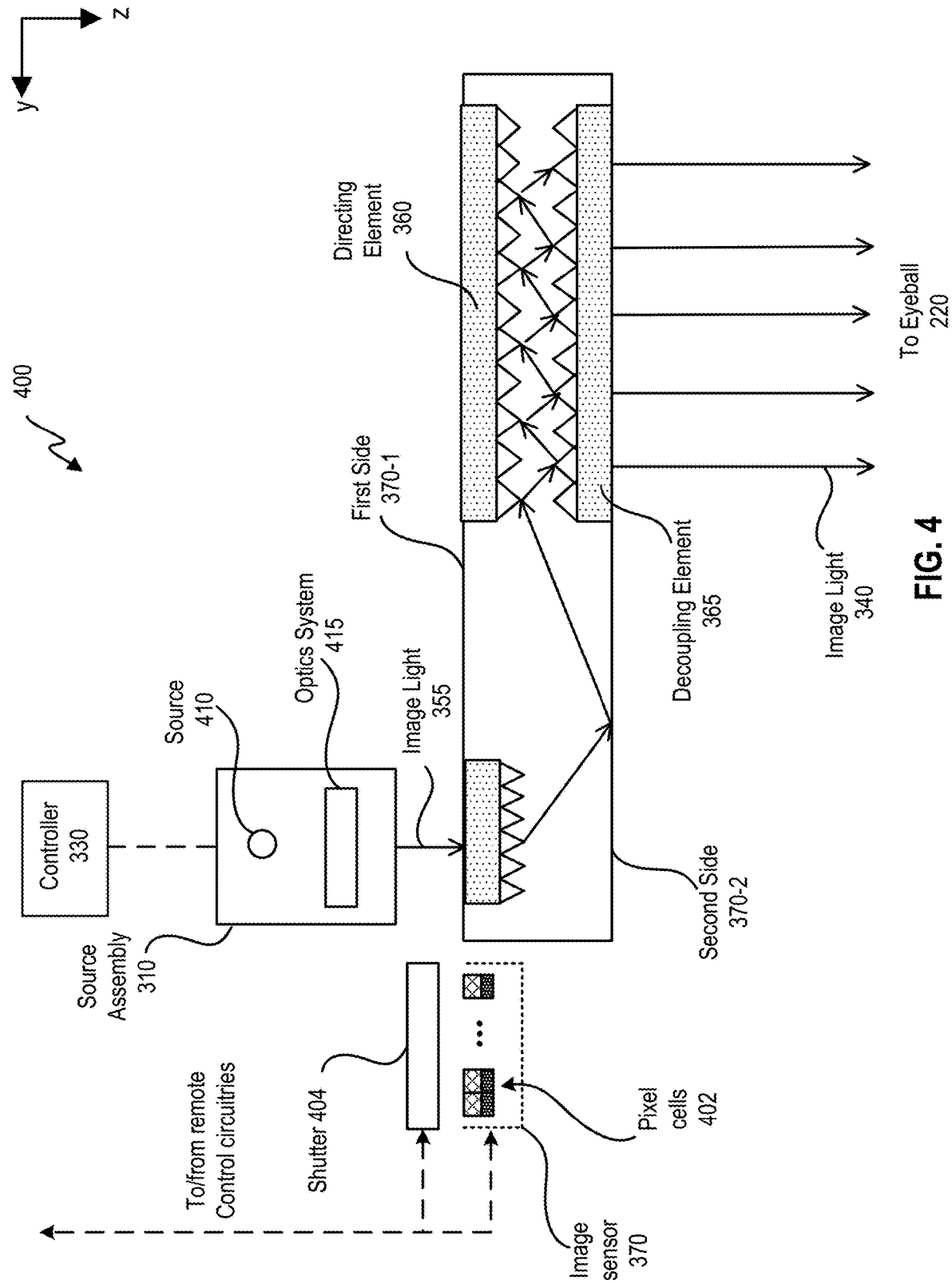
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370 of FIG. 3. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
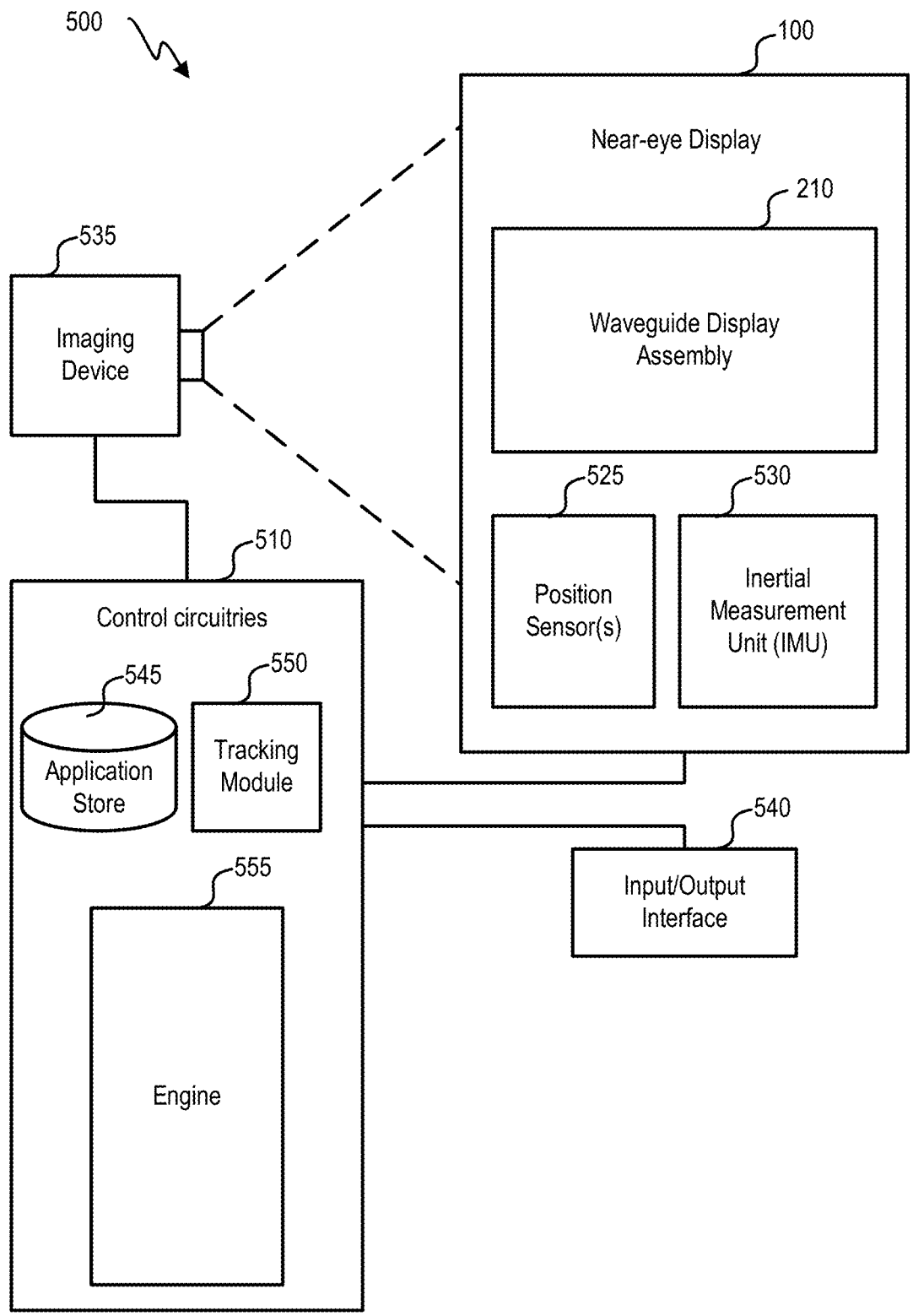
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), or a distance between an object and user (e.g., based on image data provided by imaging device 535).

Figure 6:
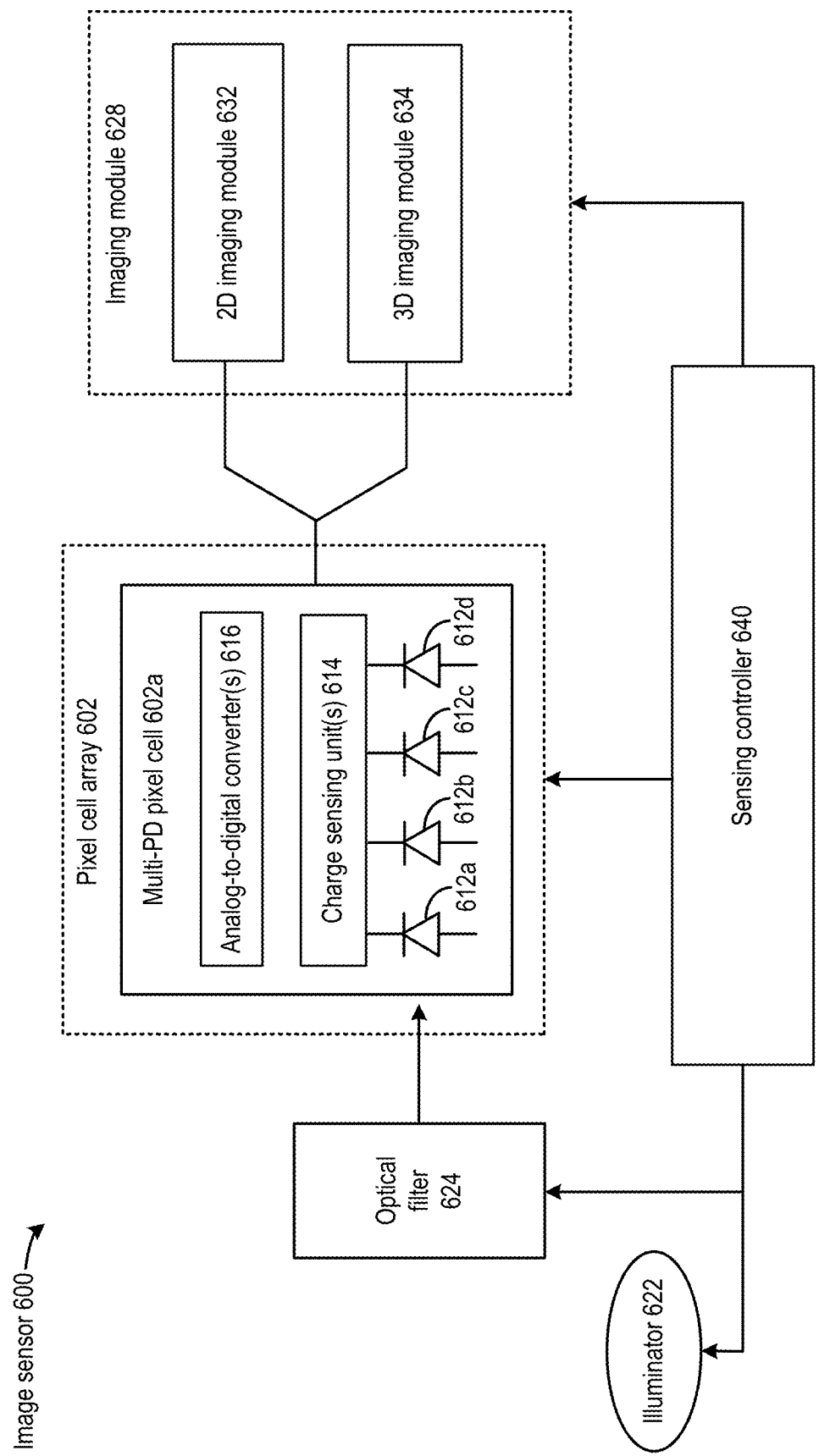
FIG. 6 illustrates block diagrams of examples of an image sensor.

FIG. 6 illustrates an example of an image sensor 600. Image sensor 600 can be part of near-eye display 100, and can provide 2D and 3D image data to control circuitries 510 of FIG. 5 to control the display content of near-eye display 100. As shown in FIG. 6, image sensor 600 may include an array of pixel cells 602, including pixel cell 602a. Pixel cell 602a can include a plurality of photodiodes 612 including, for example, photodiodes 612a, 612b, 612c, and 612d, one or more charge sensing units 614, and one or more quantizers/analog-to-digital converters 616. The plurality of photodiodes 612 can convert different components of incident light to charge. For example, photodiode 612a-612c can correspond to different visible light channels, in which photodiode 612a can convert a visible blue component (e.g., a wavelength range of 450-490 nanometers (nm)) to charge. Photodiode 612b can convert a visible green component (e.g., a wavelength range of 520-560 nm) to charge. Photodiode 612c can convert a visible red component (e.g., a wavelength range of 635-700 nm) to charge. Moreover, photodiode 612d can convert an infra-red component (e.g., 700-1000 nm) to charge. Each of the one or more charge sensing units 614 can include a charge storage device and a buffer to convert the charge generated by photodiodes 612a-612d to voltages, which can be quantized by one or more ADCs 616 into digital values. The digital values generated from photodiodes 612a-612c can represent the different visible light components of a pixel, and each can be used for 2D sensing in a particular visible light channel. Moreover, the digital value generated from photodiode 612d can represent the infra-red light component of the same pixel and can be used for 3D sensing. Although FIG. 6 shows that pixel cell 602a includes four photodiodes, it is understood that the pixel cell can include a different number of photodiodes (e.g., two, three).

In some examples, image sensor 600 may also include an illuminator 622, an optical filter 624, an imaging module 628, and a sensing controller 640. Illuminator 622 may be an infra-red illuminator, such as a laser or a light emitting diode (LED), that can project infra-red light for 3D sensing. The projected light may include, for example, structured light or light pulses. Optical filter 624 may include an array of filter elements overlaid on the plurality of photodiodes 612a-612d of each pixel cell including pixel cell 602a. Each filter element can set a wavelength range of incident light received by each photodiode of pixel cell 602a. For example, a filter element over photodiode 612a may transmit the visible blue light component while blocking other components, a filter element over photodiode 612b may transmit the visible green light component, a filter element over photodiode 612c may transmit the visible red light component, whereas a filter element over photodiode 612d may transmit the infra-red light component.

Image sensor 600 further includes an imaging module 628. Imaging module 628 may further include a 2D imaging module 632 to perform 2D imaging operations and a 3D imaging module 634 to perform 3D imaging operations. The operations can be based on digital values provided by ADCs 616. For example, based on the digital values from each of photodiodes 612a-612c, 2D imaging module 632 can generate an array of pixel values representing an intensity of an incident light component for each visible color channel, and generate an image frame for each visible color channel. Moreover, 3D imaging module 634 can generate a 3D image based on the digital values from photodiode 612d. In some examples, based on the digital values, 3D imaging module 634 can detect a pattern of structured light reflected by a surface of an object, and compare the detected pattern with the pattern of structured light projected by illuminator 622 to determine the depths of different points of the surface with respect to the pixel cells array. For detection of the pattern of reflected light, 3D imaging module 634 can generate pixel values based on intensities of infra-red light received at the pixel cells. As another example, 3D imaging module 634 can generate pixel values based on time-of-flight of the infra-red light transmitted by illuminator 622 and reflected by the object.

Figure 7A:
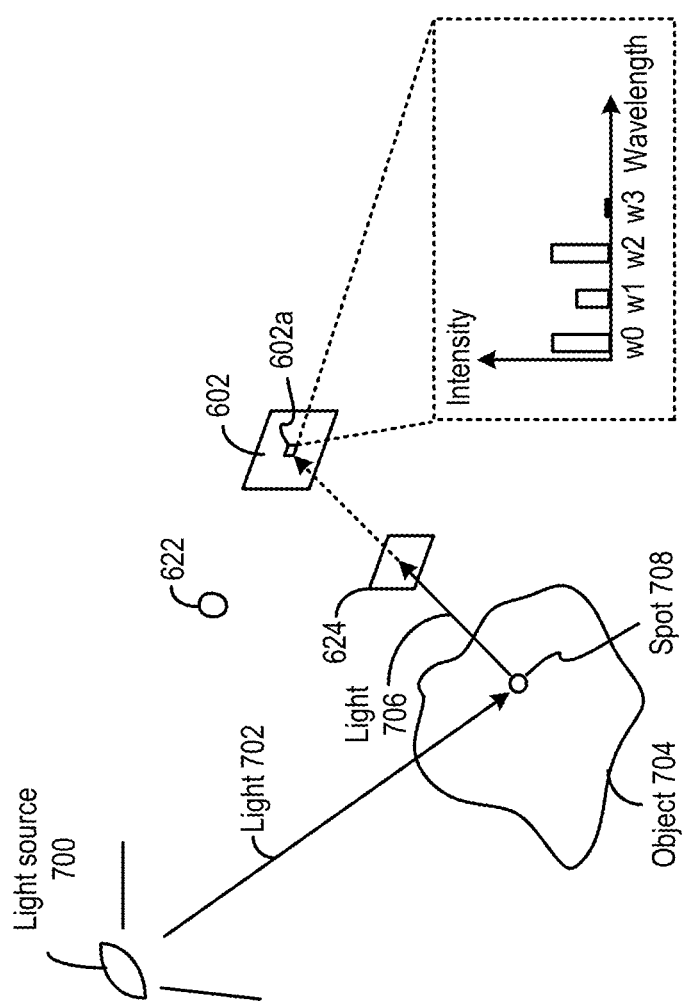
FIG. 7A, FIG. 7B, and FIG. 7C illustrate operations for determining light intensities of different ranges by examples of FIG. 6.
Figure 7B:
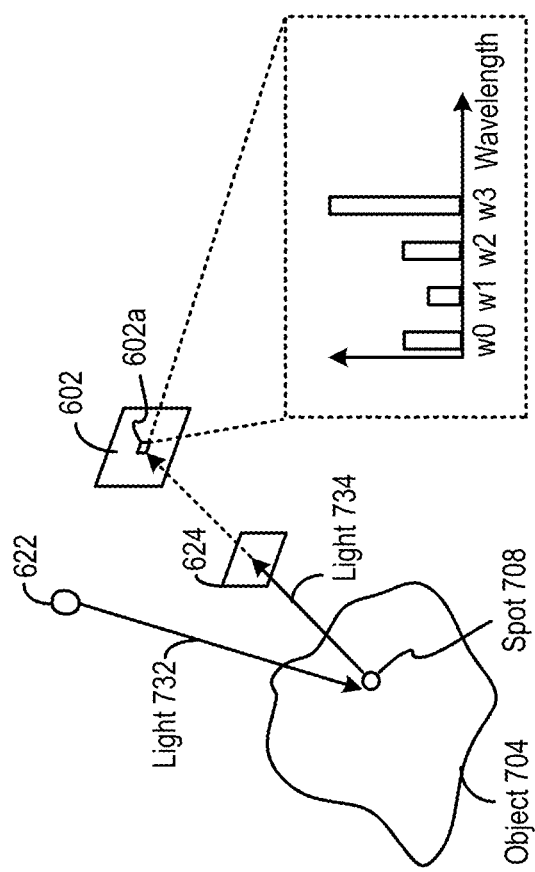
Figure 7C:
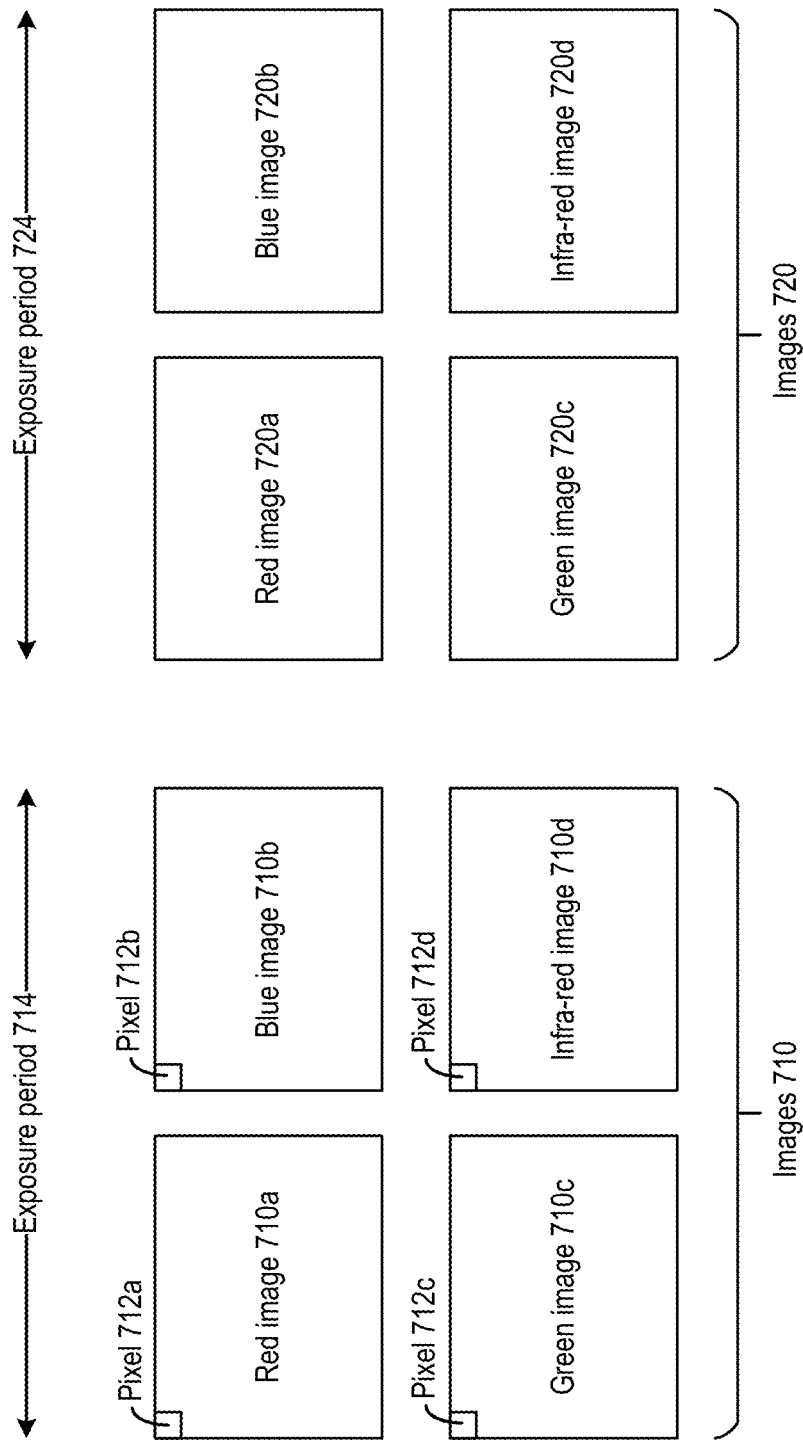

Image sensor 600 further includes a sensing controller 640 to control different components of image sensor 600 to perform 2D and 3D imaging of an object. Reference is now made to FIGS. 7A-FIG. 7C, which illustrate examples of operations of image sensor 600 for 2D and 3D imaging. FIG. 7A illustrates an example of operations for 2D imaging. For 2D imaging, pixel cells array 602 can detect visible light in the environment, including visible light reflected off an object. For example, referring to FIG. 7A, visible light source 700 (e.g., a light bulb, the sun, or other sources of ambient visible light) can project visible light 702 onto an object 704. Visible light 706 can be reflected off a spot 708 of object 704. Visible light 706 can also include the ambient infra-red light component. Visible light 706 can be filtered by optical filter array 624 to pass different components of visible light 706 of wavelength ranges w0, w1, w2, and w3 to, respectively, photodiodes 612a, 612b, 612c, and 612d of pixel cell 602a. Wavelength ranges w0, w1, w2, and w3 can correspond to, respectively, blue, green, red, and infra-red. As shown in FIG. 7A, as the infra-red illuminator 622 is not turned on, the intensity of infra-red component (w3) is contributed by the ambient infra-red light and can be very low. Moreover, different visible components of visible light 706 can also have different intensities. Charge sensing units 614 can convert the charge generated by the photodiodes to voltages, which can be quantized by ADCs 616 into digital values representing the red, blue, and green components of a pixel representing spot 708. Referring to FIG. 7C, after the digital values are generated, sensing controller 640 can control 2D imaging module 632 to generate, based on the digital values, sets of images including a set of images 710, which includes a red image frame 710a, a blue image frame 710b, and a green image frame 710c, each representing one of red, blue, or green color image of a scene captured with the same exposure period 714. Each pixel from the red image (e.g., pixel 712a), from the blue image (e.g., pixel 712b), and from the green image (e.g., pixel 712c) can represent visible components of light from the same spot (e.g., spot 708) of a scene. A different set of images 720 can be generated by 2D imaging module 632 in a subsequent exposure period 724. Each of red image 710a, blue image 710b, and green image 710c can represent the scene in a specific color channel and can be provided to an application to, for example, extract image features from the specific color channel. As each image represents the same scene and each corresponding pixel of the images represent light from the same spot of the scene, the correspondence of images between different color channels can be improved.

Furthermore, image sensor 600 can also perform 3D imaging of object 704. Referring to FIG. 7B, sensing controller 610 can control illuminator 622 to project infra-red light 732, which can include a light pulse, structured light, etc., onto object 704. Infra-red light 732 can have a wavelength range of 700 nanometers (nm) to 1 millimeter (mm). Infra-red light 734 can reflect off spot 708 of object 704 and can propagate towards pixel cells array 602 and pass through optical filter 624, which can provide the infra-red component (of wavelength range w3) to photodiode 612d to convert to charge. Charge sensing units 614 can convert the charge to a voltage, which can be quantized by ADCs 616 into digital values. Referring to FIG. 7C, after the digital values are generated, sensing controller 640 can control 3D imaging module 634 to generate, based on the digital values, an infra-red image 710d of the scene as part of images 710 captured within exposure period 714. As infra-red image 710d can represent the same scene in the infra-red channel and a pixel of infra-red image 710d (e.g., pixel 712d) represents light from the same spot of the scene as other corresponding pixels (pixels 712a-712c) in other images within images 710, the correspondence between 2D and 3D imaging can be improved as well.

Figure 8A:
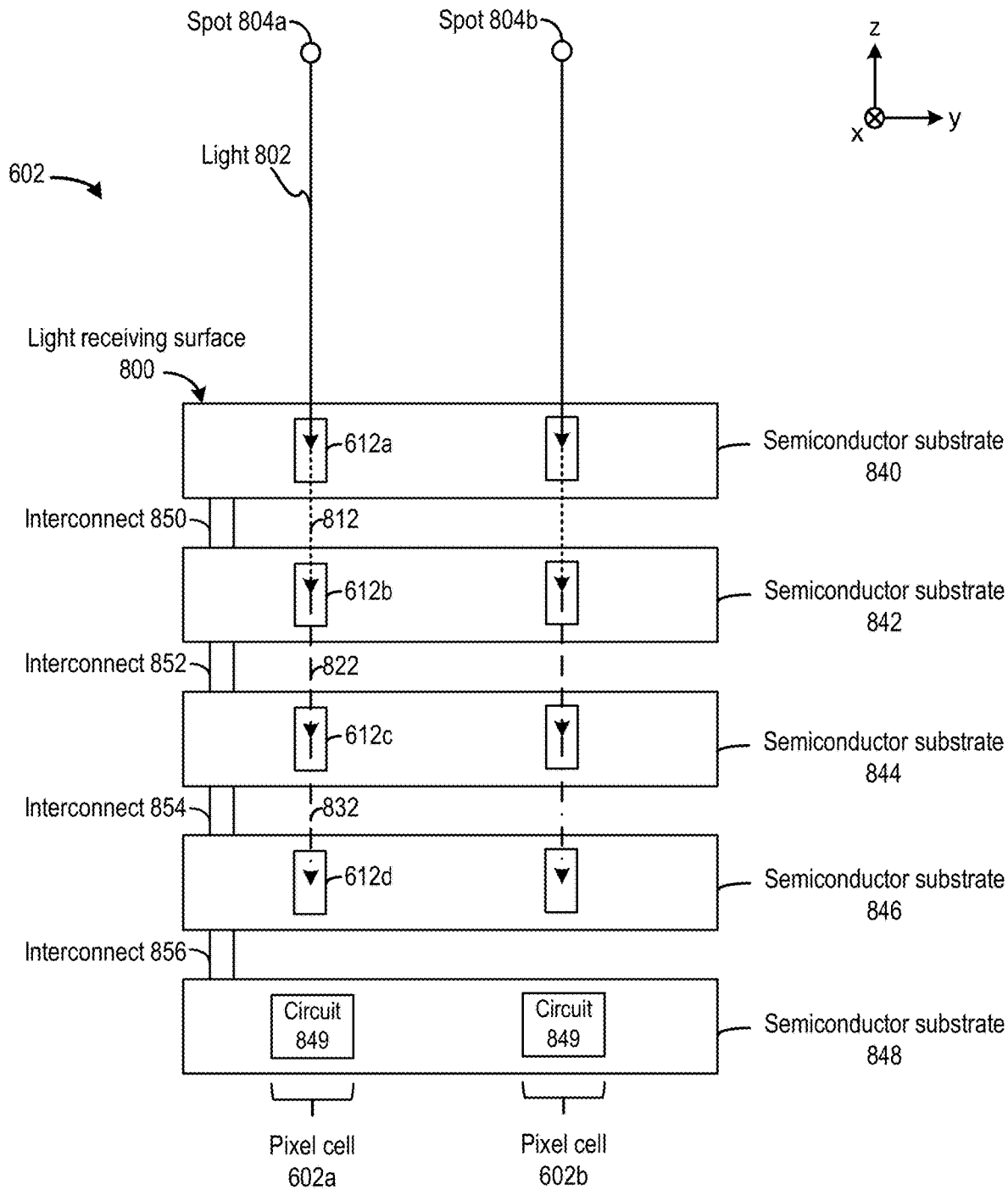
FIG. 8A, FIG. 8B, FIG. 8C, FIG. 8D, and FIG. 8E illustrate examples of components of the image sensor of FIG. 6.

FIGS. 8A-FIG. 8E illustrate examples of arrangements of photodiodes 612 in an image sensor, such as within a pixel cell or between different pixel cells. As shown in FIG. 8A, the photodiodes 612a-612d in a pixel cell 602a can form a stack along an axis that is perpendicular to a light receiving surface 800 through which pixel cell 602a receives incident light 802 from a spot 804a. For example, the photodiodes 612a-612d can form a stack along a vertical axis (e.g., the z-axis) when the light receiving surface 800 is parallel with the x and y axes. Each photodiode can have a different distance from light receiving surface 800, and the distance can set the component of incident light 802 being absorbed and converted to charge by each photodiode. For example, photodiode 612a is closest to light receiving surface 800 and can absorb and convert the blue component to charge, which is of the shortest wavelength range among the other components. Light 812 includes the remaining components of light 802 (e.g., green, red, and infra-red) and can propagate to photodiode 612b, which can absorb and convert the green component. Light 822 includes the remaining components of light 812 (e.g., red and infra-red) and can propagate to photodiode 612c, which can absorb and convert the red component. The remaining infra-red component 832 can propagate to photodiode 612d to be converted to charge.

Each the photodiodes 612a, 612b, 612c, and 612d can be in a separate semiconductor substrate, which can be stacked to form image sensor 600. For example, photodiode 612a can be in a semiconductor substrate 840, photodiode 612b can be in a semiconductor substrate 842, photodiode 612c can be in a semiconductor substrate 844, whereas photodiode 612d can be in a semiconductor substrate 846. Each of substrates 840-846 can include a charge sensing unit, such as charge sensing units 614. Substrates 840-846 can form a sensor layer. Each semiconductor substrate can include other photodiodes of other pixel cells, such as pixel cells 602b to receive light from spot 804b. Image sensor 600 can include another semiconductor substrate 848, which can include pixel cell processing circuits 849 which can include, for example, ADCs 616, imaging module 628, and/or sensing controller 640. In some examples, charge sensing units 614 can be in semiconductor substrate 848. Semiconductor substrate 848 can form an application specific integrated circuit (ASIC) layer. Each semiconductor substrate can be connected to a metal interconnect, such as metal interconnects 850, 852, 854, and 856 to transfer the charge generated at each photodiode to processing circuit 849.

Figure 8B:
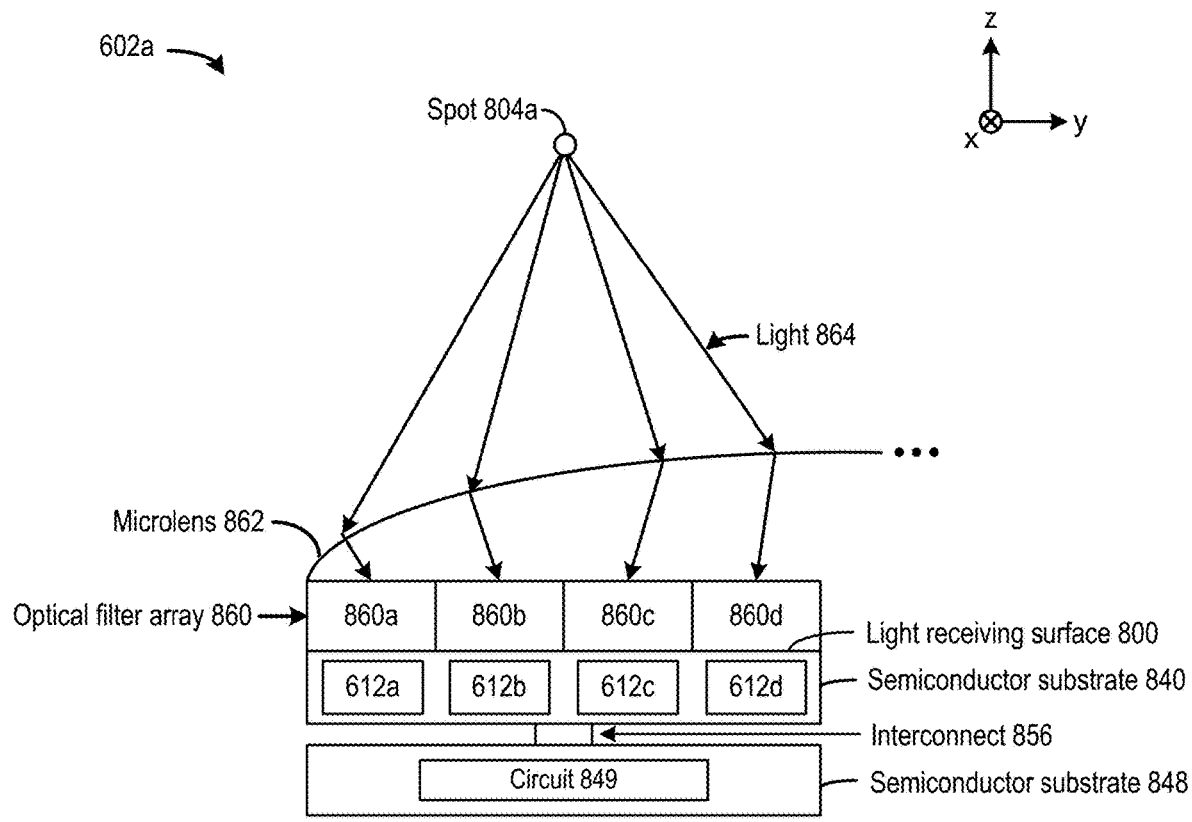
Figure 8B:
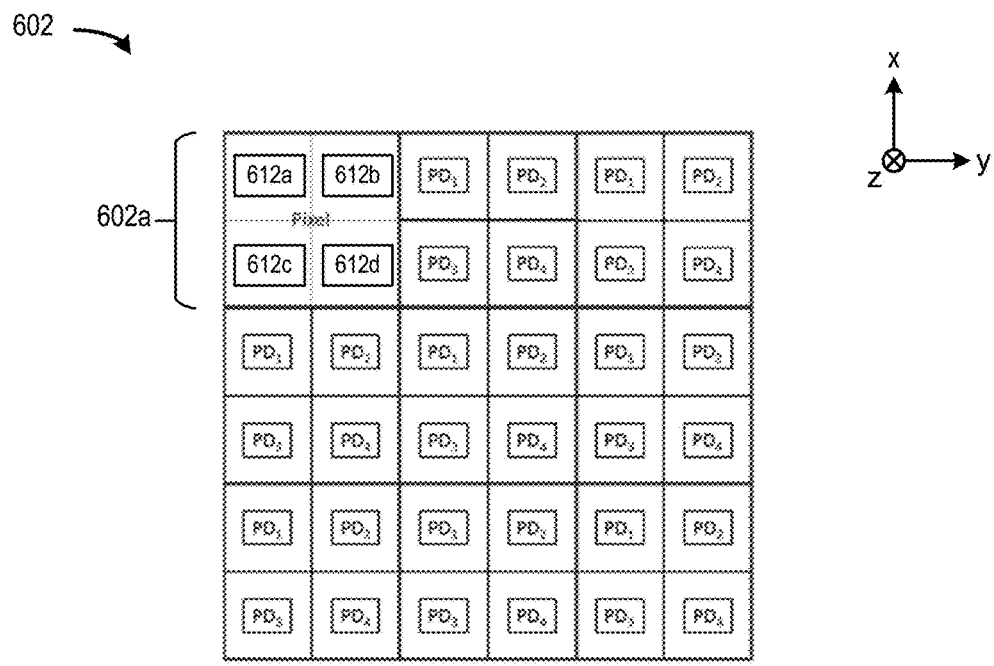
Figure 8C:
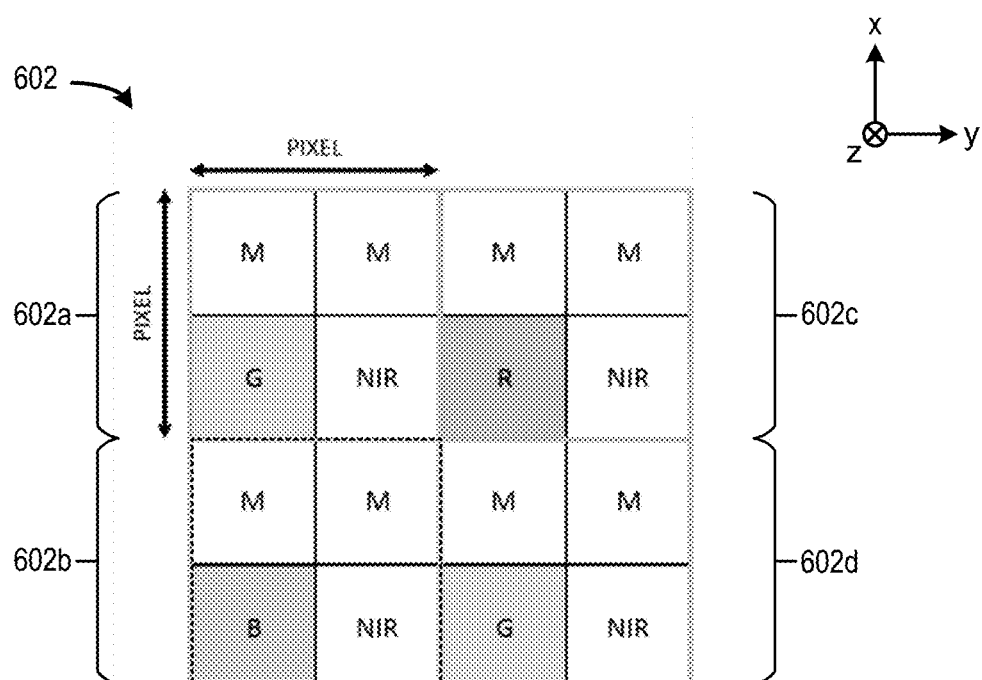
Figure 8C:
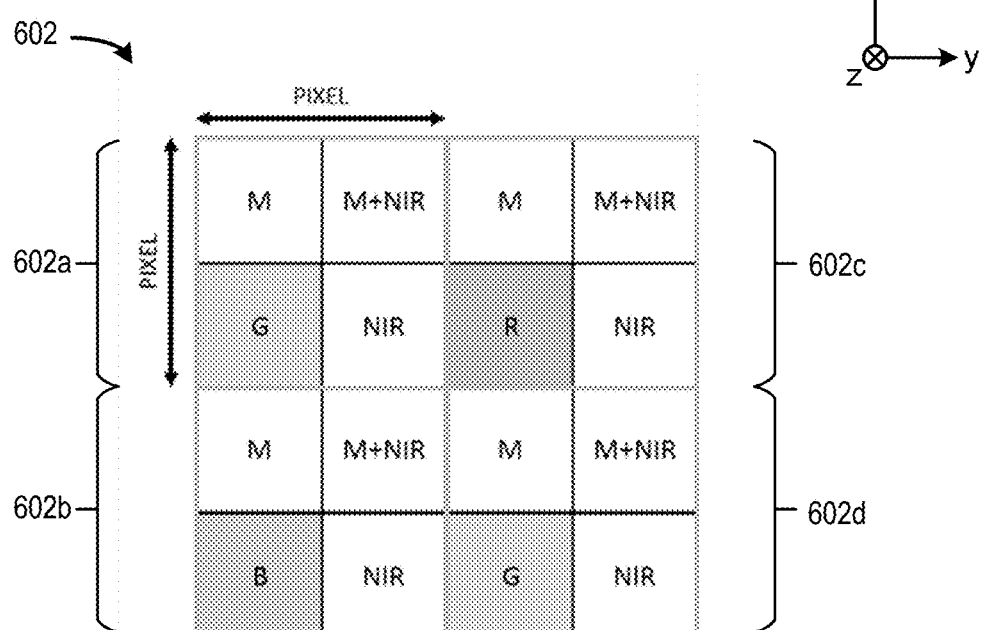
Figure 8D:
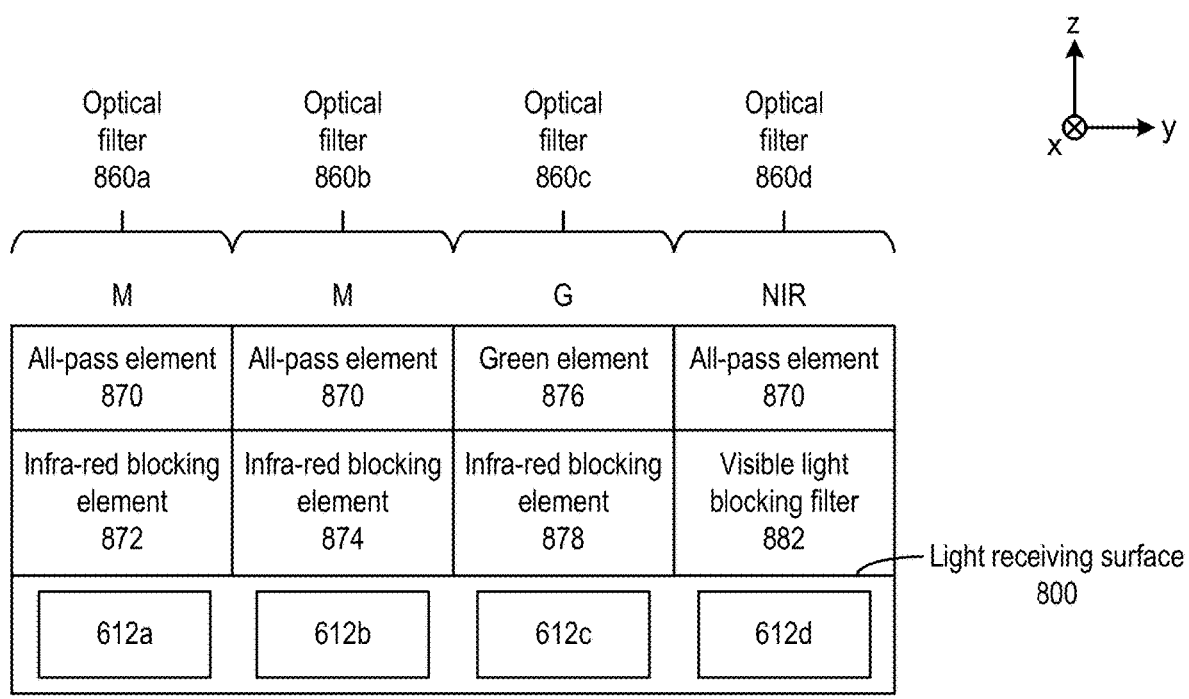
Figure 8D:
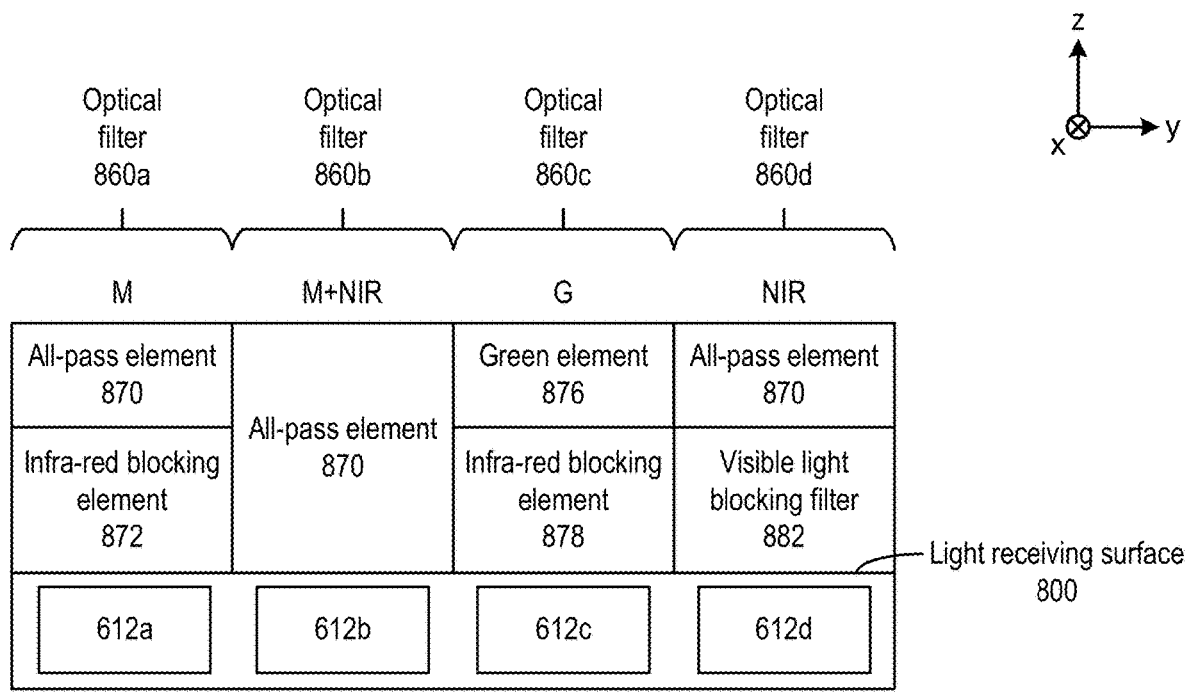

FIG. 8B-FIG. 8D illustrate other example arrangements of photodiodes 612 within a pixel cell. As shown in FIG. 8B-FIG. 8D, the plurality of photodiodes 612 can be arranged laterally parallel with light receiving surface 800. The top graph of FIG. 8B illustrates a side view of an example of pixel cell 602a, whereas the bottom graph of FIG. 8B illustrates a top view of pixel array 602 including pixel cell 602a. As shown in FIG. 8B, with light receiving surface 800 being parallel with the x and y axes, photodiodes 612a, 612b, 612c, and 612d can be arranged adjacent to each other also along the x and y axes in semiconductor substrate 840. Pixel cell 602a further includes an optical filter array 860 overlaid on the photodiodes. Optical filter array 860 can be part of optical filter 624. Optical filter array 860 can include a filter element overlaid on each of photodiodes 612a, 612b, 612c, and 612d to set a wavelength range of incident light component received by the respective photodiode. For example, filter element 860a is overlaid on photodiode 612a and can allow only visible blue light to enter photodiode 612a. Moreover, filter element 860b is overlaid on photodiode 612b and can allow only visible green light to enter photodiode 612b. Further, filter element 860c is overlaid on photodiode 612c and can allow only visible red light to enter photodiode 612c. Filter element 860d is overlaid on photodiode 612d and can allow only infra-red light to enter photodiode 612d. Pixel cell 602a further includes one or more microlens(es) 862, which can project light 864 from a spot of a scene (e.g., spot 804a) via optical tiler array 860 to different lateral locations of light receiving surface 800, which allows each photodiode to become a sub-pixel of pixel cell 602a and to receive components of light from the same spot corresponding to a pixel. Pixel cell 602a can also include semiconductor substrate 848, which can include circuit 849 (e.g., charge sensing units 614, ADCs 616) to generate digital values from the charge generated by the photodiodes. Semiconductor substrates 840 and 848 can form a stack and can be connected with interconnect 856. In FIG. 8B, semiconductor substrate 840 can form a sensor layer, whereas semiconductor substrate 848 can form an ASIC layer.

The arrangements of FIG. 8B, in which the photodiodes are arranged laterally and an optical filter array is used to control the light components received by the photodiodes, can offer numerous advantages. For example, the number of stacks and the number of semiconductor substrates can be reduced, which not only reduce the vertical height but also the interconnects among the semiconductor substrates. Moreover, relying on filter elements rather than the propagation distance of light to set the wavelength ranges of the components absorbed by each photodiode can offer flexibilities in selecting the wavelength ranges. As shown in top graph of FIG. 8C, pixel cells array 602 can include different optical filter arrays 860 for different pixel cells. For example, each pixel cell of pixel cells array 602 can have an optical filter array that provides monochrome channel of a wavelength range of 380-740 nm (labelled with "M") for photodiodes 612a and 612b, and an infra-red channel of a wavelength range of 700-1000 nm (labelled with "NIR") for photodiode 612d. But the optical filter arrays may also provide a different visible color channel for the different pixel cells. For example, the optical filter arrays 860 for pixel cells array 602a, 602b, 602c, and 602d may provide, respectively, a visible green channel (labelled with "G"), a visible red channel (labelled with "R"), a visible blue channel (labelled with "B"), and a visible green channel for photodiode 612c of the pixel cells arrays. As another example, as shown in the bottom graph of FIG. 8C, each optical filter array 860 can provide a monochrome and infra-red channel (labelled "M+NIR") which spans a wavelength range of 380-1000 nm for photodiode 612b of each pixel cells array.

FIG. 8D illustrates examples of optical filter array 860 to provide the example channels shown in FIG. 8C. As shown in FIG. 8D, optical filter array 860 can include a stack of optical filters to select a wavelength range of light received by each photodiode within a pixel cell array. For example, referring to the top graph of FIG. 8D, optical filter 860a can include an all-pass element 870 (e.g., a transparent glass that passes both visible light and infra-red light) and an infra-red blocking element 872 forming a stack to provide a monochrome channel for photodiode 612a. Optical filter 860b can also include an all-pass element 870 and an infra-red blocking element 876 to also provide a monochrome channel for photodiode 612b. Further, optical filter 860c can include a green-pass element 876 which passes green visible light (but reject other visible light component), and an infra-red blocking element 878, to provide a green channel for photodiode 612c. Lastly, optical filter 860d can include an all-pass element 870 and a visible light blocking filter 882 (which can block out visible light but allows infra-red light to go through) to provide an infra-red channel for photodiode 612d. In another example, as shown in the bottom graph of FIG. 8D, optical filter 860b can include only all-pass element 870 to provide a monochrome and infra-red channel for photodiode 612b.

Figure 8E:
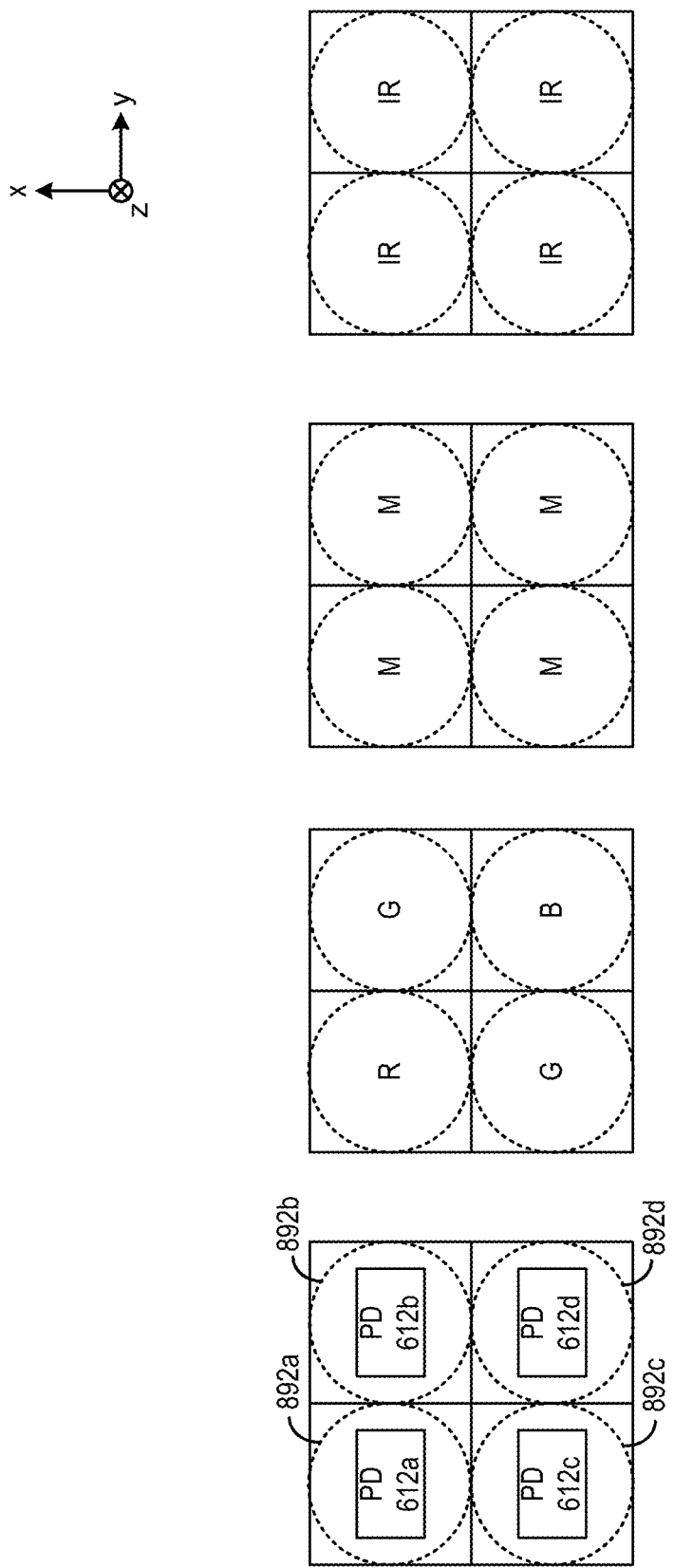

FIG. 8E illustrates another example optical configurations of photodiodes 612. As shown in FIG. 8E, instead of overlaying a microlens 862 over a plurality of photodiodes, as shown in FIG. 8B, a plurality of microlenses 892 can be overlaid over the plurality of photodiodes 612a-612d, which are arranged in a 2×2 format. For example, microlens 892a can be overlaid over photodiode 612a, microlens 892b can be overlaid over photodiode 612b, microlens 892c can be overlaid over photodiode 612c, whereas microlens 892d can be overlaid over photodiode 612d. With such arrangements, each photodiode can correspond to a pixel, which can shrink the required footprint of pixel cell array to achieve a target resolution.

Different patterns of filter arrays can be inserted between plurality of microlenses 862 and plurality of photodiodes 612. For example, as shown in FIG. 8E, a 2×2 color filter pattern comprising red (R), green (G), and blue (B) filters can be inserted between the microlenses and the photodiodes. Moreover, an all-pass filter pattern can also be inserted between the microlenses and the photodiodes so that each photodiode detects a monochrome channel. Also, an infra-red filter pattern can also be inserted between the microlenses and the photodiodes so that each photodiode detects infra-red light.

Figure 9:
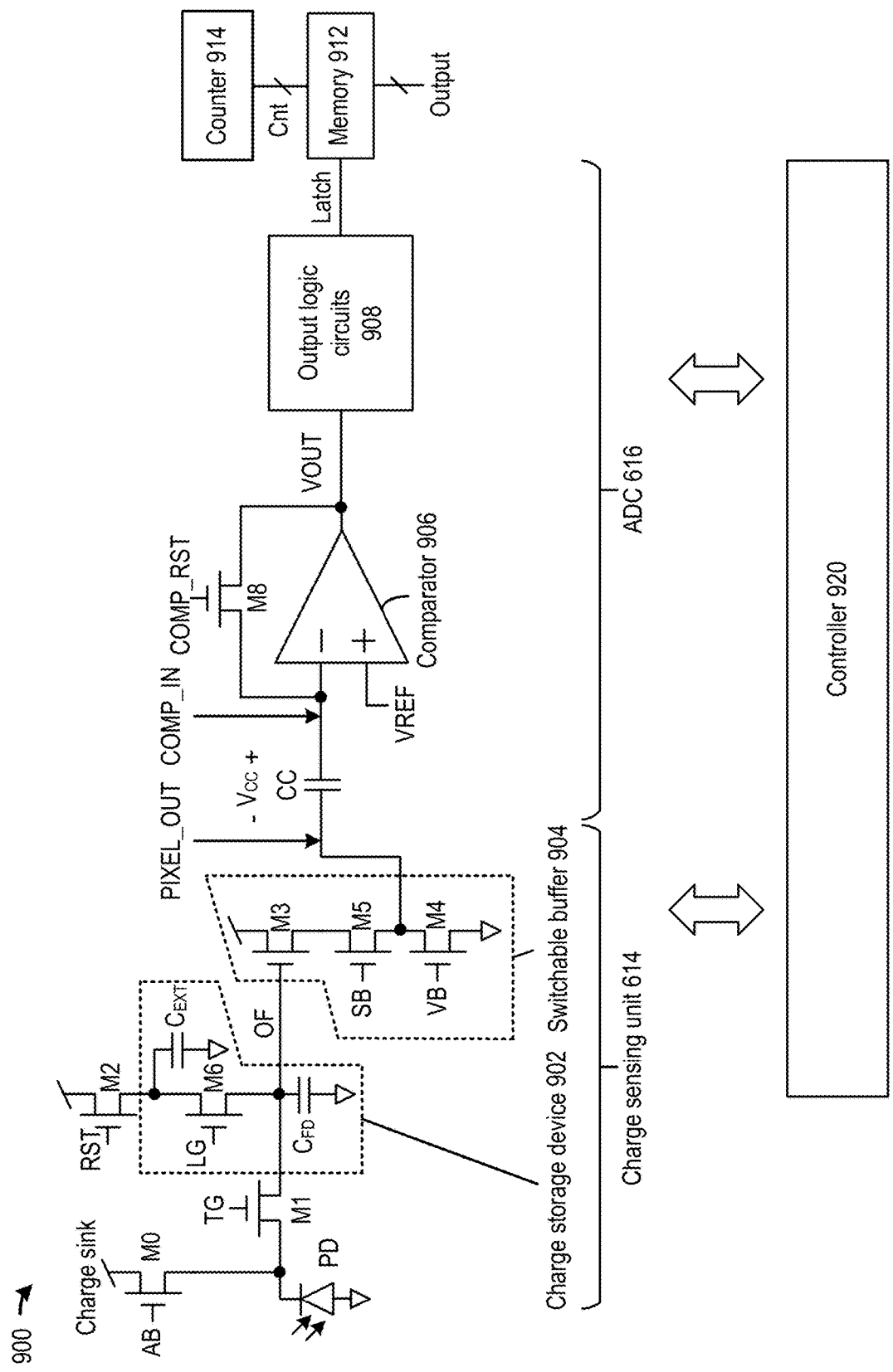
FIG. 9 illustrates examples of an image sensor comprising of a pixel cell of FIG. 6.

Reference is now made to FIG. 9, which illustrates example internal components of an image sensor 900, which can include pixel cell 602a. As shown in FIG. 9, image sensor 900 can include a photodiode PD (e.g., photodiode 612a), a charge draining transistor M0, a charge transfer transistor M1, a charge sensing unit 614 comprising a charge storage device 902 and a switchable buffer 904, and an ADC 616 comprising a CC capacitor, a comparator 906, and output logic circuits 908. The output of comparator 906 is coupled, via output logic circuits 908, with a memory bank 912 and a counter 914. ADC 616, memory 912, and counter 914 can be internal to or external to pixel cell 602a. Image sensor 900 further includes a controller 920 to control the transistors, charge sensing unit 614, as well as ADC 616. As to be described below, controller 920 can set an exposure period to accumulate charge based on incident light, and can control charge sensing unit 614 and ADC 616 to perform multiple quantization operations associated with different light intensity ranges to generate a digital representation of the intensity of the incident light. Controller 920 can be internal to pixel cell 602a or part of sensing controller 640. Each transistor in pixel cell 602a can include, for example, a metal-oxide-semiconductor field-effect transistor (MOSFET) and a bipolar junction transistor (BJT). Photodiode PD, charge draining transistor M0, charge transfer transistor M1, and charge sensing unit 614 can be in a sensor layer (e.g., substrates 840-846 of FIG. 8A, substrate 840 of FIG. 8B), whereas ADC 616, memory bank 912, and counter 914 can be in an ASIC layer (e.g., substrate 848 of FIG. 8A and FIG. 8B), with the two substrates forming a stack.

Specifically, charge transfer transistor M1 can be controlled by a TG signal provided by controller 920 to transfer some of the charge to charge storage device 902. In one quantization operation, charge transfer transistor M1 can be biased at a partially-on state to set a quantum well capacity of photodiode PD, which also sets a quantity of residual charge stored at photodiode PD. After photodiode PD is saturated by the residual charge, overflow charge can flow through charge transfer transistor M1 to charge storage device 902. In another quantization operation, charge transfer transistor M1 can be fully turned on to transfer the residual charge from photodiode PD to charge storage device for measurement. Moreover, charge draining transistor M0 is coupled between photodiode PD and a charge sink. Charge draining transistor M0 can be controlled by an anti-blooming (AB) signal provided by controller 920 to start an exposure period, in which photodiode PD can generate and accumulate charge in response to incident light. Charge draining transistor M0 can also be controlled to provide an anti-blooming function to drain away additional charge generated by photodiode PD to the charge sink after charge storage device 902 saturates to prevent the additional charge from leaking into neighboring pixel cells.

Charge storage device 902 has a configurable capacity and can convert the charge transferred from transistor M1 to a voltage at the OF node. Charge storage device 902 includes a $C_{FD}$ capacitor (e.g., a floating drain) and a $C_{EXT}$ capacitor (e.g., a MOS capacitor, a metal capacitor) connected by a M6 transistor. M6 transistor can be enabled by a LG signal to expand the capacity of charge storage device 902 by connecting $C_{FD}$ and $C_{EXT}$ capacitors in parallel, or to reduce the capacity by disconnecting the capacitors from each other. The capacity of charge storage device 902 can be reduced for measurement of residual charge to increase the charge-to-voltage gain and to reduce the quantization error. Moreover, the capacity of charge storage device 902 can also be increased for measurement of overflow charge to reduce the likelihood of saturation and to improve non-linearity. As to be described below, the capacity of charge storage device 902 can be adjusted for measurement of different light intensity ranges. Charge storage device 902 is also coupled with a reset transistor M2, which can be controlled by a reset signal RST, provided by controller 920, to reset $C_{FD}$ and $C_{EXT}$ capacitors between different quantization operations. In some examples, with transistor M1 fully enabled, reset signal RST can also be used to control the start and end of the exposure period in which PD generates and accumulates charge in response to light. In such examples, charge draining transistor M0 can be omitted.

Switchable buffer 904 can include a transistor M3 configured as a source follower to buffer the voltage at the OF node to improve its driving strength. The buffered voltage can be at the input node PIXEL_OUT of ADC 616. The M4 transistor provides a current source for switchable buffer 904 and can be biased by a VB signal. Switchable buffer 904 also includes a transistor M5 which be enabled or disabled by a SB signal. When transistor M5 is disabled, source follower M3 can be disconnected from the PIXEL_OUT node. As to be described below, pixel cell 602a may include multiple charge sensing units 614 each including a switchable buffer 904, and one of the charge sensing units can be coupled with PIXEL_OUT (and ADC 616) at one time based on the SB signal.

Figure 10:
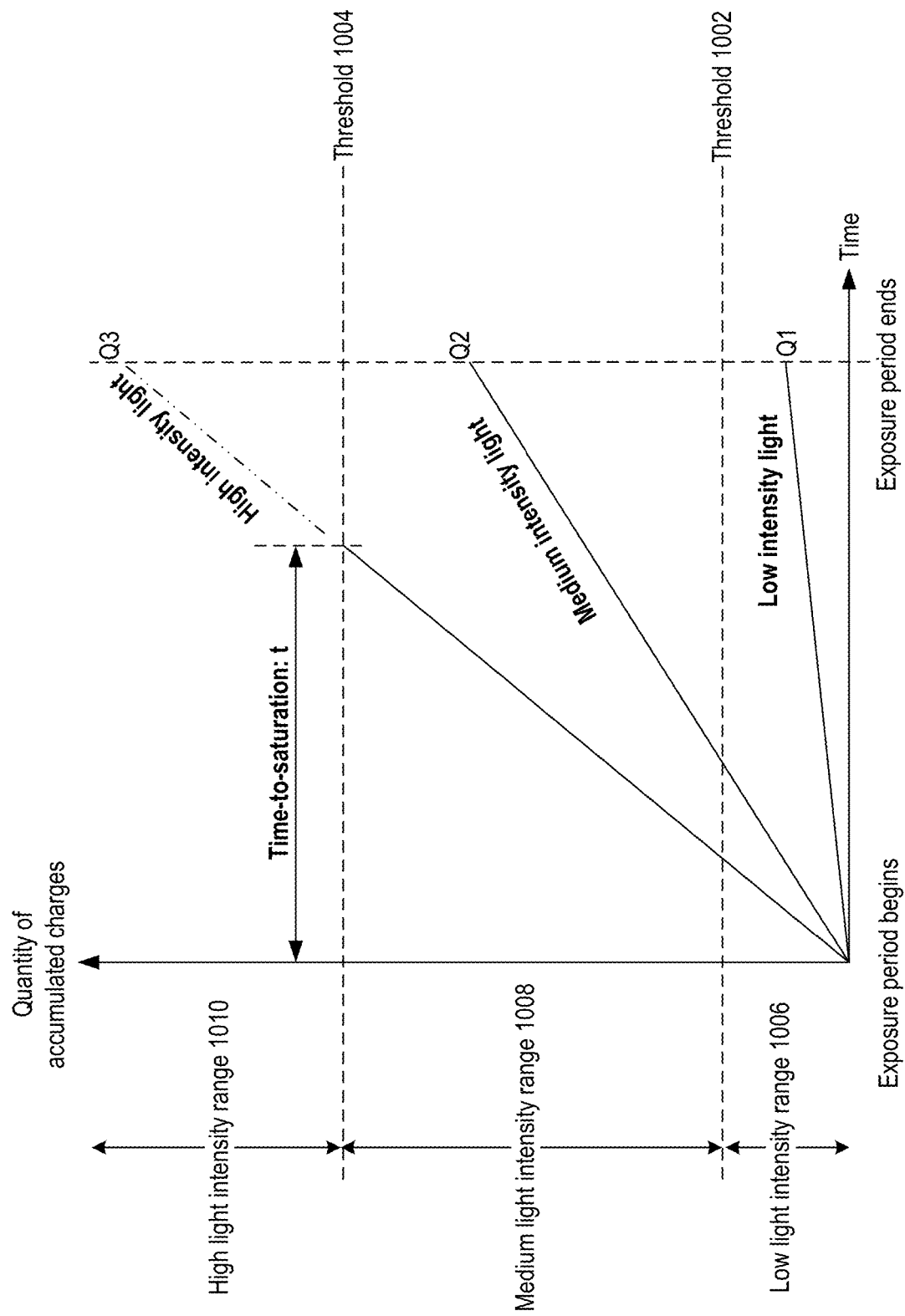
FIG. 10 illustrates examples of light intensity ranges to be measured by a pixel cell of FIG. 6.

As described above, charge generated by photodiode PD within an exposure period can be temporarily stored in charge storage device 902 and converted to a voltage. The voltage can be quantized to represent an intensity of the incident light based on a pre-determined relationship between the charge and the incident light intensity. Reference is now made to FIG. 10, which illustrates a quantity of charge accumulated with respect to time for different light intensity ranges. The total quantity of charge accumulated at a particular time point can reflect the intensity of light incident upon photodiode PD of FIG. 6 within an exposure period. The quantity can be measured when the exposure period ends. A threshold 1002 and a threshold 1004 can be defined for a threshold's quantity of charge defining a low light intensity range 1006, a medium light intensity range 1008, and a high light intensity range 1010 for the intensity of the incident light. For example, if the total accumulated charge is below threshold 1002 (e.g., Q1), the incident light intensity is within low light intensity range 1006. If the total accumulated charge is between threshold 1004 and threshold 1002 (e.g., Q2), the incident light intensity is within medium light intensity range 1008. If the total accumulated charge is above threshold 1004, the incident light intensity is within medium light intensity range 1010. The quantity of the accumulated charge, for low and medium light intensity ranges, can correlate with the intensity of the incident light, if the photodiode does not saturate within the entire low light intensity range 1006 and the measurement capacitor does not saturate within the entire medium light intensity range 1008.

The definitions of low light intensity range 1006 and medium light intensity range 1008, as well as thresholds 1002 and 1004, can be based on the full well capacity of photodiode PD and the capacity of charge storage device 902. For example, low light intensity range 706 can be defined such that the total quantity of residual charge stored in photodiode PD, at the end of the exposure period, is below or equal to the storage capacity of the photodiode, and threshold 1002 can be based on the full well capacity of photodiode PD. Moreover, medium light intensity range 1008 can be defined such that the total quantity of charge stored in charge storage device 902, at the end of the exposure period, is below or equal to the storage capacity of the measurement capacitor, and threshold 1004 can be based on the storage capacity of charge storage device 902. Typically threshold 1004 is can be based on a scaled storage capacity of charge storage device 902 to ensure that when the quantity of charge stored in charge storage device 902 is measured for intensity determination, the measurement capacitor does not saturate, and the measured quantity also relates to the incident light intensity. As to be described below, thresholds 1002 and 1004 can be used to detect whether photodiode PD and charge storage device 902 saturate, which can determine the intensity range of the incident light.

In addition, in a case where the incident light intensity is within high light intensity range 1010, the total overflow charge accumulated at charge storage device 902 may exceed threshold 1004 before the exposure period ends. As additional charge is accumulated, charge storage device 902 may reach full capacity before the end of the exposure period, and charge leakage may occur. To avoid measurement error caused due to charge storage device 902 reaching full capacity, a time-to-saturation measurement can be performed to measure the time duration it takes for the total overflow charge accumulated at charge storage device 902 to reach threshold 1004. A rate of charge accumulation at charge storage device 902 can be determined based on a ratio between threshold 1004 and the time-to-saturation, and a hypothetical quantity of charge (Q3) that could have been accumulated at charge storage device 902 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 1010.

Referring back to FIG. 9, to measure high light intensity range 1010 and medium light intensity range 1008, charge transfer transistor M1 can be biased by the TG signal in a partially turned-on state. For example, the gate voltage of charge transfer transistor M1 (TG) can be set based on a target voltage developed at photodiode PD, corresponding to the full well capacity of the photodiode. With such arrangements, only overflow charge (e.g., charge generated by the photodiode after the photodiode saturates) will transfer through charge transfer transistor M1 to reach charge storage device 902, to measure time-to-saturation (for high light intensity range 1010) and/or the quantity of charge stored in charge storage device 902 (for medium light intensity range 1008). For measurement of medium and high light intensity ranges, the capacitance of charge storage device 902 (by connecting $C_{EXT}$ and $C_{FD}$) can also be maximized to increase threshold 1004.

Moreover, to measure low light intensity range 1006, charge transfer transistor M1 can be controlled in a fully turned-on state to transfer the residual charge stored in photodiode PD to charge storage device 902. The transfer can occur after the quantization operation of the overflow charge stored at charge storage device 902 completes and after charge storage device 902 is reset. Moreover, the capacitance of charge storage device 902 can be reduced. As described above, the reduction in the capacitance of charge storage device 902 can increase the charge-to-voltage conversion ratio at charge storage device 902, such that a higher voltage can be developed for a certain quantity of stored charge. The higher charge-to-voltage conversion ratio can reduce the effect of measurement errors (e.g., quantization error, comparator offset) introduced by subsequent quantization operation on the accuracy of low light intensity determination. The measurement error can set a limit on a minimum voltage difference that can be detected and/or differentiated by the quantization operation. By increasing the charge-to-voltage conversion ratio, the quantity of charge corresponding to the minimum voltage difference can be reduced, which in turn reduces the lower limit of a measurable light intensity by pixel cell 602*a* and extends the dynamic range.

The charge (residual charge and/or overflow charge) accumulated at charge storage device 902 can develop an analog voltage at the OF node, which can be buffered by switchable buffer 904 at PIXEL_OUT and quantized by ADC 616. As shown in FIG. 9, ADC 616 includes a comparator 906, which can be reset by a transistor M8, and output logic circuits 908. ADC 616 is also coupled with memory bank 912 and counter 914. Counter 914 can generate a set of count values based on a free-running clock signal, whereas memory bank 912 can be controlled by comparator 906 via output logic circuits 908 to store a count value (e.g., the latest count value) generated by counter 914. In some examples, memory bank 912 can include an array of latch devices to store multiple bits as a pixel value. The stored count value can be output via pixel output buses 816.

Comparator 906 can compare an analog voltage COMP_IN, which is derived from PIXEL_OUT by the CC capacitor, against a threshold VREF, and generate a decision VOUT based on the comparison result. The CC capacitor can be used in a noise/offset compensation scheme to store the reset noise and comparator offset information in a VCC voltage, which can be added to the PIXEL_OUT voltage to generate the COMP_IN voltage to cancel the reset noise component in the PIXEL_OUT voltage. The offset component remains in the COMP_IN voltage and can be cancelled out by the offset of comparator 906 when comparator 906 compares the COMP_IN voltage against threshold VREF to generate the decision VOUT. Comparator 906 can generate a logical one for VOUT if the COMP_IN voltage equals or exceeds VREF. Comparator 906 can also generate a logical zero for VOUT if the COMP_IN voltage falls below VREF. VOUT can control a latch signal which controls memory bank 912 to store a count value from counter 914.

Figure 11B:
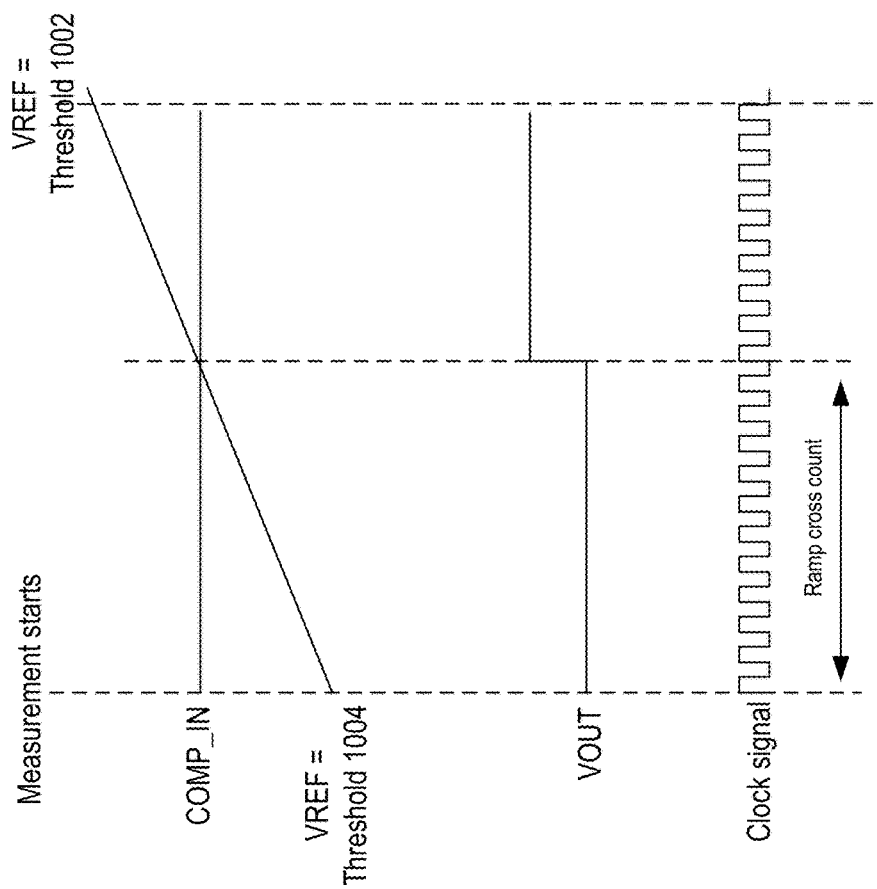
Figure 11A:
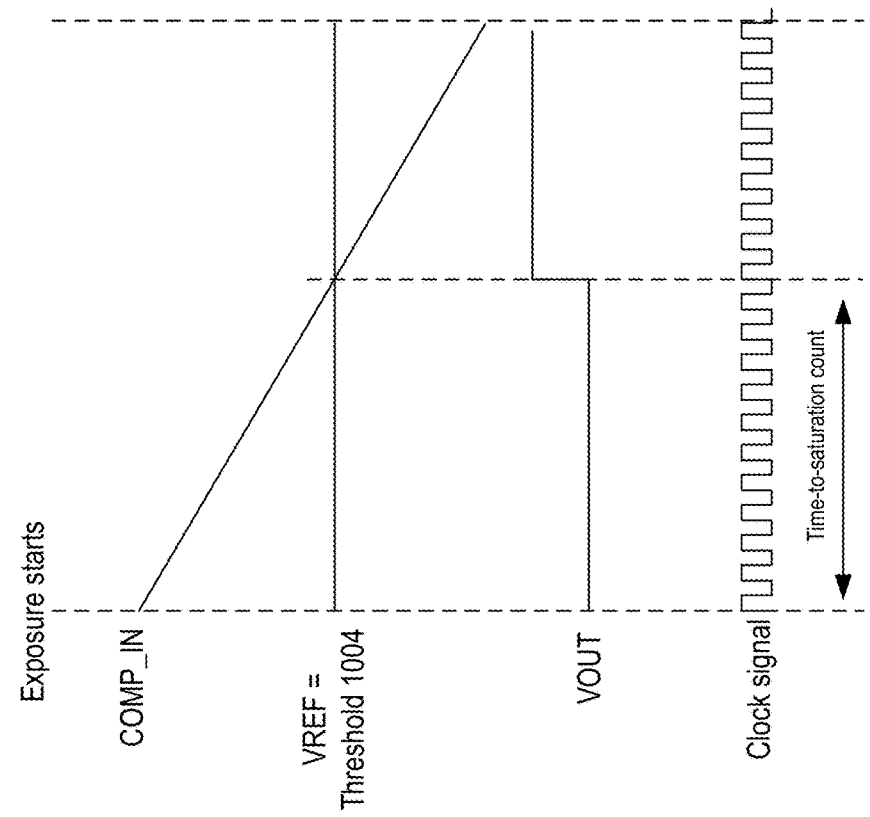

FIG. 11A illustrates an example of time-to-saturation measurement by ADC 616. To perform the time-to-saturation measurement, a threshold generator (which can be external to pixel cell 602*a*) can generate a fixed VREF. The fixed VREF can be set at a voltage corresponding to a charge quantity threshold for saturation of charge storage device 902 (e.g., threshold 1004 of FIG. 10). Counter 914 can start counting right after the exposure period starts (e.g., right after charge draining transistor M0 is disabled). As the COMP_IN voltage ramps down (or up depending on the implementation) due to accumulation of overflow charge at charge storage device 902, the clock signal keeps toggling to update the count value at counter 914. The COMP_IN voltage may reach the fixed VREF threshold at a certain time point, which causes VOUT to flip from low to high. The change of VOUT may stop the counting of counter 914, and the count value at counter 914 may represent the time-to-saturation.

FIG. 11B illustrates an example of measurement of a quantity of charge stored at charge storage device 902. After measurement starts, the threshold generator can generate a ramping VREF, which can either ramp up (in the example of FIG. 11B) or ramp down, depending on implementation. The rate of ramping can be based on the frequency of the clock signal supplied to counter 914. In a case where overflow charge is measured, the voltage range of ramping VREF can be between threshold 1004 (charge quantity threshold for saturation of charge storage device 902) and threshold 1002 (charge quantity threshold for saturation of photodiode PD), which can define the medium light intensity range. In a case where residual charge is measured, the voltage range of the ramping VREF can be based on threshold 1002 and scaled by the reduced capacity of charge storage device 902 for residual charge measurement. In the example of FIG. 11B, the quantization process can be performed with uniform quantization steps, with VREF increasing (or decreasing) by the same amount for each clock cycle. The amount of increase (or decrease) of VREF corresponds to a quantization step. When VREF reaches within one quantization step of the COMP_IN voltage, VOUT of comparator 906 flips, which can stop the counting of counter 914, and the count value can correspond to a total number of quantization steps accumulated to match, within one quantization step, the COMP_IN voltage. The count value can become a digital representation of the quantity of charge stored at charge storage device 902, as well as the digital representation of the incident light intensity.

As discussed above, ADC 616 can introduce quantization errors when there is a mismatch between a quantity of charge represented by the quantity level output by ADC 616 (e.g., represented by the total number of quantization steps) and the actual input quantity of charge that is mapped to the quantity level by ADC 808. The quantization error can be reduced by using a smaller quantization step size. In the example of FIG. 11B, the quantization error can be reduced by the amount of increase (or decrease) in VREF per clock cycle.

Although quantization error can be reduced by using smaller quantization step sizes, area and performance speed may limit how far the quantization step can be reduced. With smaller quantization step size, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps). The larger number of data bits may require additional buses to be added to pixel output buses 816, which may not be feasible if pixel cell 601 is used on a head-mounted device or other wearable devices with very limited spaces. Moreover, with a larger number of quantization step size, ADC 808 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

One way to reduce quantization error is by employing a non-uniform quantization scheme, in which the quantization steps are not uniform across the input range. FIG. 11C illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 616 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed) can be avoided.

FIG. 11D illustrates an example of quantizing an analog voltage by pixel ADC 808 using a non-uniform quantization process. Compared with FIG. 11B (which employs a uniform quantization process), VREF increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF increases at a slower rate. For higher counter count values (which correspond to a higher input quantity range), the quantization steps are made larger, hence VREF increases at a higher rate. The non-uniform VREF slope can be generated based on, for example, changing the frequency of counting of counter 814 and/or changing the relationship between the VREF voltage and the count values of counter 914. In some examples, the non-uniform quantization process of FIG. 11D can be employed for light intensity determination for low light intensity range 1006 and medium light intensity range 1008.

Referring back to FIG. 9, controller 920 can perform a TTS quantization operation, a quantization operation to measure a quantity of overflow charge (herein after, "FD ADC" operation), and a quantization operation to measure a quantity of residual charge (hereinafter "PD ADC" operation). Controller 920 can also skip one or more of the quantization operations. Output logic circuits 908 can select which of the quantization operations to store the count value at memory bank 912. Output logic circuits 908 can make the selection based on determining, based on the output of comparator 906 in each quantization operation, whether a quantity of the residual charge in photodiode PD exceeds a saturation threshold of the photodiode (e.g., corresponding to threshold 1002 of FIG. 10), and whether a quantity of the overflow charge in charge storage device 902 exceeds a saturation threshold of the charge storage device (e.g., corresponding to threshold 1004 of FIG. 10). If output logic circuits 908 detect that the quantity of the overflow charge exceeds threshold 1004 during the TTS operation, output logic circuits 908 can store the TTS output in memory bank 912. If output logic circuits 908 detect that the quantity of the overflow charge does not exceed threshold 1004 but that the quantity of the residual charge exceeds threshold 1002, output logic circuits 908 can store the FD ADC output in memory bank 912. Lastly if output logic circuits 908 detect the quantity of the residual charge does not exceed threshold 1002, output logic circuits 908 can store the PD ADC output in memory bank 912. In some examples, output logic circuits 908 can include registers to store one or more indications of whether saturation of charge storage device 902 is detected and whether the saturation of photodiode PD is detected, which output logic circuits 908 can use to perform the selection.

Figure 12A:
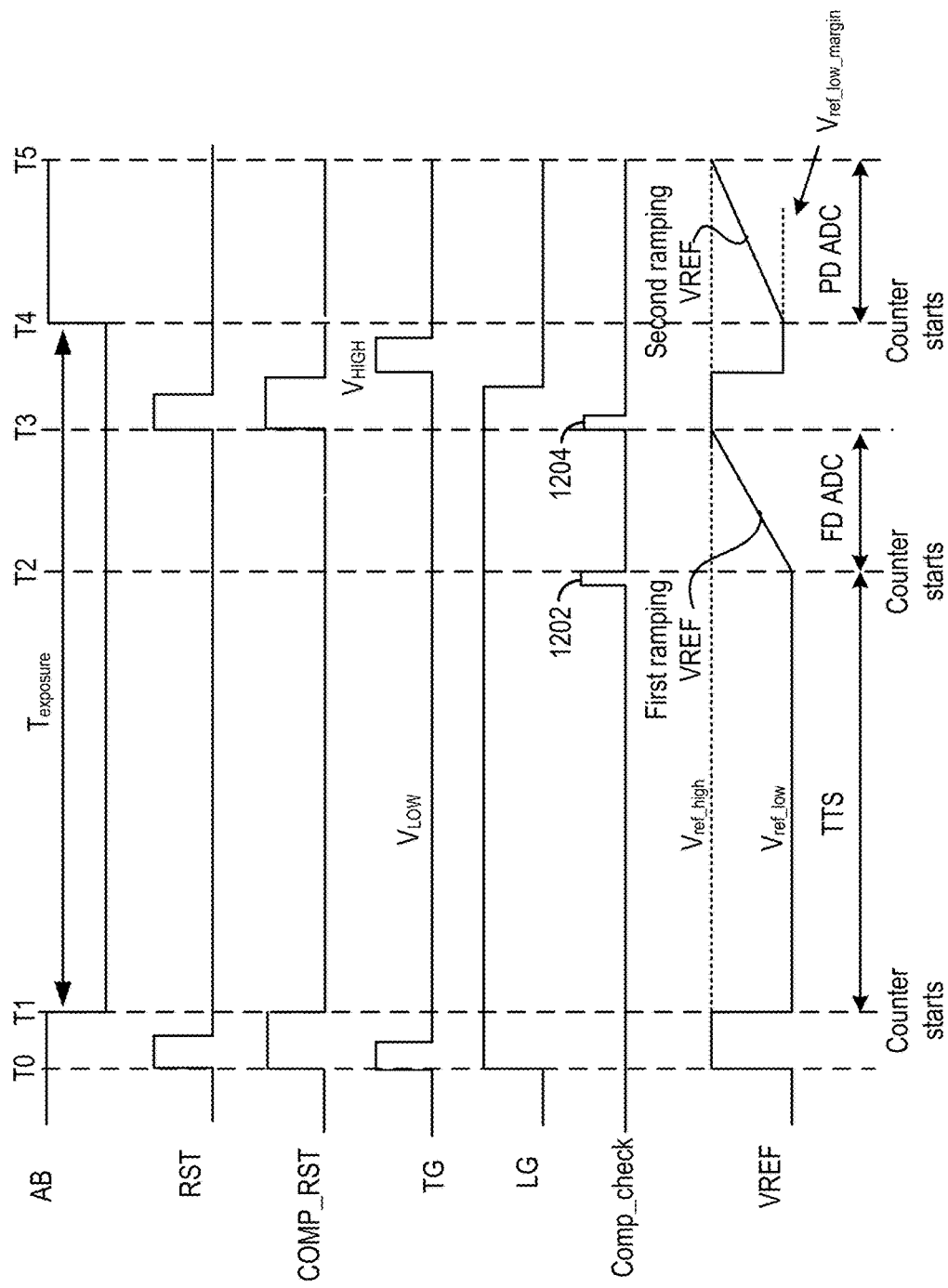
FIG. 12A and FIG. 12B illustrate example sequences of control signals to perform light intensity measurement.
Figure 12B:
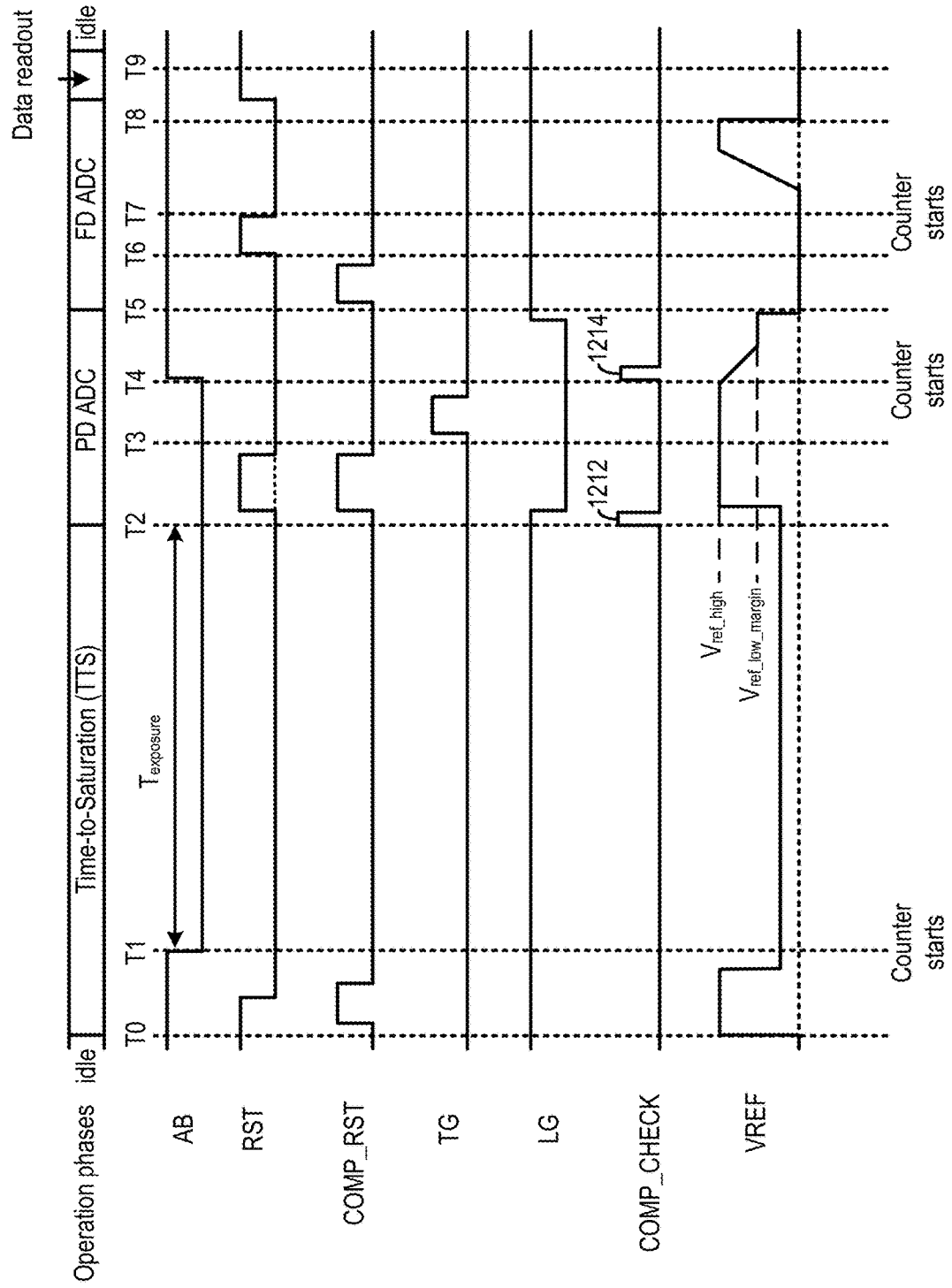

Reference is now made to FIG. 12A and FIG. 12B, which illustrate example sequences of the control signals of pixel cell 602a, generated by controller 920. Both FIG. 12A and FIG. 12B illustrate the change of AB, RST, COMP_RST, TG, LG, and VREF with respect to time. Referring to FIG. 12A, the period between times T0 and T1 can correspond to a first reset phase, in which charge storage device 902 and comparator 906 can be put in a reset state by controller 920 by asserting the RST and COMP_RST signals, while the AB signal can be asserted to prevent charge generated by photodiode PD from reaching charge storage device 902. Both the RST and LG signals are asserted to reset $C_{FD}$ and $C_{EXT}$ capacitors to set PIXEL_OUT at the reset level. With the COMP_RST signal asserted and the positive terminal of comparator 906 connected to $V_{ref\_high}$, COMP_IN can be set to a sum of $V_{ref\_high}$ and comparator offset $V_{comp\_offset}$. Moreover, with the RST signal asserted, PIXEL_OUT can be set the reset voltage $V_{pixel\_out\_rst}$ and can include reset noise $V\sigma_{KTC}$. A first sampling operation can be performed by the CC capacitor to store a $V_{CC}$ voltage including the components of the comparator offset, the reset noise, and PIXEL_OUT voltage at the reset level, as follows:

$$V_{cc}(T1)=(V_{ref\_high}+V_{comp\_offset})-(V_{pixel\_out\_rst}+V\sigma_{KTC}).$$ (Equation 1)

At time T1, the RST signal, the AB signal, and the COMP_RST signal are released, which starts an exposure period (labelled $T_{exposure}$) in which photodiode PD can accumulate and transfer charge. Exposure period $T_{exposure}$ can end at time T4 when the AB signal is asserted. Between times T1 and T3, the TG signal can set charge transfer transistor M1 in a partially turned-on state to allow PD to accumulate residual charge before photodiode PD saturates. If the light intensity is in the medium or high intensity ranges of FIG. 10, photodiode PD can saturate and transfer overflow charge via charge transfer transistor M1. The LG signal can remain asserted to operate in low gain mode, in which both $C_{FD}$ capacitor and $C_{EXT}$ capacitor are connected in parallel to form charge storage device 902 to store the overflow charge. The overflow charge develops a new PIXEL_OUT voltage, $V_{pixel\_out\_sig1}$ The CC capacitor can AC couple the new PIXEL_OUT voltage $V_{pixel\_out\_sig1}$ into COMP_IN voltage by adding the $V_{CC}$ voltage, which includes the reset noise and comparator offset component. The new PIXEL_OUT voltage also includes reset noise, which can be cancelled by the reset noise component of the $V_{CC}$ voltage. The COMP_IN voltage at time Tx between times T1 and T3 can be as follows:

$$V_{comp\_in}(Tx) = V_{pixel\_out\_sig1} - V_{pixel\_out\_rst} + V_{ref\_high} + V_{comp\_offset} \quad \text{(Equation 2)}$$

In Equation 2, the difference between $V_{pixel\_out\_sig1} - V_{pixel\_out\_rst}$ represents the quantity of overflow charge stored in charge storage device 902. The comparator offset in the COMP_IN voltage can also cancel out the comparator offset introduced by comparator 906 when performing the comparison.

Between times T1 and T3, two phases of measurement of the COMP_IN voltage can be performed, including a time-to-saturation (TTS) measurement phase for high light intensity range 1010 and an FD ADC phase for measurement of overflow charge for medium light intensity 1008. Between times T1 and T2 the TTS measurement can be performed by comparing COMP_IN voltage with a static $V_{ref\_low}$ representing a saturation level of charge storage device 902 by comparator 906. When PIXEL_OUT voltage reaches the static VREF, the output of comparator 906 (VOUT) can trip, and a count value from counter 914 at the time when VOUT trips can be stored into memory bank 912. At time T2, controller 920 can perform a check 1202 of the state of comparator 906. If the output of comparator 906 trips, controller 920 can store the state in a register of output logic circuits 908 indicating that the overflow charge in charge storage device 902 exceeds threshold 1004. The storage of the state can also prevent subsequent measurement phases (FD ADC and PD ADC) from overwriting the count value stored in memory bank 912. The count value from TTS operation can then be provided to represent the intensity of light received by photodiode PD during the exposure period.

Between times T2 and T3, the FD ADC operation can be performed by comparing COMP_IN voltage with a ramping VREF voltage that ramps from $V_{ref\_low}$ to $V_{ref\_high}$, which represents the saturation level of photodiode PD (e.g., threshold 1002), as described in FIG. 11B. If VOUT of comparator 906 trips during FD ADC, the count value of counter 914 at the time when VOUT trips can be stored in memory bank 912, if the state flag in output logic circuits 908 is not asserted which indicated that charge storage device 902 does not saturate in the TTS operation. Although exposure period ends at time T2, between times T2 and T3 photodiode PD remains capable of accumulating residual charge (if not saturated) or transferring overflow charge to charge storage device 902. At time T3, the controller can perform a check 1204 of the state of comparator 906. If the output of comparator 906 trips, and the state flag in output logic circuits 908 is not asserted from the TTS operation, controller 920 can assert the state flag in output logic circuits 908 to indicate that the overflow charge in charge storage device 902 exceeds threshold 1004. The assertion of the state flag can also prevent the subsequent PD ADC phase from overwriting the count value stored in memory bank 912. The count value from FD ADC can then be provided to represent the intensity of light received by photodiode PD during the exposure period.

Between times T3 and T4 can be the second reset phase, in which both the RST and COMP_RST signals are asserted to reset charge storage device 902 (comprising the parallel combination of $C_{FD}$ capacitor and $C_{EXT}$ capacitor) and comparator 906 to prepare for the subsequent PD ADC operation. The $V_{CC}$ voltage can be set according to Equation 1.

After RST and COMP_RST are released, the LG is turned off to disconnect $C_{EXT}$ from $C_{FD}$ to increase the charge-to-voltage conversion rate for the PD ADC operation. The TG is set at a level to fully turn on the M1 charge transfer transistor to transfer the residual charge stored in photodiode PD to $C_{FD}$. The residual charge develops a new PIXEL_OUT voltage, $V_{pixel\_out\_sig2}$. The CC capacitor can AC couple the new PIXEL_OUT voltage $V_{pixel\_out\_sig2}$ into COMP_IN voltage by adding the $V_{CC}$ voltage. Between times T3 and T4, photodiode PD remains capable of generating additional charge in addition to the charge generated between times T1 to T3, and transferring the additional charge to charge storage device 902. The $V_{pixel\_out\_sig2}$ also represents the additional charge transferred between times T3 and T4. At time T4, the COMP_IN voltage can be as follows:

$$V_{comp\_in}(T4) = V_{pixel\_out\_sig2} - V_{pixel\_out\_rst} + V_{ref\_high} + V_{comp\_offset} \quad \text{(Equation 3)}$$

In Equation 3, the difference between $V_{pixel\_out\_sig2} - V_{pixel\_out\_rst}$ represents the quantity of charge transferred by the photodiode to charge storage device 902, between times T3 and T4. The comparator offset in the COMP_IN voltage can also cancel out the comparator offset introduced by comparator 906 when performing the comparison.

At time T4, the AB signal is asserted to prevent photodiode PD from accumulating and transferring additional charge. Moreover, VREF can be set a static level $V_{ref\_low\_margin}$. Comparator 906 can compare the COMP_IN voltage with $V_{ref\_low\_margin}$ to determine whether photodiode PD saturates. $V_{ref\_low\_margin}$ is slightly higher than $V_{ref\_low}$, which represents the saturation level of photodiode PD (e.g., threshold 1002), to prevent false tripping of comparator 906 when the quantity of residual charge is close to but does not exceed the saturation level.

Between times T4 and T5, controller 920 can perform the PD ADC operation by comparing the COMP_IN voltage with a VREF ramp that starts from $V_{ref\_low\_margin}$ to $V_{ref\_high}$. In the PD ADC phase, $V_{ref\_high}$ can represent the minimum detectable quantity of residual charge stored in photodiode PD, whereas $V_{ref\_low}$ margin can represent the saturation threshold of photodiode PD with margin to account for dark current, as described above. If the state flag in output logic circuits 908 remains de-asserted at this point, and if the output of comparator 906 trips, the count value of counter 914 when comparator 906 trips can be stored into memory bank 912, and the count value from PD ADC can be provided to represent the intensity of light.

Reference is now made to FIG. 12B, which illustrates another example sequence of the control signals of pixel cell 602a, generated by controller 920. In FIG. 12B, the PD ADC operation can be performed between the TTS and FD ADC operations, which can reduce the accumulation of additional charge in charge storage device 902 or in photodiode PD after the TTS operation and improve shutter efficiency. As shown in FIG. 12B, between times T0 and T1 is a first reset phase, as in FIG. 12A, in which both charge storage device 902 and comparator 906 can be put in a reset state by controller 920 by asserting the RST and COMP_RST signals. Moreover, the LG signal is asserted, which allows $C_{FD}$ and $C_{EXT}$ capacitors to be reset by the RST signal and the PIXEL_OUT signal is set at the reset level. With the COMP_RST signal asserted and the positive terminal of comparator 1102 connected to $V_{ref\_high}$, COMP_IN can be set to a sum of $V_{ref\_high}$ and comparator offset $V_{comp\_offset}$. Moreover, with the RST signal asserted, PIXEL_OUT can be set the reset voltage $V_{pixel\_out\_rst}$ and can include reset noise $V\sigma_{KTC}$. A first sampling operation can be performed by the CC capacitor to store a $V_{CC}$ voltage including the components of the comparator offset, the reset noise, and PIXEL_OUT voltage at the reset level, as described in Equation 1 above:

$$V_{cc}(T1) = (V_{ref\_high} + V_{comp\_offset}) - (V_{pixel\_out\_rst} + V\sigma_{KTC}).$$ (Equation 1)

Moreover, the AB signal can be asserted to prevent charge generated by photodiode PD from reaching charge storage device 902.

At time T1, the AB, COMP_RST, and the RST signals are released, which starts the exposure period in which photodiode PD can accumulate and transfer charge. The TG signal can set transfer transistor M1 in a partially turned-on state to allow PD to transfer overflow charge to charge storage device 902. The LG signal can remain asserted to operate in low gain mode, in which both $C_{FD}$ capacitor and $C_{EXT}$ capacitor are connected in parallel to form charge storage device 902 to store the overflow charge. The overflow charge develops a new PIXEL_OUT voltage, $V_{pixel\_out\_sig1}$. The CC capacitor can AC couple the PIXEL_OUT voltage to become the COMP_IN voltage. The COMP_IN voltage between times T1 and T2 can be set based on Equation 1 above.

Between times T1 and T2, a time-to-saturation (TTS) measurement can be performed by comparator 906 comparing COMP_IN voltage with a static $V_{ref\_low}$ to generate VOUT. At time T2, controller 920 can perform a check 1212 of the state of comparator 906. If the output of comparator 906 trips, controller 920 can store the state in a register of output logic circuits 908 indicating that the overflow charge in charge storage device 902 exceeds threshold 1004, as in FIG. 12A.

Following the TTS measurement, between times T2 and T5, the PD ADC operation can be performed to measure the residual charge stored in photodiode PD. The LG signal is de-asserted to disconnect $C_{EXT}$ from $C_{FD}$ to increase charge-to-voltage conversion ratio, as described above. The overflow charge (if any) is divided between $C_{FD}$ and $C_{EXT}$ based on a ratio of capacitances between $C_{FD}$ and $C_{EXT}$ such that $C_{FD}$ stores a first portion of the overflow charge and $C_{EXT}$ stores a second portion of the overflow charge. $V_{pixel\_out\_sig1}$ can correspond to the first portion of the overflow charge stored in $C_{FD}$.

To prepare for the PD ADC operation, between times T2 and T3, the COMP_RST signal is asserted again to reset comparator 1102. The resetting of comparator 1102 can set a new $V_{CC}$ voltage across the CC capacitor based on a difference between $V_{pixel\_out\_sig1}$ and the output of comparator 1102 in the reset state, as follows:

$$V_{CC}(T2) = (V_{ref\_high} + V_{comp\_offset}) - (V_{pixel\_out\_sig1}(T3) + V\sigma_{KTC}).$$ (Equation 4)

Optionally, the RST signal can be asserted between times T2 and T3 to reset $C_{FD}$ and to remove the first portion of the overflow charge, prior to the transfer of the residual charge. This allows the subsequent PD ADC operation to quantize only the residual charge rather than a mixture of the residual charge and the first portion of the overflow charge. Such arrangements can improve the accuracy of measurement of low light intensity, as there is no need to remove the overflow charge component (based on the result of the subsequent FD ADC operation) from the PD ADC operation output, which could otherwise introduce additional errors. On the other hand, not asserting the RST signal between times T2 and T3 can be advantageous, as such arrangements can introduce redundancy in the PD ADC and FD ADC operations and increase the signal-to-noise ratio, as both operations measure a mixture of residual and overflow charge.

Between times T3 and T4, the COMP_RST signal is released so that comparator 1102 exits the reset state. Moreover, the TG signal can set transfer transistor M1 in a fully turned-on state to transfer the residual charge to $C_{FD}$. The residual charge can be transferred to $C_{FD}$, which changes the PIXEL_OUT voltage to $V_{pixel\_out\_sig2}$. The new PIXEL_OUT voltage can be AC coupled into a new COMP_IN voltage at time T4, as follows:

$$V_{comp\_in}(T4) = V_{pixel\_out\_sig2} - V_{pixel\_out\_sig1} + V_{ref\_high} + V_{comp\_offset}$$ (Equation 5)

In Equation 5, the difference between $V_{pixel\_out\_sig2} - V_{pixel\_out\_sig1}$ represents the quantity of residual charge transferred by the photodiode to charge storage device 902 between times T3 and T4.

After the TG is fully turned on between times T3 and T4, the TG is de-asserted to disconnect photodiode PD from $C_{FD}$ and $C_{EXT}$. As a result, no additional charge is transferred to $C_{FD}$ and $C_{EXT}$ after time T4 until the start of next exposure period. Compared with the arrangements of FIG. 12A where additional charge can be accumulated in photodiode PD during the FD ADC operation which typically takes a long time, in FIG. 12B the additional charge is accumulated only during the reset period T2-T3 and the transfer period T3-T4, both of which are typically much shorter than an FD ADC operation. Moreover, after T4, no additional overflow charge is accumulated at charge storage device 608a. As a result, both FD ADC and PD ADC can process charge accumulated in almost the same exposure period as the TTS operation, which can improve the shutter efficiency of the image sensor.

Between times T4 and T5, controller 920 can perform the PD ADC operation by comparing the COMP_IN voltage with a VREF ramp that starts from $V_{ref\_high}$ to $V_{ref\_low\_margin}$. In the PD ADC phase, $V_{ref\_high}$ can represent the minimum detectable quantity of residual charge stored in photodiode PD, whereas $V_{ref\_low}$ margin can represent the saturation threshold of photodiode PD with a margin to account for dark current, as described above. If photodiode PD does not saturate, COMP_IN can go above the VREF ramp. An inverted VOUT (VOUTb) can become a logical one and cause a count value to be stored in memory bank 912 for PD ADC. At time T5, the controller can perform a check 1214 of the state of comparator 906 of the state of comparator 906. If the output of comparator 906 trips, and the state flag in output logic circuits 908 is de-asserted from the TTS operation, controller 920 can assert the state flag in output logic circuits 908 to indicate that the residual charge exceeds threshold 1002. The assertion of the state flag can also prevent the subsequent FD ADC phase from overwriting the count value stored in memory bank 912. The count value from PD ADC can then be provided to represent the intensity of light received by photodiode PD during the exposure period.

Between times T5 and T8, an FD ADC operation can be made to measure the overflow charge transferred by photodiode PD within the exposure period. As photodiode PD remains disconnected from $C_{FD}$ and $C_{EXT}$, no additional charge is transferred to $C_{FD}$ and $C_{EXT}$, and the total charge stored in $C_{FD}$ and $C_{EXT}$ is mostly generated in the exposure period $T_{exposure}$, together with additional charge generated by the photodiode between times T3 and T4.

At time T5, the LG signal is asserted to connect $C_{FD}$ with $C_{EXT}$, which allows the second portion of the overflow charge stored in $C_{EXT}$ to combine with the residual charge stored in $C_{FD}$ (and the first portion of the overflow charge if RST is not asserted between times T2 and T3), and a new PIXEL_OUT voltage, $V_{pixel\_out\_sig3}$, can develop at the parallel combination of $C_{FD}$ and $C_{EXT}$ and is to be quantized.

Between times T5 and T7, a noise sampling operation can be performed to mitigate the effect of reset noise and comparator offset on the FD ADC operation. Between times T5 and T6, comparator 1102 can be reset as part of the first sampling operation. The positive terminal of comparator 1102 is connected to the lower end of VREF, $V_{ref\_low}$. The $V_{CC}$ voltage can include components of reset noise and comparator offset as described above. The $V_{CC}$ voltage can be as follows:

$$V_{cc}(T5) = (V_{ref\_low} + V_{comp\_offset}) - (V_{pixel\_out\_sig3} + V\sigma_{KTC1}).$$ (Equation 6)

Between times T6 and T7, both $C_{FD}$ and $C_{EXT}$ can be reset, while comparator 1102 exits the reset state, as part of a second sampling operation. As a result of resetting, PIXEL_OUT can be reset to a reset voltage $V_{pixel\_out\_rst}$ Moreover, second reset noise charge is also introduced into charge storage device 608, which can be represented by $V\sigma_{KTC2}$. The second reset noise charge typically tracks the first reset noise charge. At time T6, as the result of the second sampling operation, $V_{pixel\_out}$ can be as follows:

$$V_{pixel\_out}(T6) = V_{pixel\_out\_rst} + V\sigma_{KTC2}.$$ (Equation 7)

At time T7, COMP_RST is released, and comparator 1102 exits the reset state. Via AC-coupling, the COMP_IN voltage can track $V_{pixel\_out}$ (T6) in addition to $V_{cc}$ (T5) as follows:

$$V_{comp\_in}(T7) = (V_{ref\_low} + V_{comp\_offset}) + (V_{pixel\_out\_rst} - V_{pixel\_out\_sig3}) + (V\sigma_{KTC2} - V\sigma_{KTC1})$$ (Equation 8)

Following the second sampling operation, the COMP_IN voltage can be quantized by comparing against a VREF ramp between times T7 and T8. When VREF goes above COMP_IN, VOUT can become a logical one. If the state flag in output logic circuits 908 remains de-asserted at this point, the count value of counter 914 when comparator 906 trips can be stored into memory bank 912, and the count value from FD ADC can be provided to represent the intensity of light. After time T8, the digital value stored in memory bank 912 can be read out to represent the intensity of light received by photodiode PD within the integration, at time T9. In a case where one image frame is generated in a single frame period, the frame period can span from time T0 to T8.

Although FIG. 12A and FIG. 12B show TTS, FD ADC and PD ADC operations are performed, it is understood that ADC 616 (and pixel cell 602a) needs not perform all of these operations, and can skip some of them. As to be described below, the quantization operations may vary for different photodiodes within pixel cell 602a.

Figure 13A:
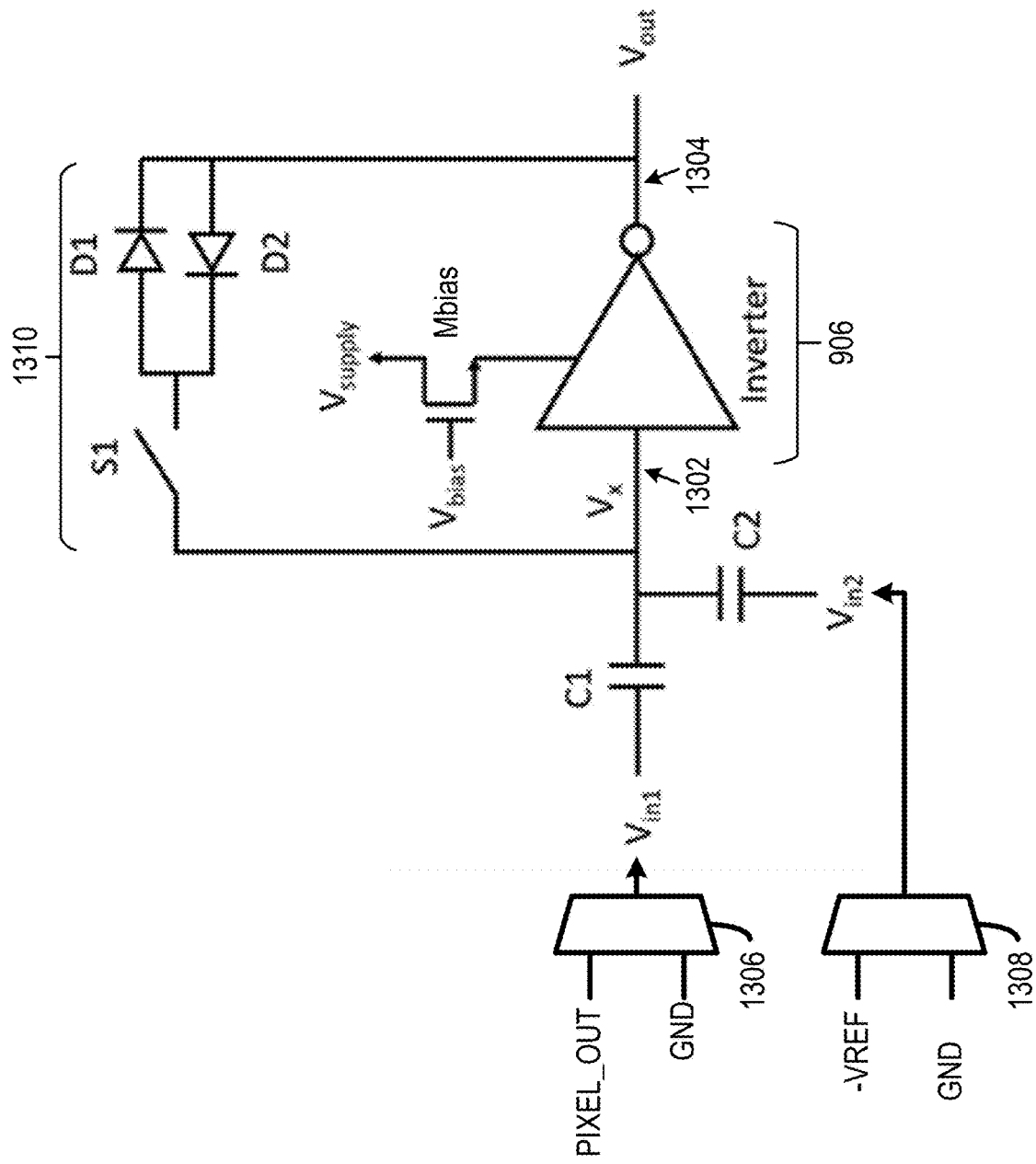
FIG. 13A, FIG. 13B, FIG. 13C, FIG. 13D, FIG. 13E, FIG. 13F, and FIG. 13G illustrate examples of internal components of the image sensor of FIG. 9 and their operations.
Figure 13B:
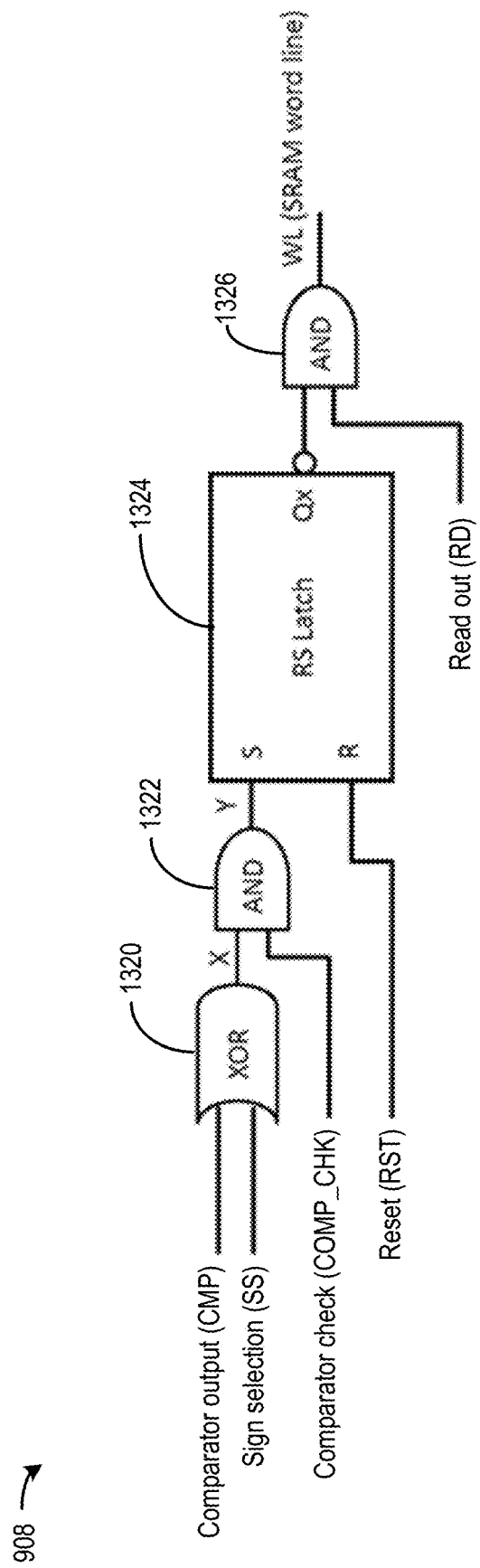

Example Techniques to Reduce Footprint and Power of Image Sensor Circuit Components FIG. 13A and FIG. 13B illustrate example techniques to reduce the footprint and/or power of circuit components of image sensor 900 of FIG. 9, such as comparator 906 and output logic circuits 908. FIG. 13A illustrates an example of comparator 906. Referring to FIG. 13A, comparator 906 can be implemented using a inverter circuit having a single input 1302 and a single output 1304. In addition, input 1302 of comparator 906 can be connected with a C1 capacitor and a C2 capacitor. The C1 capacitor can be the CC capacitor of FIG. 9. The left plate of C1 capacitor can receive a voltage $V_{in1}$ from a multiplexor 1306, which selects between the PIXEL_OUT voltage from buffer 904 and a ground voltage (GND) for the voltage $V_{in1}$. Moreover, the right plate of C1 capacitor is connected to input 1302. In addition, the left plate of C2 capacitor can receive a voltage $V_{in2}$ from a multiplexor 1308, which selects between a negative VREF voltage (−VREF) and ground voltage GND for the voltage $V_{in2}$. Comparator 906 further includes a switchable feedback path 1310 comprising switch S1, which can include transistor M8 and can be controlled by the COMP_RST signal of FIG. 9 to connect/disconnect between input 1302 with output 1304 of the inverter The inverter circuit can operate in two phases, including a reset phase and a comparison phase. In the reset phase, feedback path 1310 can be enabled to connect input 1302 and output 1304 of the inverter circuit so that input voltage $V_x$ and output voltage Vout are equal. By equalizing the input and output voltages, $V_x$ (and the right plates of capacitors C1 and C2) can be set at the inverter threshold voltage, $V_{threshold}$. Moreover, in the reset phase, multiplexors 1306 and 1308 can connect the left plates of C1 and C2 capacitors to the ground voltage. At the end of the reset phase, each of C1 capacitor and C2 capacitor can store a voltage difference equal to the inverter threshold voltage $V_{threshold}$ between their left plates and right plates.

During the comparison phase, feedback path 1310 can be disabled to disconnect input 1302 from output 1304, so that the inverter can generate the output voltage Vout based on comparing the input voltage $V_{in}$ against the inverter threshold voltage $V_{threshold}$. Moreover, multiplexors 1306 and 1308 can connect the left plates of C1 and C2 capacitors to, respectively, PIXEL_OUT voltage and the negative VREF voltage. Assuming that C1 and C2 capacitors have the same capacitance, based on charge sharing between the two capacitors, the right plates voltage of C1 and C2 capacitors, $V_x$, can become equal to an average between the PIXEL_OUT voltage and the negative VREF voltage offset by the inverter threshold voltage $V_{threshold}$, as follows:

$$V_x = \frac{V_{PIXEL\_OUT} - V_{REF}}{2} + V_{threshold}.$$ (Equation 9)

In Equation 9 above, $V_{PIXEL\_OUT}$ represents the PIXEL_OUT voltage, whereas $V_{REF}$ represents the VREF voltage. The inverter can then generate the output voltage Vout based on whether the input voltage $V_x$ exceeds the inverter threshold voltage $V_{threshold}$. If the input voltage $V_x$ exceeds the inverter threshold voltage $V_{threshold}$, which can indicate that $V_{PIXEL\_OUT}$ exceeds the VREF voltage, the input voltage $V_x$ can exceed the inverter threshold voltage $V_{threshold}$, and the inverter can output a logical one. On the other hand, if the input voltage $V_x$ is below the inverter threshold voltage $V_{threshold}$, which can indicate that V PIXEL_OUT is below the VREF voltage, the input voltage $V_x$ can be lower than the inverter threshold voltage $V_{threshold}$, and the inverter can output a logical zero. With such arrangements, the inverter can generate an output that represents a comparison result between V PIXEL_OUT and $V_{threshold}$, which allows image sensor 900 to do away with an analog comparator that typically has a much a larger footprint (e.g., including a differential pair, output stage, current sources) and consumes a lot more power.

In some examples, as shown in FIG. 13A, feedback path 1310 can include a device having a voltage-dependent impedance, such as diodes D1 and D2, to reduce the thermal noise and the required capacitances of capacitors C1 and C2 to achieve a certain thermal noise target. Specifically, the device can have a low impedance in the early stage of the reset phase when there is a large difference between the $V_x$ and Vout voltages, such that one of diodes D1 or D2 is in forward bias. As the $V_x$ and Vout voltages become equalized, both diodes D1 and D2 can be in reverse bias, and feedback path 1310 can have a large impedance. With the increased impedance, the bandwidth of thermal noise is reduced, and thus the noise added on capacitors C1 and C2 can be reduced to become less than what is defined by KT/C. Therefore, the capacitances of C1 and C2 capacitors can be made smaller for a certain noise target, which can reduce the footprints of C1 and C2 capacitors as well as the overall footprint of image sensor 900.

In addition, the power supply terminal of the inverter can be connected to a supply voltage ($V_{supply}$) via a transistor Mbias configured as a source follower. The transistor can provide extra isolation and reduce noise from $V_{supply}$ to affect the inverter. In addition, the transistor Mbias can be controlled by a bias voltage Was which can be adjusted by a feedback loop to suppress/reduce performance variations due to different process/supply voltage/temperature (PVT) conditions.

Figure 13C:
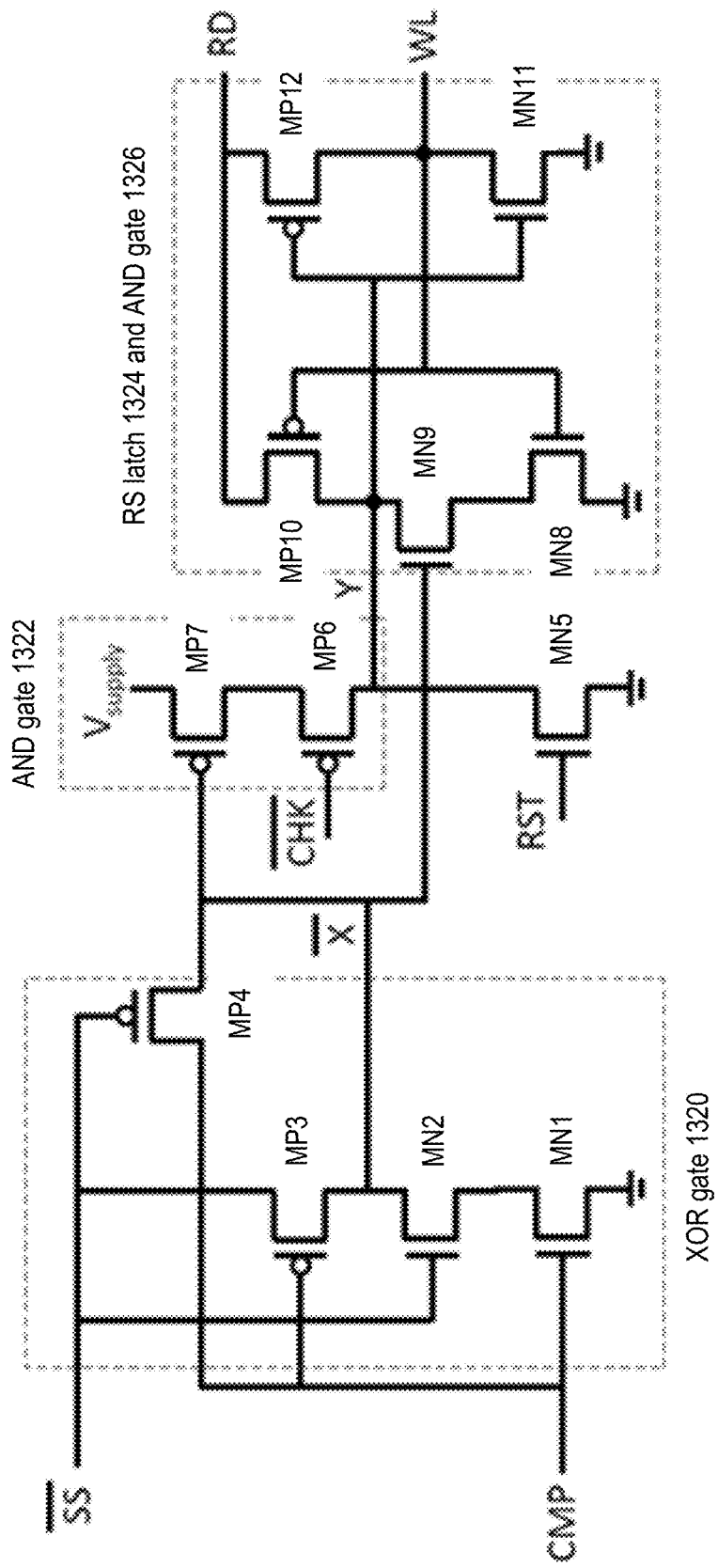

FIG. 13B and FIG. 13C illustrate an example of internal components of output logic circuits 908 and its operation. As shown in FIG. 13B, output logic circuits 908 can include an XOR gate 1320, a first AND gate 1322, an RS latch 1324, and a second AND gate 1326. Output logic circuits 908 can receive, as inputs, a comparator output (CMP), a sign selection (SS), a comparator check (COMP CHK), a reset signal (RST), and a read out signal (RD). Output logic circuits 908 can also generate, as an output, the WL signal to control the write and read operations at memory 912. Some of the signals, such as read out signal (RD), reset signal (RST), and sign selection (SS) can be supplied by controller 920.

As described above, output logic circuits 908 can store a state of whether the count value stored in memory 912 is frozen. Referring back to FIG. 12A and FIG. 12B, output logic circuits 908 can receive a COMP CHK signal 1202/1212 during a TTS operation to check the output of comparator. If the overflow charge stored in charge storage device 902 exceeds the saturation threshold during the TTS operation, a count value can be stored in memory 912, and the stored count value can be frozen and not to be overwritten by subsequent FD ADC and PD ADC operations. Otherwise one of the subsequent stages (FD ADC or PD ADC) can store a count value in memory 912 when output logic circuits 908 can receive a COMP CHK signal 1204/1214, and the comparator output indicates overflow charge is stored in charge storage device 902. The sign selection allows the polarity of comparison by the comparator to be reversed, as described in FIG. 12B.

FIG. 13C illustrate examples of internal components of output logic circuits 908. As shown in FIG. 13C, output logic circuits 908 can include six NMOS transistors MN1, MN2, MN5, MN8, MN9, and MN11, as well as six PMOS transistors MP3, MP4, MP6, MP7, MP10, and MP12, to form XOR gate 1320, first AND gate 1322, RS latch 1324, and second AND gate 1326. All transistors can be used as switches and can have minimum sizes. The same number of NMOS and PMOS enables easier layout design.

In FIG. 13C, MN1, MN2, MP3, and MP4 can form XOR gate 1320, which enables the sign selection input (SS) to select the effective polarity of the comparator output (CMP). MN8, MN9, MP10, MN11, and MP12 can form RS latch 1324, which can record the state of whether the count value is to be frozen in memory 912, based on which the word line control output (WL) can be generated to control whether a count value is to be stored into memory 912. Moreover, the power supply terminal of RS latch 1324 can be connected to the read out control signal (RD), such that the output of the latch (WL) can represent an AND operation to RD. Once RD becomes low (logical zero), WL can also go low.

At the beginning of the quantization operations, the state reset signal (RST) can go high. Moreover, the read out control signal (RD) also goes high (logical one). MN5 can short node Y to the ground and thus force the latch state to be of high WL. When the COMP CHK signal is asserted, MP6 can be turned on, which allows the latch state to be changed by MP7 and MN9 and based on the comparator output (CMP).

Figure 13D:
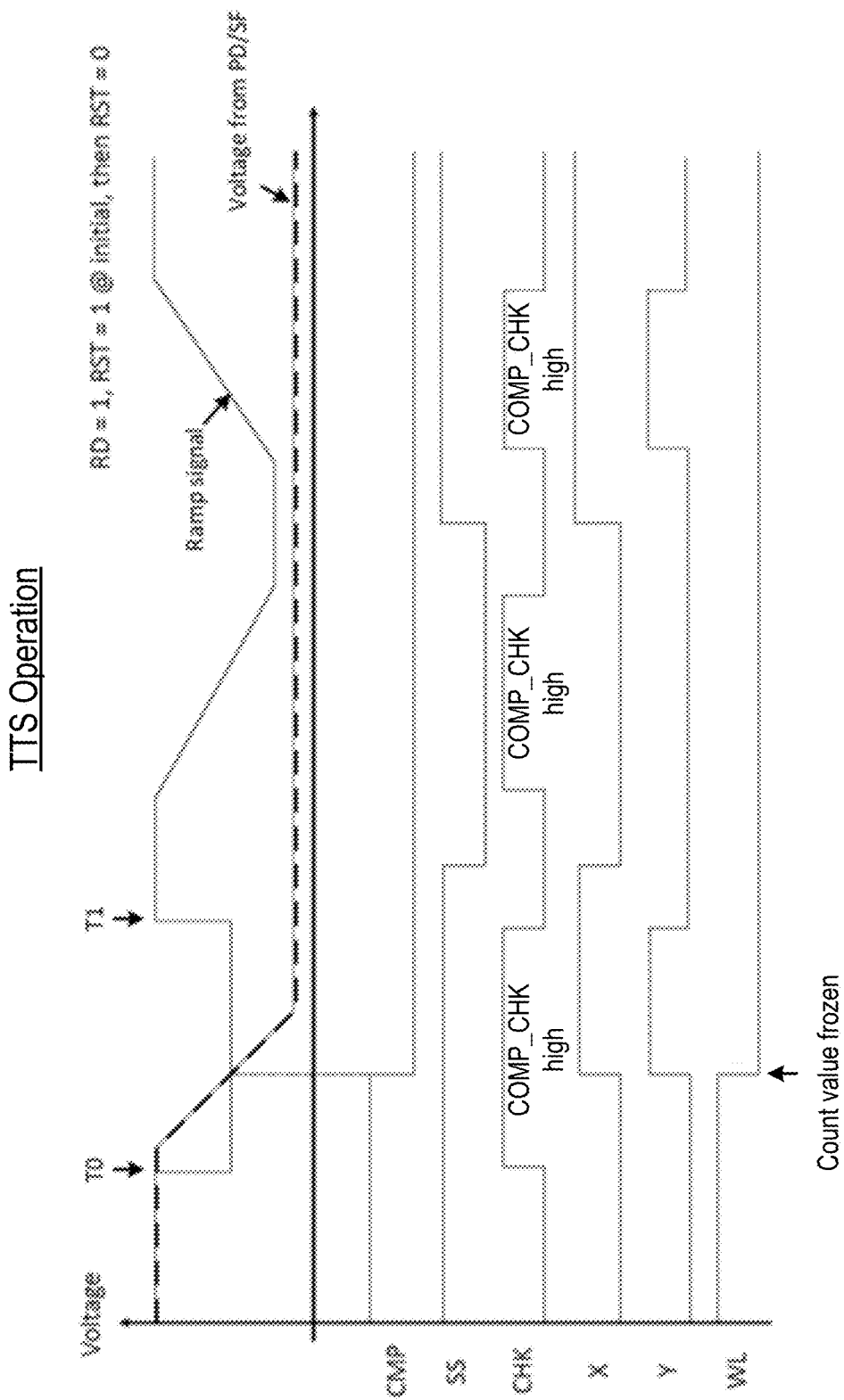
Figure 13E:
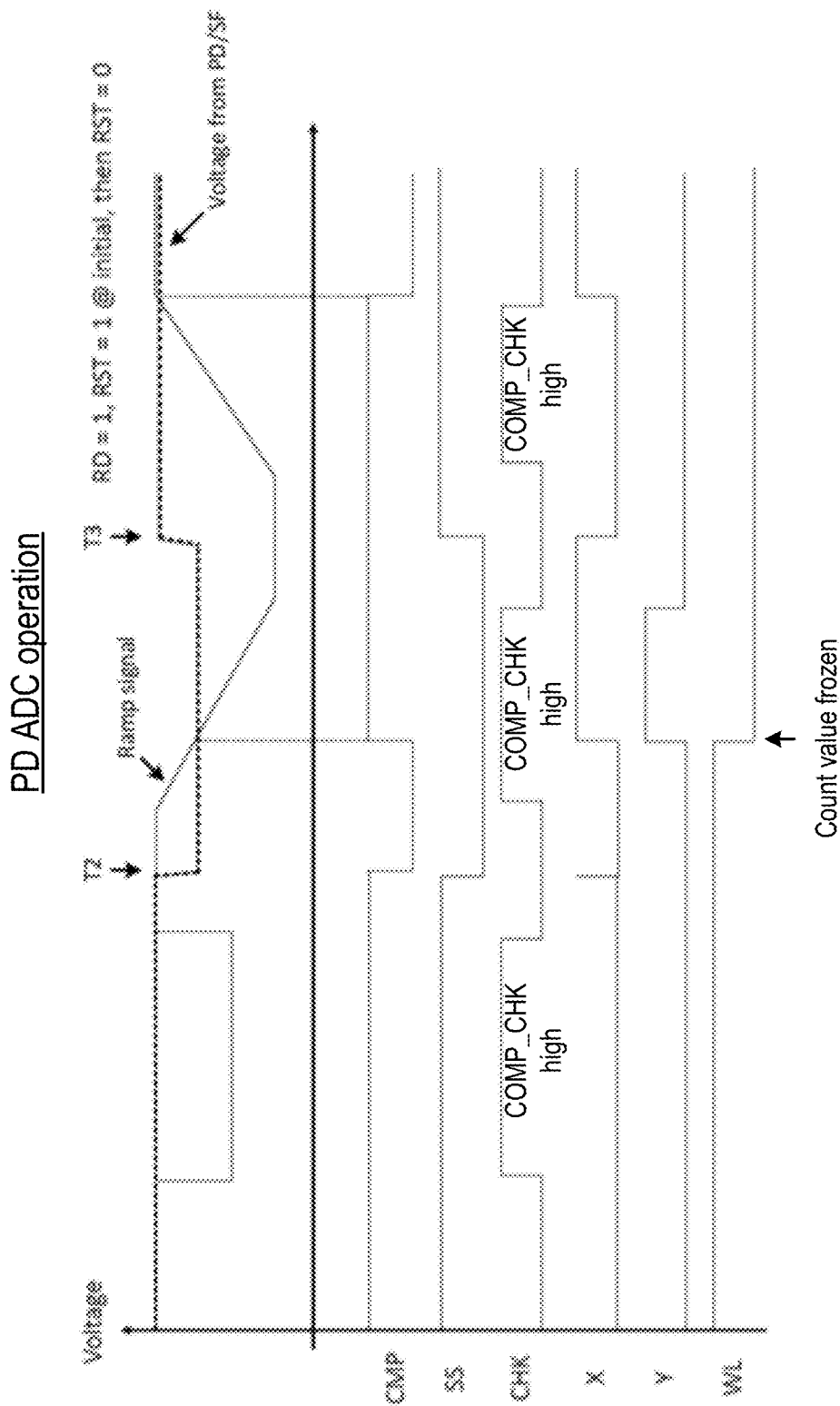
Figure 13F:
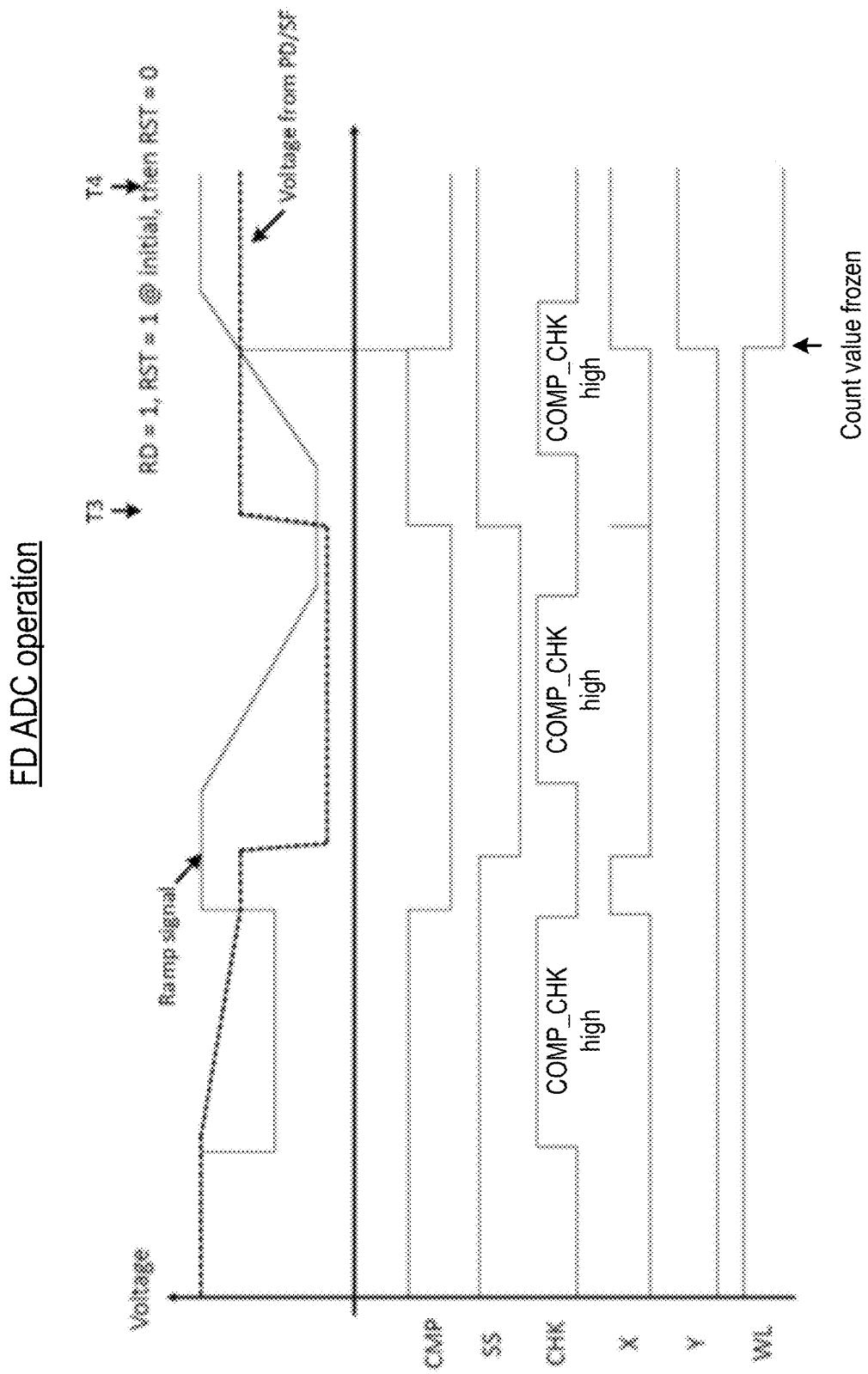

FIG. 13D, FIG. 13E, and FIG. 13F illustrate the operations of output logic circuits 908 during the TTS, PD ADC, and FD ADC measurement operations. FIG. 13D illustrates an example of a TTS measurement operation. Referring to FIG. 13D, a TTS measurement can occur between times T0 and T1. Between T0 and T1, the ramp signal provides a static threshold voltage to the comparator. The threshold can represent a saturation limit of charge storage device 902 ($C_{FD}$) and $C_{EXT}$) of FIG. 9. At time T0, counter 914 can start. With WL high, memory 912 can be connected to the bit lines, which are driven by counter 914, and memory 912 can write in new count values from counter 914. Between times T0 and T1, the COMP CHK signal can be asserted so that the state in RS latch 1324 can be changed by the CMP output by comparator 906. If the intensity of light is within a predetermined medium intensity range or within a predetermined high intensity range, the photodiode will become saturated and overflow charge can flow from the photodiode to the storage capacitor charge storage device 902. If the intensity of light is of the high intensity range, the quantity of overflow charge from the photodiode accumulated at the storage capacitor can reach the saturation limit. As a result, the COMP_IN voltage crosses the threshold, and CMP output can trip, which causes WL to go low, and the last count value stored in memory 912 can be frozen. The value frozen in memory 912 can represent a time-to-saturation measurement. Controller 920 can also de-assert RD signal once WL signal goes low, to prevent subsequent PD ADC and FD ADC operations from overwriting the count value stored in memory 912.

FIG. 13E illustrates an example of a PD ADC operation. Referring to FIG. 13E, a PD ADC measurement operation can occur between times T2 and T3. Between T2 and T3, capacitors $C_{FD}$ and $C_{EXT}$ can be disconnected from each other. Capacitor $C_{FD}$ may store a first part of the overflow charge (if any) accumulated between times T0 and T1, whereas capacitor $C_{EXT}$ can store a second part of the overflow charge (if any) accumulated between times T0 and T1. Residual charge accumulated at the photodiode (if any) can then be transferred to capacitor $C_{FD}$ to generate a new voltage. The source follower can buffer the new voltage at the first capacitor. At time T2, counter 914 can reset. With WL high (if no count value is latched in the TTS measurement operation), memory 912 can be connected to the bit lines which are driven by counter 914, and memory 912 can write in new count values from counter 914. Between times T2 and T3, a ramp signal can be provided to be the comparator to compare against the buffered new voltage. When the ramp signal crosses the buffered voltage, the output of comparator CMP can trip, which causes WL to go low, and the last count value stored in memory 912 can be frozen. The count value frozen in memory 912 can represent a PD ADC measurement. The comparison polarity of the PD ADC measurement can be reversed with respect to TTS, as described in FIG. 12B. Controller 920 can also de-assert RD signal once WL signal goes low, to prevent the subsequent FD ADC operation from overwriting the count value stored in memory 912.

FIG. 13F illustrates an example of an FD ADC operation. Referring to FIG. 13F, a PD measurement operation can occur between times T3 and T4. The FD measurement can be performed when capacitor $C_{FD}$, which may store a mixture of a first part of the overflow charge and residual charge, is connected in parallel with capacitor $C_{EXT}$, which may store only a second part of the overflow charge, to generate a new buffered voltage. At time T3, counter 914 can reset. With WL high (if no count value is latched in the TTS measurement operation and the FD ADC measurement operation), memory 912 can be connected to the bit lines, which are driven by counter 914, and memory 912 can write in new count values from counter 914. A ramp signal can be provided to the CMP to compare with the buffered voltage. When the ramp signal crosses the buffered voltage, the output of comparator CMP can trip, which causes WL to go low, and the last count value stored in memory 912 can be frozen. The count value frozen in memory 912 can represent an FD ADC measurement. The comparison polarity of the FD ADC measurement can be the same as TTS, as described in FIG. 12B.

Figure 13G:
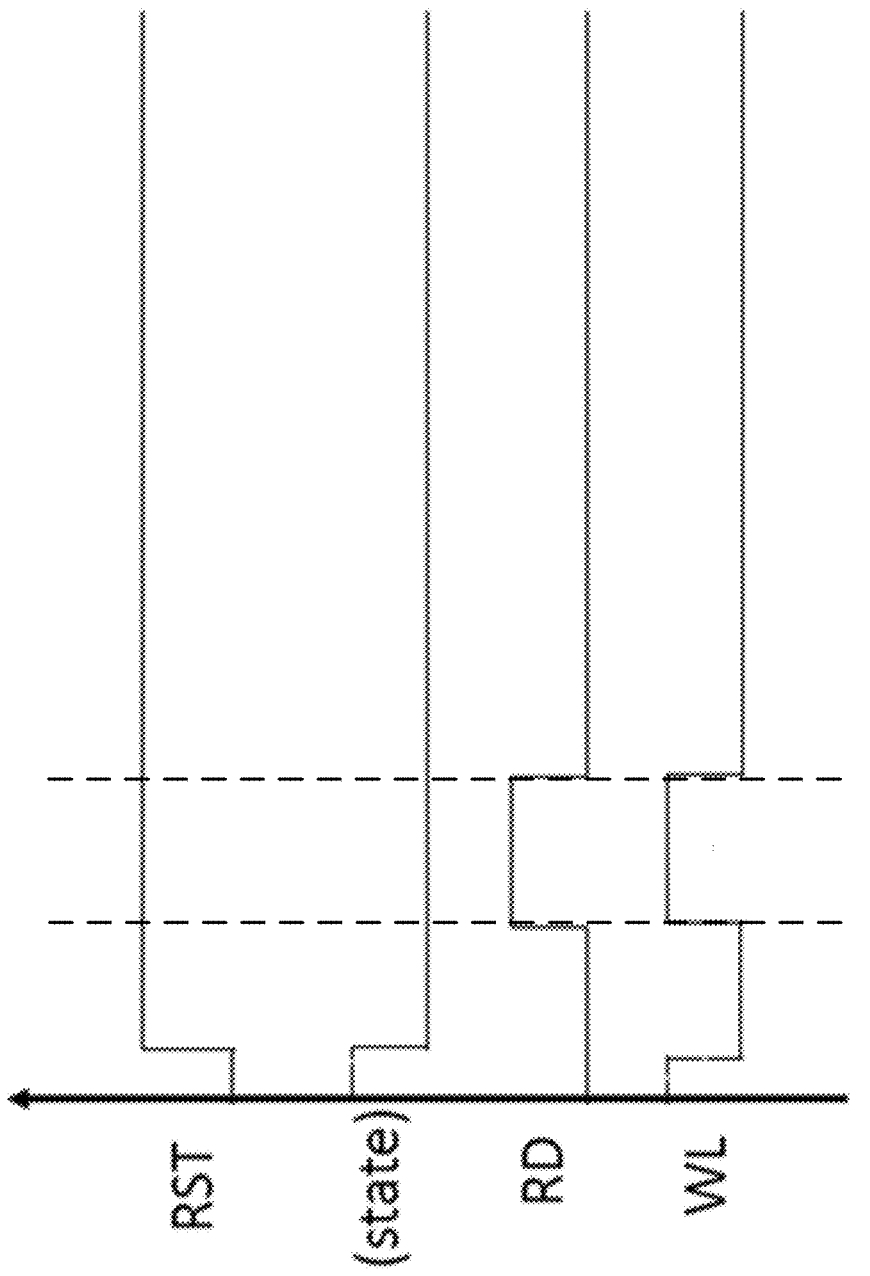

FIG. 13G illustrates an example of a read out operation. The read out operation can be performed between times T5 and T6, which can be after the TTS, FD ADC and PD ADC measurement operations, or after any one of these operations. Referring to FIG. 13G, before the read out operation the reset state signal (RST) can be asserted. The RD signal can also be asserted, which makes WL high. The bit lines can be driving bit line drivers instead of counter 914. The assertion of the WL signal can connect the memory to the bit line drivers to read out the count values stored in the memory.

Figure 14A:
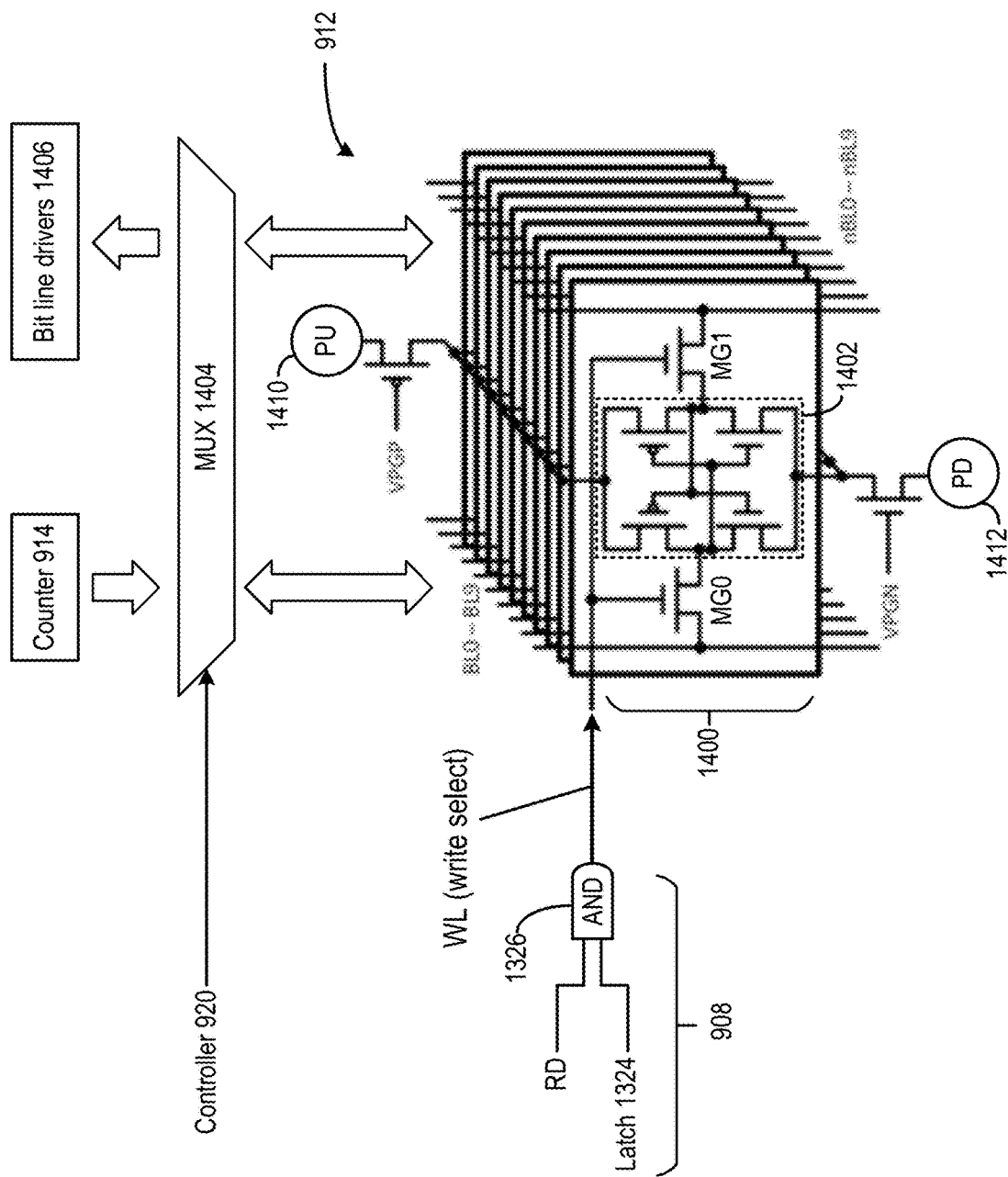
FIG. 14A, FIG. 14B, and FIG. 14C illustrate examples of internal components of the image sensor of FIG. 9 and their operations.
Figure 14B:
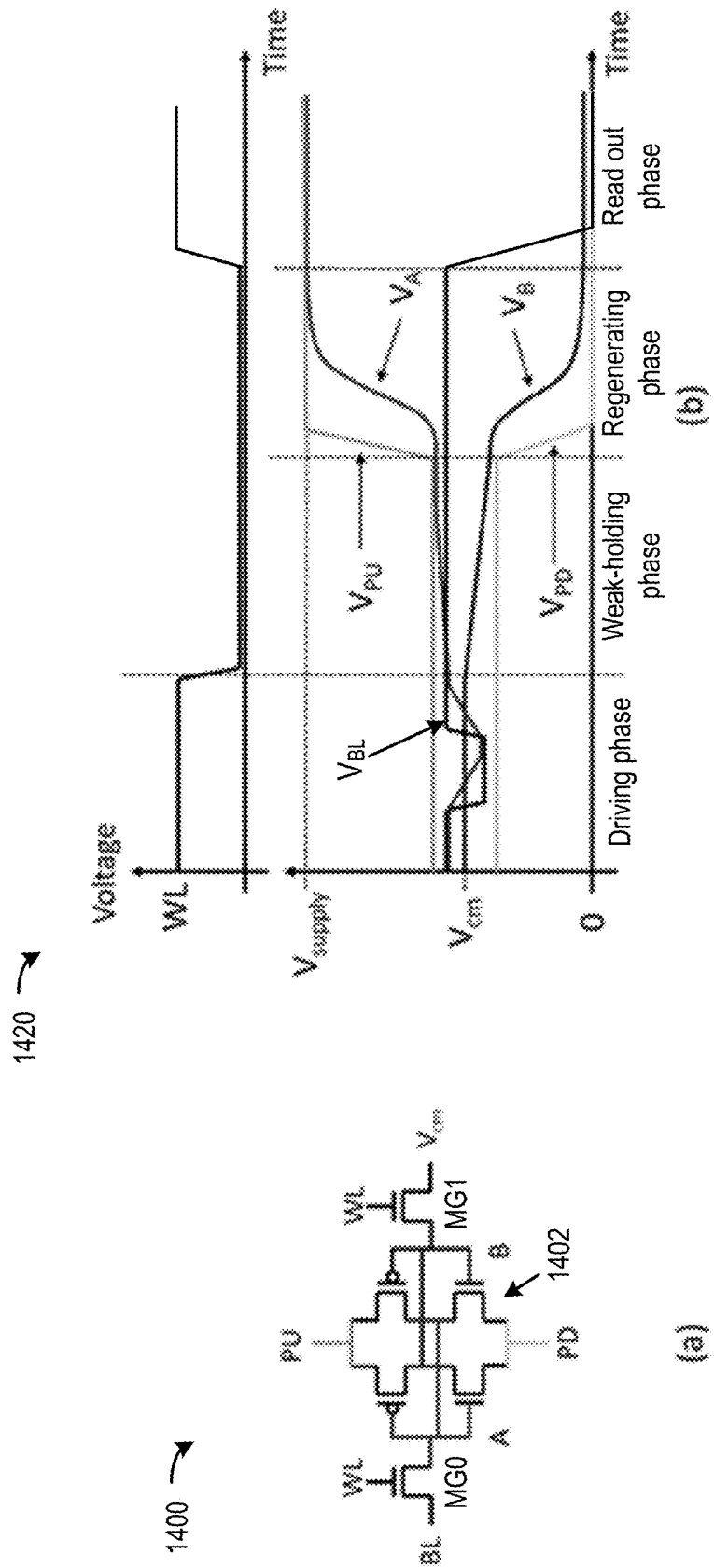
Figure 14C:
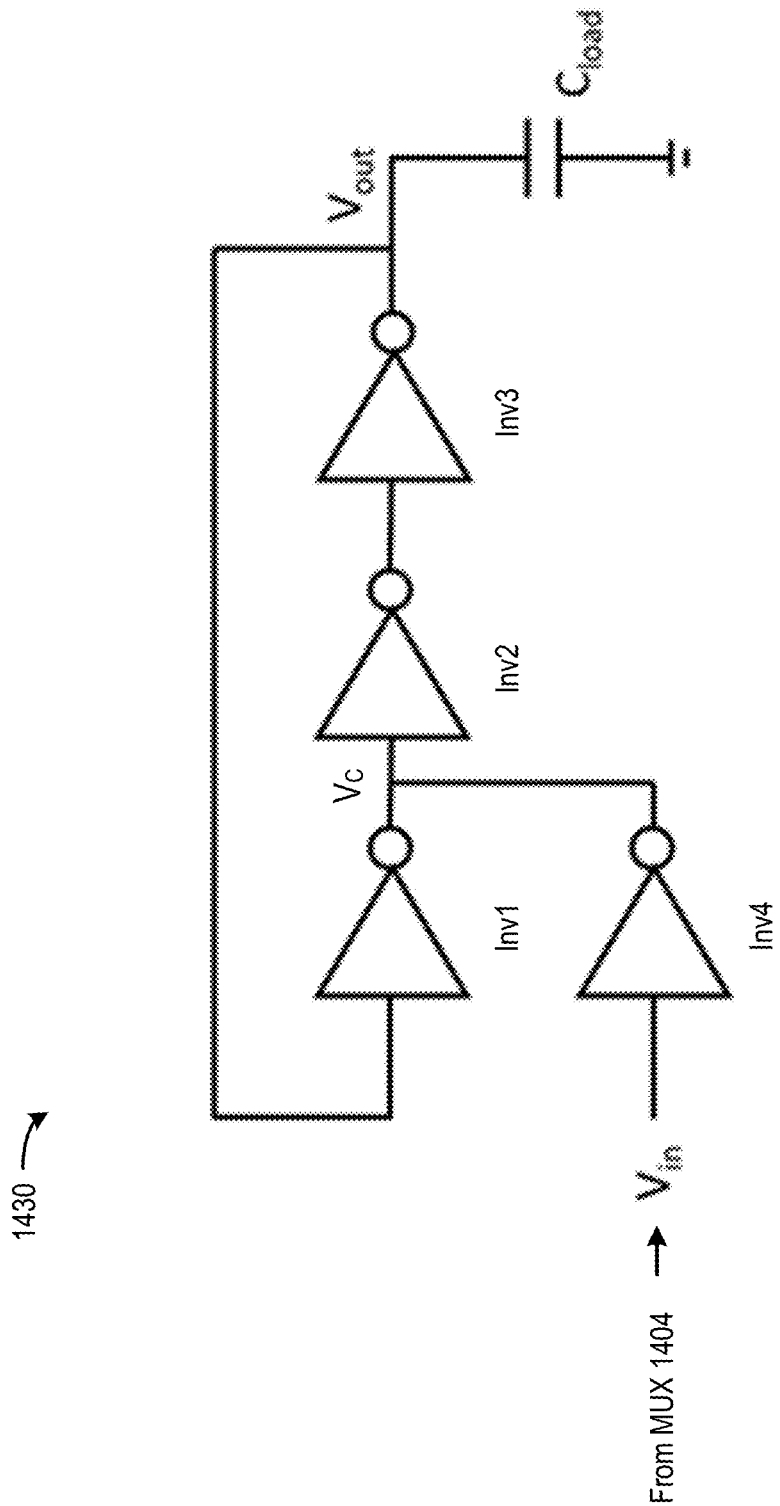

FIG. 14A, FIG. 14B, and FIG. 14C illustrate example techniques to reduce the footprint and/or power of memory 912, such as operating memory 912 based on a low swing operation to reduce power consumption in charging and discharging various peripheral components of the memory, such as bit lines. FIG. 14A illustrates an example of memory 912. Referring to FIG. 14A, memory 912 may include a bank of ten bit cells, including bit cell 1400, with each bit cell configured to store a bit of a multi-bit count value. Bit cell 1400 may include a pair of cross-coupled inverters 1402 that store a pair of differential logic bit states, as well as a pair of pass-gate transistors MG0 and MG1 connected between the inverters and the bit lines to provide read and write access to the differential logic bit states. For example, transistor MG0 of each bit cell is connected to a bit line BL (e.g., one of BL0-BL9), whereas transistor MG1 of each bit cell is connected to a bit line nBL (e.g., one of nBL0-nBL9).

Both transistors MG0 and MG1 are controlled by the WL signal generated by output logic circuits 908 to provide read and write access to bit cell 1400. To perform a write operation, SR latch 1324 can assert the WL signal, while controller 920 can control multiplexor (MUX) 1404 to connect counter 914 with bit lines BL and nBL, which allows cross-coupled inverters 1402 to be driven by bit lines BL and nBL to store a bit value supplied by counter 914 as the differential bit state. When SR latch 1324 de-asserts the WL signal based on the comparator output, cross-coupled inverters 1402 can be disconnected from the bit lines BL and nBL, which allows the inverters to preserve the stored bit state. To perform a read operation, SR latch 1324 can assert the WL signal, while the RD signal is also asserted, as shown in FIG. 13G, to connect cross-coupled inverters 1402 to bit lines BL and nBL. Multiplexor 1404 can be controlled by controller 920 to connect bit lines BL and nBL with bit line drivers 1406, which allows cross-coupled inverters 1402 to drive bit line drivers 1406 for read out of the bit state stored in the bit cell.

Memory 912 can be configured to support a low-swing write operation. Specifically, the power supply terminal of cross-coupled inverters 1402 can be connected to a variable pull up (PU) voltage source 1410, whereas the ground terminal of the cross-coupled inverters 1402 can be connected to a variable pull down (PD) voltage source 1412. Variable PU voltage source 1410 can set a maximum voltage within cross-coupled inverters 1402, whereas variable PD voltage source 1412 can set a minimum voltage within cross-coupled inverters 1402, and the voltage sources can set a voltage swing in the pair of cross-coupled inverters. The voltage swing can be reduced to allow the pair of cross-coupled inverters to be programmed, during the write operation, by a low-swing signal at the bit lines BL and nBL, to reduce the power consumption in charging and discharging bit lines BL and nBL.

FIG. 14B illustrates a chart 1420 that describes the operations of bit cell 1400. As shown in FIG. 14B, the operations of bit cell 1400 can be divided into 4 phases: a driving phase (Phase 1), a weak-holding phase (Phase 2), a regenerating phase (Phase 3), and a readout phase (Phase 4). During the driving phase, the PU voltage source can supply a voltage of $V_{cm}+V_{rail}$, while the PD voltage source can supply a voltage of $V_{cm}-V_{rail}$. The $V_{cm}$ voltage can be roughly half of the supply voltage $V_{supply}$, while $V_{rail}$ can be roughly half of the intrinsic threshold voltage of the transistors of the inverters. Moreover, the bit line BL can be driven by a low-swing two-level signal ($V_{BL}$) centered at $V_{cm}$. The high-level of the driving signal, representing a logical one, can have a voltage of $V_{cm}+V_{swing}$, whereas the low-level of the driving signal, representing a logical zero, can be $V_{cm}-V_{swing}$. The voltage $V_{swing}$ can be roughly 75% of $V_{rail}$. Such low-swing driving can save substantial amount of power on charging/discharging the parasitic capacitance of the bit line BL, compared with a conventional full-swing voltage (e.g., a voltage swing between supply voltage $V_{supply}$ and ground). Meanwhile, the other bit line of bit cell 1400, nBL, can be connected to a static voltage $V_{cm}$ throughout the different phases of the operations of bit cell 1400. This bit line can be shared with other bit cells of memory 912, such that the total number of bit lines connected to memory 912 can be reduced (e.g., halved), while further reducing the power consumption in charging and discharging the nBL bit line. The word line (WL) can be set to high (e.g., near $V_{supply}$) during the driving phase, to allow bit lines BL and nBL to drive and change the inner nodes A and B of cross-coupled inverters 1402, to store a bit value in bit cell 1400.

During the weak-holding phase, WL can be set to low (e.g., near 0V) to isolate the inner nodes A and B from the pass-gate transistors MG0 and MG1. The four transistors of cross-coupled inverters 1402 can be in a deep subthreshold state since their gate voltages are lower than the threshold voltage of the transistors. They can still conduct a tiny leakage current to slowly pull the node voltage $V_A$ and $V_B$ to become near $V_{PU}$ or $V_{PD}$, depending on whether a logical one or logical zero is stored in the driving phase. The leakage current is also generally strong enough to compensate the leakage of parasitic diode, and therefore the data can be kept consistently during the weak-holding phase. The write operation can end with the weak-holding phase.

To start a read operation, bit cell 1400 can enter a regenerating phase, in which the PU voltage source can supply a voltage of $V_{supply}$, while the PD voltage source can supply a zero volt voltage, to maximize the voltage difference between inner nodes A and B of cross-coupled inverters 1402. During the read out phase, the WL signal can be asserted to enable MG0 to connect node A to the bit line BL, while MG 1 can remain disabled. Node A can then drive the bit line BL with the full swing (e.g., a zero volt voltage for a logical zero, a $V_{supply}$ voltage for a logical one).

In some examples, a multi-stage bit line driver having limited low-swing between stages can be interposed between each bit cell of memory 912 and a bit line (e.g., one of bit lines BL0-BL9) to further increase the driving strength of the bit line signals during the read operation. The increased driving strength is needed, especially in a case where the bit lines are connected to other circuits external to the image sensor. FIG. 14C illustrates an example of a multi-stage bit line driver 1430. As shown in FIG. 14C, multi-stage bit line driver 1430 can include multiple inverters, including inverters Inv1, Inv2, Inv3, and Inv4. Inverters Inv1, Inv2, and Inv3 can connect in a ring structure, with Inv3 providing an output voltage Vout to drive a bit line having a capacitance of $C_{load}$, which can be in the order of a few hundred pico-farads, and thus forming the dominant pole to stabilize the feedback loop.

The internal node C is driven by both inverters Inv1 and Inv4, with inverter Inv4 receiving an input voltage $V_{in}$ from MUX 1404 (or directly from memory 912). At steady-state, the voltage of internal node C, $V_C$, is roughly at the threshold voltage of Inv2, due to the large loop gain provided by the inverter chain. The input voltage $V_{in}$ can have a full swing (e.g., 0 to $V_{supply}$). When $V_{in}$ is low, there can be extra current outputting from Inv4 into $V_C$. Due to the feedback, $V_C$ is kept at the threshold voltage of Inv2. The feedback loop can increase Vout to become higher than the inverter threshold voltage, to enable the pull-down path of inverter Inv1 to drain away the extra current from Inv4. This can keep $V_C$ largely constant instead of being charged up by the extra current. Moreover, when $V_{in}$ is high, the feedback loop can decrease Vout to become lower than the inverter threshold voltage, to enable the pull-up path of inverter Inv1 to deliver extra current for Inv4. This can also keep $V_C$ largely constant instead of being discharged to provide the extra current. The voltage swing of Vout is deterministic and can be determined by the transistor size ratio between Inv1 and Inv4. Moreover, the output inverter (Inv3) can biased in subthreshold at steady-state. As a result, the output inverter's output current can be independent of its DC biasing current, and can have a very high power efficiency.

Example Techniques to Reduce Power of TTS measurement Operation

Referring back to FIG. 12A and FIG. 12B, the duration of the TTS measurement operations can track linearly with the duration of the exposure period. For example, in FIG. 12A, the duration of the TTS measurement operation can be set based on the duration of the exposure period ($T_{exposure}$) minus the duration for the FD ADC operation. As another example, in FIG. 12B, the duration of the TTS measurement operation can be set to be equal to the duration of the exposure period ($T_{exposure}$). Although the TTS measurement operation can reduce the non-linearity caused by the saturation of the capacitors and increase the upper limit of the dynamic range, performing the TTS measurement operation over the entirety of the exposure period can lead to huge power consumption. Specifically, during the TTS measurement operation both the voltage buffer of the charge sensing unit and the comparator of the quantizer are powered on to compare the second voltage with the static threshold to generate the decision. Both the voltage buffer and the comparator are analog devices and can consume huge static power when powered on. Therefore, turning on the voltage buffer and the comparator through the entirety of the exposure period can lead to huge power consumption at the image sensor.

In some examples, instead of measuring the time it takes for the overflow charge to exceed a saturation threshold during the exposure time, which would require the voltage buffer and the comparator to be turned on throughout the exposure period, multiple linear quantization operations of a quantity of overflow charge stored in the charge sensing unit can be performed at multiple time points within the exposure period. Each measurement only lasts through a short duration within the exposure period, whereas the comparator and the voltage buffer can be turned off in between the measurements. As the comparator and the voltage buffer are not turned on for the entirety of the exposure period, the power consumption of the image sensor can be reduced. Moreover, the measurements can also be made at the times when charge storage device 902 is not yet saturated by the overflow charge to further extend upper limit of the dynamic range.

Figure 15A:
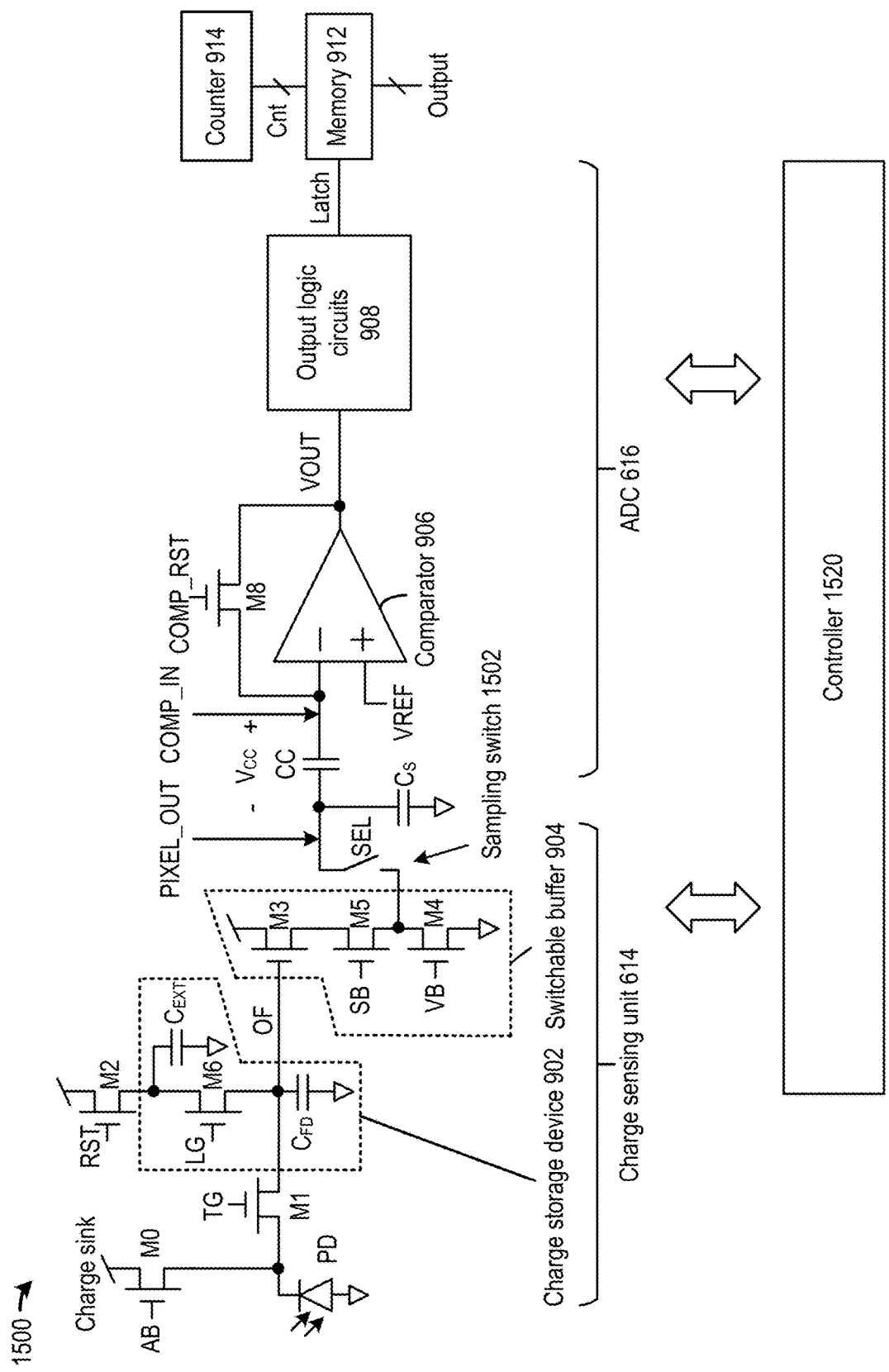
FIG. 15A, FIG. 15B, FIG. 15C, and FIG. 15D illustrate examples of a light intensity measurement operation.

FIG. 15A illustrates an example of an image sensor 1500 that can support linear quantization operations of quantity of charge during the exposure period. Image sensor 1500 can have identical components as image sensor 900, including charge sensing unit 614 and ADC 616. In addition, image sensor 1500 also includes a sampling capacitor $C_s$. The sampling switch 1502 and sampling capacitor $C_s$ can be controlled by controller 1520 to perform a sample-and-hold operation. Specifically, during a sampling operation, sampling switch 1502 can be enabled by the assertion of a SEL signal to connect the sampling capacitor $C_s$ to the output of switchable buffer 904, to sample a voltage representing a quantity of charge stored in charge storage device 902. After the sampling operation ends, sampling switch 1502 can be disabled to disconnect the sampling capacitor $C_s$ from the output of switchable buffer 904, so that the sampled voltage can be held at sampling capacitor $C_s$. AD 616 (including CC capacitor, comparator 906, etc.) can then quantize the voltage held at sampling capacitor $C_s$.

Figure 15B:
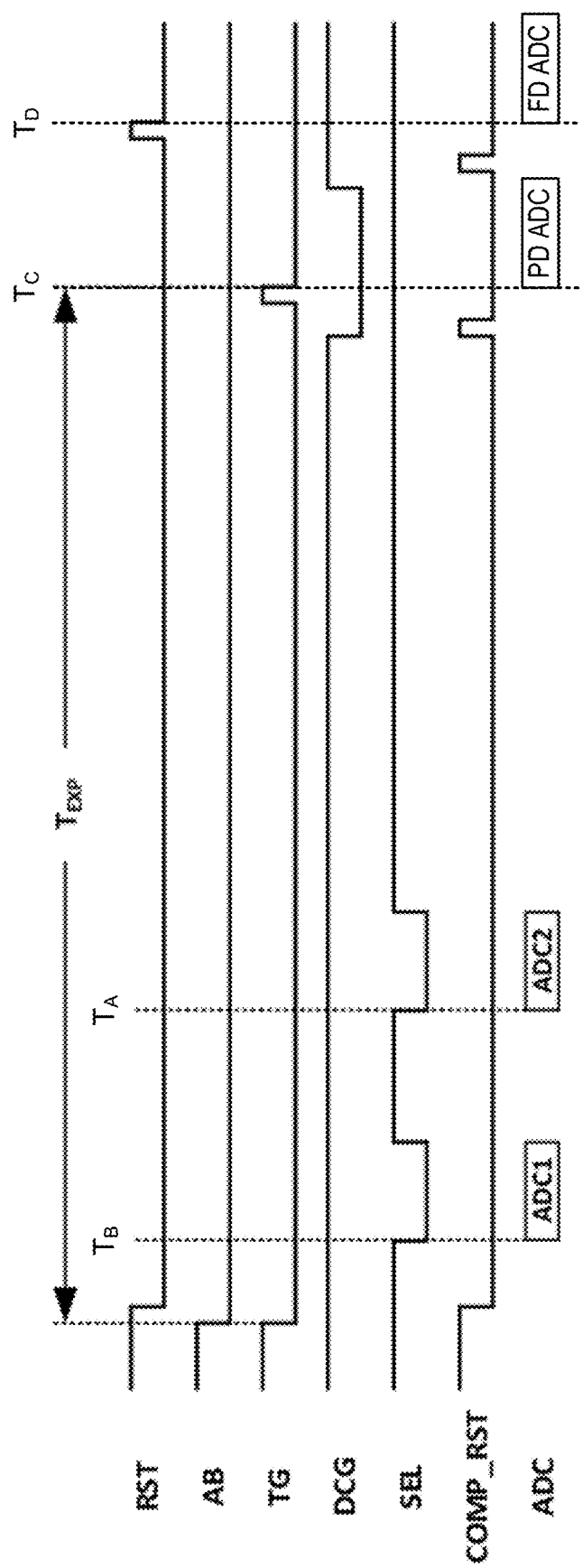

FIG. 15B illustrates an example sequence of control signals to perform a light intensity measurement. Referring to FIG. 15B, during the exposure period $T_{EXP}$, two sample-and-hold operations can be performed at times $T_A$ and $T_B$. Before each of $T_A$ and $T_B$, the SEL signal is asserted such that sampling capacitor $C_s$ samples the voltage output by switchable buffer 904, which represents an instantaneous quantity of overflow charge generated by photodiode PD and stored in charge storage device 902. Assuming charge storage device 902 is not saturated at at least one of times $T_A$ and $T_B$, the quantity of charge sampled at those times can reflect the intensity of light. After each of times $T_A$ and $T_B$, the SEL signal is de-asserted to hold the sampled voltage. ADC 616 can then perform linear quantization operations ADC1 and ADC2 to quantize the sampled voltage by comparing it with a ramping threshold voltage. Switchable buffer 904 and comparator 906 can be switched off after ADC2 till the end of the exposure period to reduce power consumption.

The intensity of light can be determined based on the quantity of charge measured from at least one of linear quantization operations ADC1 and ADC2. For example, if charge storage device 902 is not saturated at either time $T_B$ (for ADC1) or time $T_A$ (for ADC2), the measured quantities from ADC1 and ADC2 can be extrapolated to expected quantities at the end of the exposure period (e.g., by scaling up the measured quantity by a ratio between the exposure period $T_{EXP}$ and one of $T_A$ or $T_B$) and averaged to measure the intensity of light. Moreover, if charge storage device 902 is saturated at time $T_A$, the measured quantity from ADC2 can be discarded, whereas the measured quantity from ADC1 can be used to measure the intensity of light. The measured quantities from one of ADC1/ADC2, FD ADC, or PD ADC operations can be used to represent the intensity of light, depending on whether charge storage device 902 or photodiode PD is saturated.

The exposure period $T_{EXP}$ ends at time $T_C$. Before the exposure period ends, comparator 906 can be reset (based on assertion of COMP_RST), and then the TG signal can be asserted to transfer the residual charge from photodiode PD to charge storage device 902 at time $T_C$, and PD ADC and FD ADC operations can be performed at times $T_C$ and $T_D$ as described above in FIG. 12B. In some examples, as shown in FIG. 15B, the SEL signal can be asserted throughout the PD ADC and FD ADC operations as the exposure period is over and the charge stored in charge storage device 902 is largely constant. In some examples, the SEL signal can also be asserted and then de-asserted at times $T_C$ and $T_D$ to perform a sample-and-hold operation before each of the PD ADC and FD ADC operations to reduce the quantity of noise charge (e.g., dark current) being sampled and quantized by the ADC 616.

The times $T_A$ and $T_B$, at which the linear quantization operations are performed within the exposure period, can be determined to ensure that the charge sensing unit is not saturated by overflow charge, yet also has a certain minimum quantity of overflow charge, at at least one of the time points for a range of intensities of light to be measured by the time-to-saturation measurement operation. The times $T_A$ and $T_B$ can be determined based on, for example, the duration of the exposure period $T_{EXP}$, the full well capacity of the photodiode, the capacity of the capacitor of the charge sensing unit, a range of intensities to be measured, and a target signal-to-noise ratio of the image sensor.

Figure 15C:
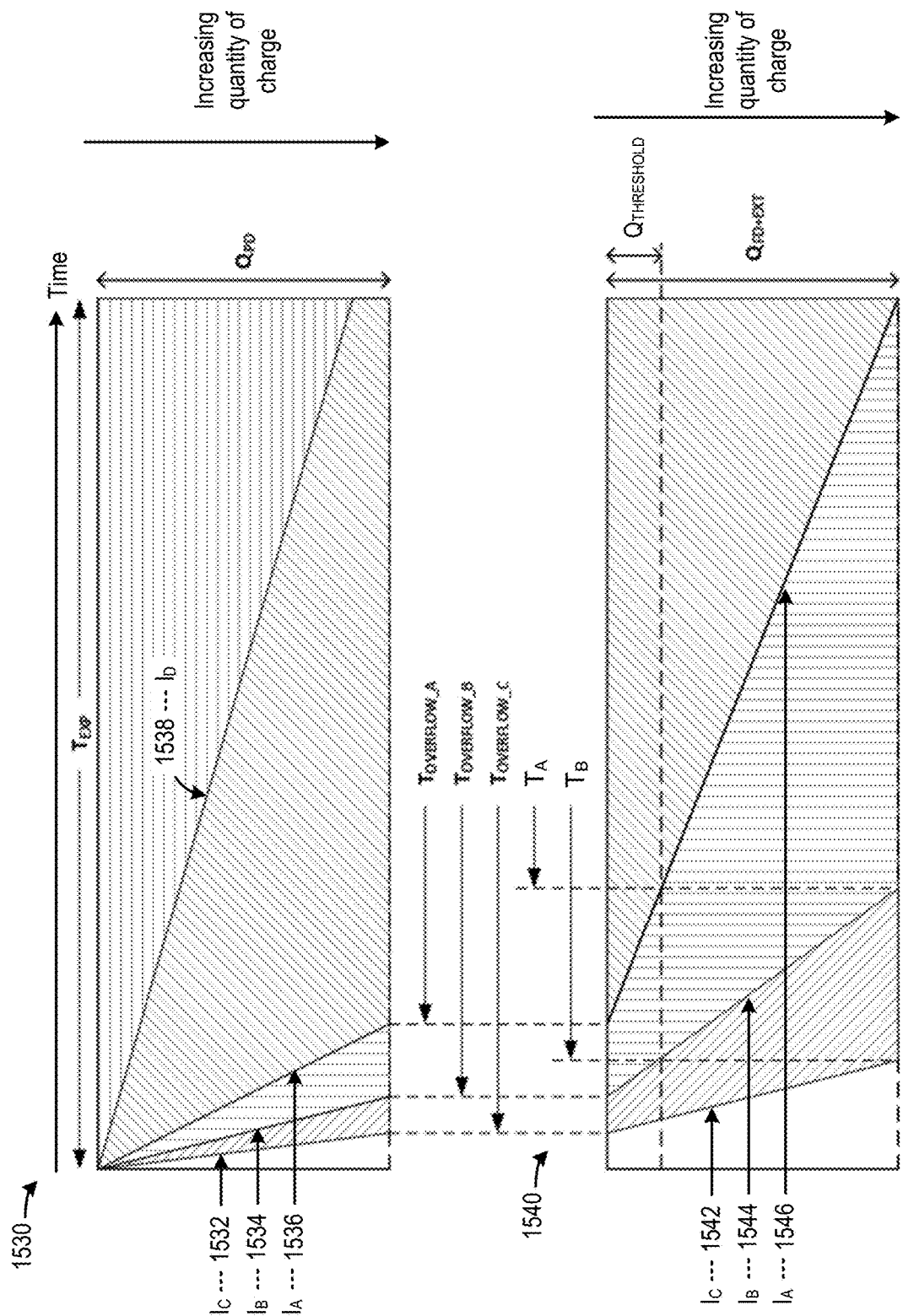

FIG. 15C illustrates an example method of determining times $T_A$ and $T_B$. FIG. 15C illustrates a chart 1530 and a chart 1540. Chart 1530 includes graphs 1532, 1534, 1536, and 1538 that show the changes in the quantity of residual charge accumulated at photodiode PD, with respect to time for different light intensities $I_C$, $I_B$, $I_A$, and $I_D$. The photodiode PD has a full well capacity of $Q_{PD}$. As shown in chart 1530, with light intensities $I_C$, $I_B$, and $I_A$, photodiode PD can be saturated by the residual charge before the exposure period $T_{EXP}$ ends at, respectively, times $T_{OVERFLOW\_C}$, $T_{OVERFLOW\_B}$, and $T_{OVERFLOW\_A}$. On the other hand, for the light intensity for graph 1538, photodiode PD is not saturated by the residual charge before the exposure period $T_{EXP}$ ends, so there is no overflow charge stored at charge storage device 902 when exposure period $T_{EXP}$ ends.

Chart 1540 includes graphs 1542, 1544, and 1546 that show the changes in the quantity of overflow charge accumulated at charge storage device 902, with respect to time for different light intensities $I_C$, $I_B$, and $I_A$. Charge storage device 902 can have a saturation limit of $Q_{FD+EXT}$, which can represent the total capacitance of $C_{FD}$ and $C_{EXT}$ (or a scaled version of it). In chart 1540, intensity $I_C$ can represent the upper limit of light intensity to be measured by the TTS operation within the exposure period, whereas intensity $I_A$ can represent the lower limit of light intensity to be measured by the TTS operation within the exposure period, as graph 1546 (for intensity $I_A$) only reaches the saturation limit at the end of the exposure period. As shown in chart 1540, the time $T_A$ can correspond to a time when graph 1546, representing the quantity of overflow charge accumulated due to light of intensity $I_A$, reaches a charge threshold $Q_{threshold}$. Moreover, the time $T_B$ can correspond to a time when graph 1544, representing the quantity of overflow charge accumulated due to light of intensity $I_B$, reaches the charge threshold $Q_{threshold}$. The time $T_B$ can also correspond to a time when graph 1542, representing the quantity of overflow charge accumulated due to light of intensity $I_C$, reaches the saturation limit of $Q_{FD+EXT}$.

In some examples, charge threshold $Q_{threshold}$, as well as times $T_A$ and $T_B$ (with respect to start of exposure time $T_{EXP}$), can be determined based on a target signal-to-noise (SNR) ratio, as well as the range of intensities of light to be measured by different quantization operations, of image sensor 1500. Specifically, charge threshold $Q_{threshold}$ can represent the minimum signal charge (e.g., in terms of a number of electrons) based on a target signal-to-noise (SNR) ratio of image sensor 1500. For example, if $Q_{threshold}$ equals 900 electrons, the SNR can be roughly about 30 (square root of 90) due to shot noise. Referring to FIG. 15C, time $T_A$ can be selected such that with the minimum of the intensity range to be measured based on overflow charge (e.g., the minimum of medium intensity range 1008 of FIG. 10), the total quantity of overflow charge accumulated at charge storage device 902 equals at least $Q_{threshold}$. Moreover, time $T_B$ can be selected such that with the maximum of medium intensity range 1008 (e.g., $I_B$), the total quantity of overflow charge accumulated at charge storage device 902 also equals at least $Q_{threshold}$. With such arrangements, the SNR can be maintained across the intensity range to reduce or eliminate gap in the measurement. In addition, time $T_B$ can be selected based on an upper limit of the dynamic range (DR), such that the maximum intensity range to be measured based on overflow charge (e.g., $I_C$), the total quantity of overflow charge accumulated at charge storage device 902 is not more than the saturation limit $Q_{FD+EXT}$.

The following equations describe the relationships among the various time points and the quantities of charge described in charts 1530 and 1540:

$$T_{OVERFLOW\_A} = \left(\frac{Q_{PD}}{Q_{PD} + Q_{FD+EXT}}\right) \times T_{EXP}, \quad \text{(Equation 10)}$$

$$T_A = \left\{\left(\frac{Q_{THRESHOLD}}{Q_{FD+EXT}}\right) \times (T_{EXP} - T_{OVERFLOW\_A})\right\} + T_{OVERFLOW\_A}, \quad \text{(Equation 11)}$$

$$T_{OVERFLOW\_B} = \left(\frac{Q_{PD}}{Q_{PD} + Q_{FD+EXT}}\right) \times T_A, \quad \text{(Equation 12)}$$

$$T_B = \left\{\left(\frac{Q_{THRESHOLD}}{Q_{FD+EXT}}\right) \times (T_A - T_{OVERFLOW\_B})\right\} + T_{OVERFLOW\_B}. \quad \text{(Equation 13)}$$

Figure 15D:
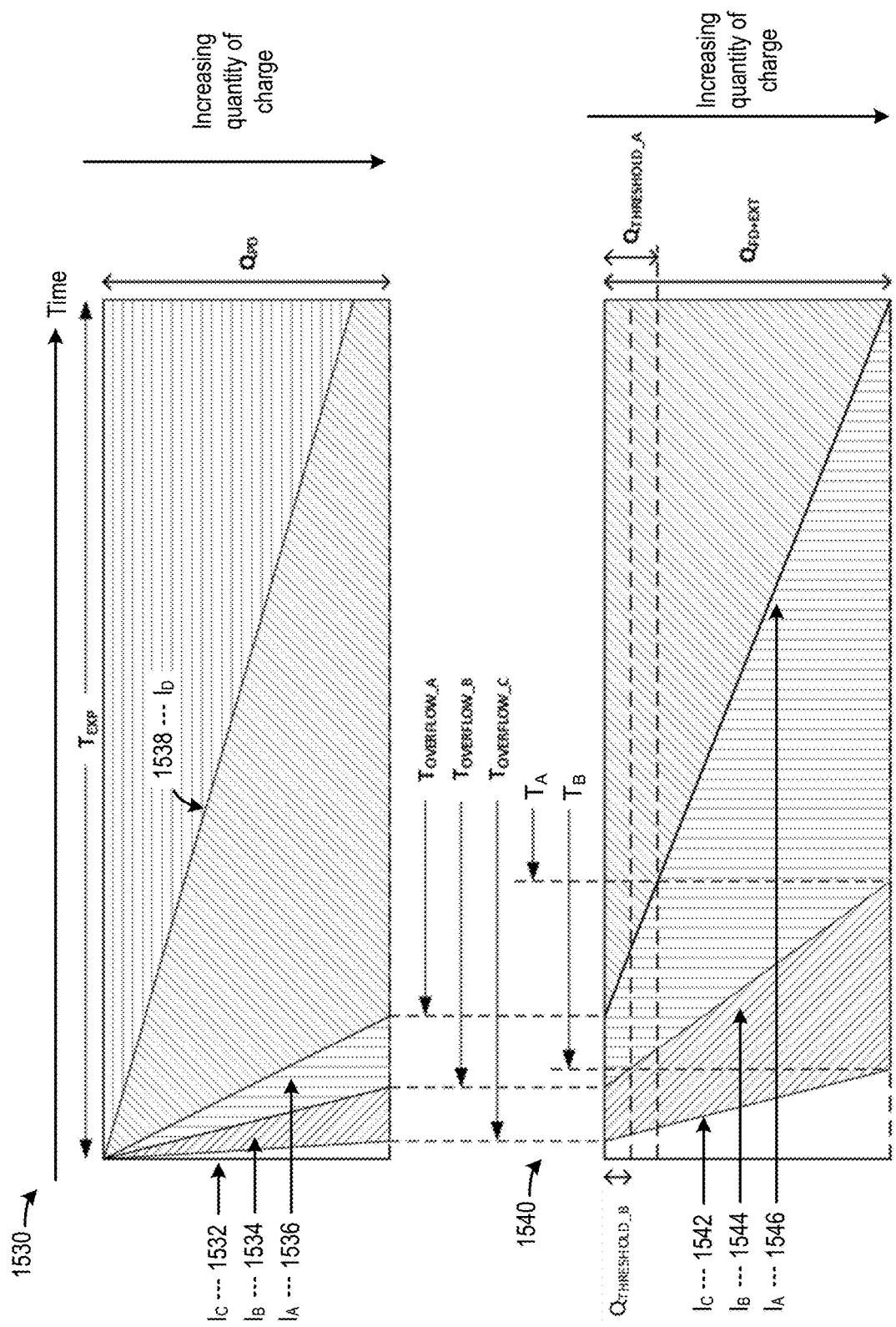

In some examples, as shown in FIG. 15D, the time points $T_A$ and $T_B$ can be determined based on different charge thresholds $Q_{threshold}$ A and $Q_{threshold}$ B, based on the following Equations:

$$T_A = \left\{\left(\frac{Q_{THRESHOLD\_A}}{Q_{FD+EXT}}\right) \times (T_{EXP} - T_{OVERFLOW\_A})\right\} + T_{OVERFLOW\_A}, \quad \text{(Equation 14)}$$

$$T_B = \left\{\left(\frac{Q_{THRESHOLD\_B}}{Q_{FD+EXT}}\right) \times (T_A - T_{OVERFLOW\_B})\right\} + T_{OVERFLOW\_B}. \quad \text{(Equation 15)}$$

The two different charge thresholds $Q_{threshold\text{-}A}$ and $Q_{threshold\text{-}B}$ can be based on different SNR requirements for different intensity ranges. For example, for measurement of lower half of medium intensity range 1008, a higher SNR performance is needed for measuring light of relatively low intensity, therefore a larger $Q_{threshold\_A}$ is used to set time $T_A$. Moreover, for measurement of the upper half of medium intensity range 1008, a smaller $Q_{threshold\_B}$ is used to set time $T_B$, due to a lower SNR performance requirement for measuring light of relatively high intensity. The smaller time $T_B$ can also extend the upper limit of measurable light intensity by reducing the time provided to accumulate charge before taking the measurement, such that charge storage device 902 is not saturated when the accumulated charge is measured.

Although performing linear quantization operations during the exposure period can reduce the power consumption, such arrangements can limit the dynamic range of the image sensor, especially for measurement of a very high intensity of light and/or where the capacity of charge storage device 902 is limited. For example, referring to FIG. 15C and FIG. 15D, if the incident light intensity is higher than $I_C$, charge storage device 902 can become saturated at time $T_B$ (and $T_A$ as well), and the measured quantity of charge cannot accurately represent the incident light intensity.

In some examples, it may be advantageous to perform the TTS operation for a short duration at the beginning of the exposure period to measure a very high intensity of light, and to perform linear quantization operations for the rest of the exposure period to measure a lower (but still high) intensity of light, such that the upper limit of dynamic range provided by the TTS operation can be maintained while power consumption can be reduced. The advantage of such arrangements is evident in FIG. 16A and FIG. 16B, which illustrate improvements in dynamic range as the saturation time is quantized by an increasing number of levels corresponding to different light intensity ranges. In each of charts 1602, 1604, and 1606 of FIG. 16A, a quantity of overflow charge stored in charge storage device 902, with respect to time for different light intensities and the corresponding times of saturation, are shown. In chart 1602, the exposure period $T_{EXP}$ is divided into two levels, representing two candidate saturation times SAT1 and SAT2. With light intensity at I1, the time of saturation when the quantity of charge equals $Q_{FWC}$ is at SAT1, whereas with light intensity at I2, the time of saturation is SAT2. From chart 1602, a one-bit TTS operation can be performed, in which the TTS operation outputs a zero if the light intensity is above I1 and outputs a one if the light intensity is between I1 and I2. The TTS operation can provide a 6-dB improvement to the dynamic range compared with a case where intensity I2 or above cannot be quantized.

On the other hand, in chart 1604, the exposure period $T_{EXP}$ is divided into four levels, representing four candidate saturation times SAT0p5, SAT1 (same as chart 1602), SAT1p5, and SAT2 (same as chart 1602). A two-bit TTS operation can be performed to distinguish between four intensity ranges, in which the TTS operation can output a zero (00'b) if the light intensity is above I0_5, a one ('01b) if the light intensity is between I0_5 and I1, a two ('10b) if the light intensity is between I1 and I1_5, and a three ('11b) if the light intensity is between I1_5 and I2. The 2-bit TTS measurement operation can provide a gain of 12-dB improvement to the dynamic range.

Further, in chart 1606, the exposure period $T_{EXP}$ is divided into eight levels, representing eight candidate saturation times SAT0p25, SAT0p5, SAT0p75, SAT1, SAT1p25, SAT1p5, SAT1p75, and SAT2. A four-bit TTS operation can be operation can be performed to distinguish between eight intensity ranges I0_25 to I_05, I_05 to I_075, I_075 to I_1, I_1 to I_125, I_125 to I_5, I_5 to I_75, and I_75 to I2. The 4-bit TTS measurement operation can provide a gain of 18-dB improvement to the dynamic range.

Comparing charts 1602, 1604, and 1606, it can be seen that the TTS operation can be most useful (e.g., most efficient in improving DR) in the bright light region when considering the absolute amount of time it takes to increase every 6-dB dynamic range. Referring to FIG. 16B, performing a TTS operation in the first half of the exposure period $T_{EXP}$ (period A) to measure light intensities I0_25 to I1 with four quantization levels of saturation time can lead to a 12-dB increase in the dynamic range, whereas performing a TTS operation in the second half of the exposure period $T_{EXP}$ (period B) to measure light intensities I1_25 to I2 with four quantization levels of saturation time can only lead to a 6-dB increase in the dynamic range. Therefore, to reduce power consumption and to maintain the dynamic range improvement provided by the TTS operation, it may be advantageous to perform a hybrid TTS and linear quantization operation within the exposure period.

Figure 16A:
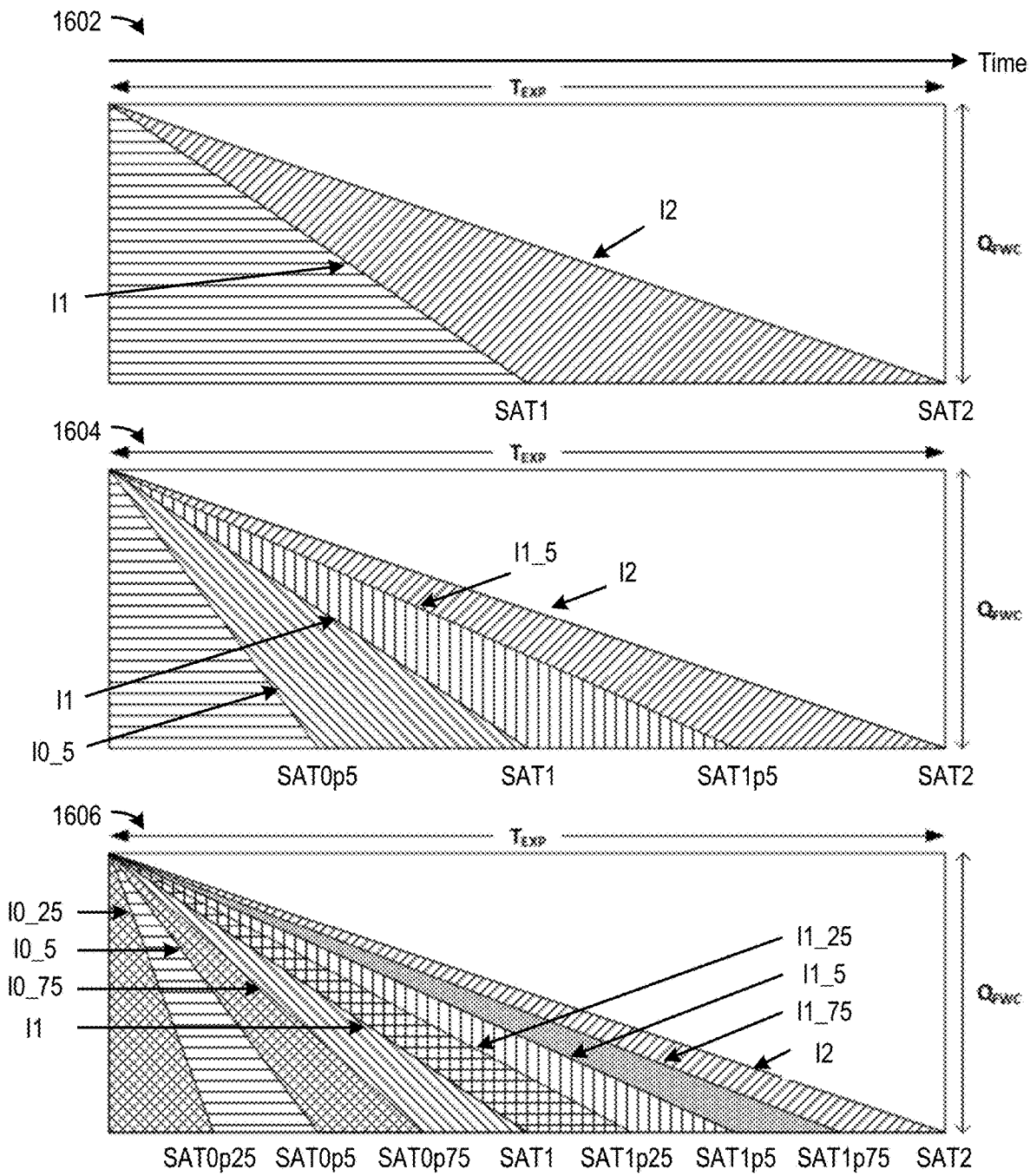
FIG. 16A, FIG. 16B, FIG. 16C, and FIG. 16D illustrate other examples of a light intensity measurement operation.
Figure 16B:
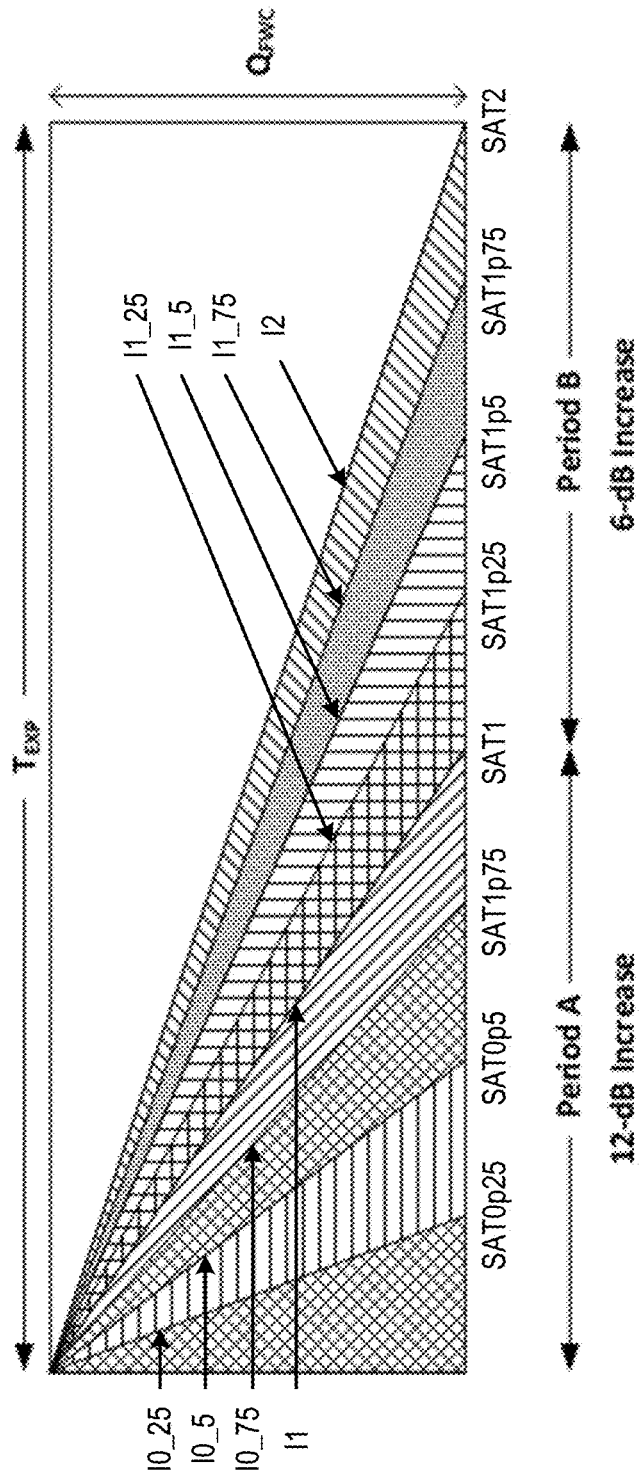
Figure 16C:
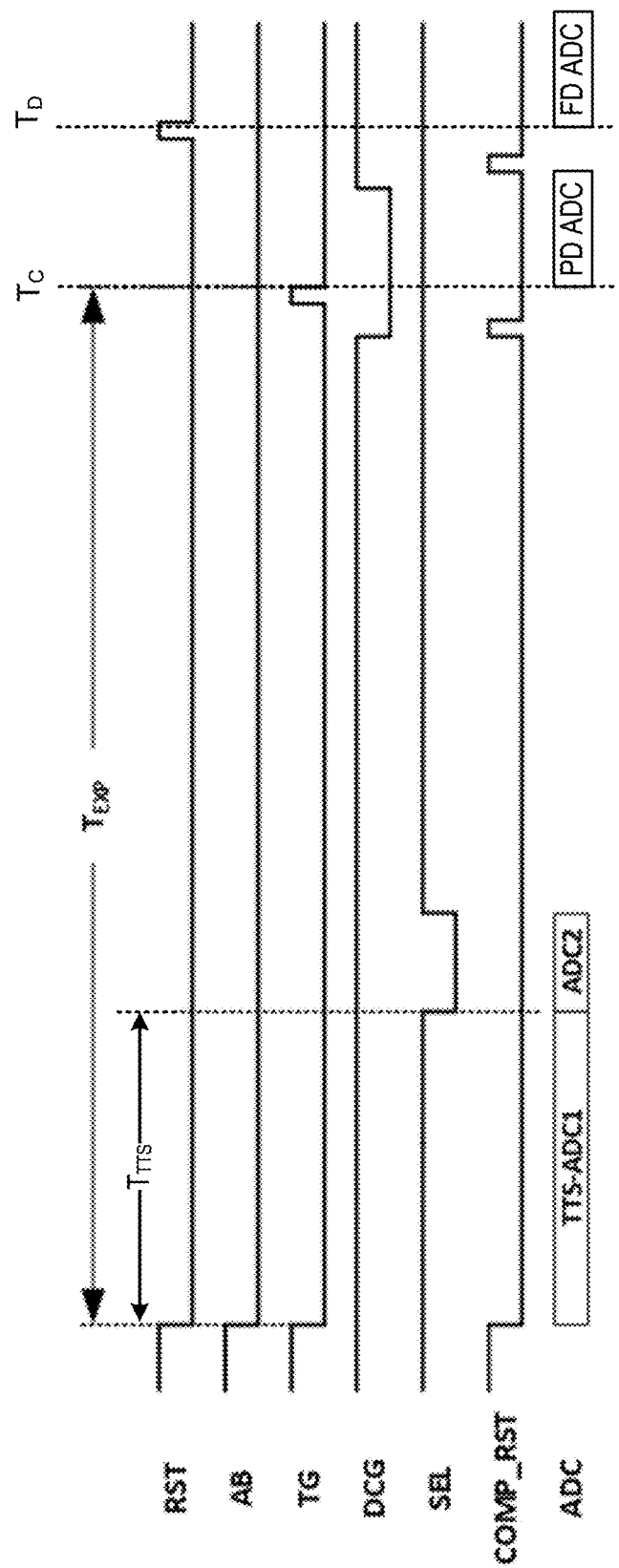

FIG. 16C illustrates an example of sequence of control signals to perform a hybrid TTS and linear quantization operation during the exposure period $T_{EXP}$. As shown in FIG. 16C, at the beginning of the exposure period $T_{EXP}$, a TTS operation can be performed to detect whether the quantity of charge stored in charge storage device 902 exceeds the saturation limit, and it does, the saturation time. The TTS operation can be performed over a short duration $T_{TTS}$, which can be set independently from the exposure period $T_{EXP}$. During the TTS operation, the sampling capacitor $C_s$ can be connected to switchable buffer 904, with SEL signal asserted, and ADC 616 can compare the instantaneous voltage output by buffer 904 with a static threshold to determine whether the saturation limit is reached. After the TTS operation ends, one or more linear quantization operations, including ADC2, can be performed within the exposure period, in which the SEL signal is de-asserted to sample-and-hold the voltage output by buffer 904. ADC 616 can then quantize the sampled voltage by comparing the sampled voltage with a ramping threshold. In some examples, if the TTS operation indicates charge storage device 902 is saturated, the controller can skip ADC2 or discard the output of ADC2. Buffer 904 and ADC 616 can be switched off when neither the TTS nor linear quantization operation is performed during the exposure period, to reduce the power consumption.

Figure 16D:
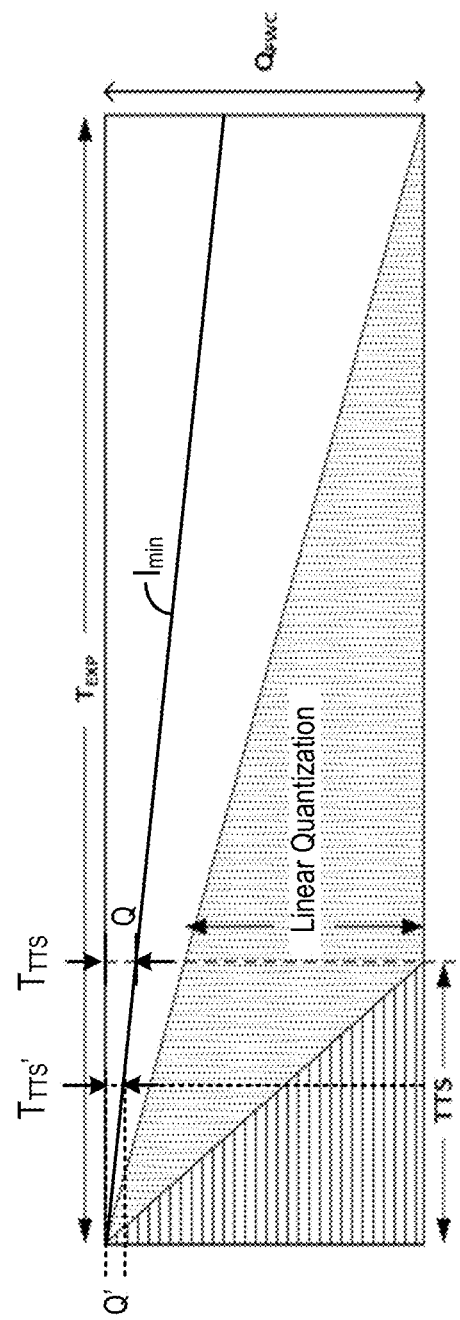

The duration of $T_{TTS}$ can be set based on various criteria. For example, the duration can be set based on a target power, and can be reduced to reduce power consumption. As another example, the duration of $T_{TTS}$ can also be set based on the intensity range to be measured by the TTS operation, the intensity range to be measured by the subsequent linear quantization operation (ADC2) within the exposure period, and the SNR requirement. Referring to FIG. 16D, a linear quantization operation is to be performed to measure the quantity of charge Q accumulated for light of intensity $I_{min}$ at charge storage device 902 at time $T_{TTS}$ after the TTS operation. $I_{min}$ can refer the minimum light intensity to be measured by the quantity of overflow charge by the linear quantization operation after the TTS operation. If $T_{TTS}$ is moved leftwards to $T_{TTS}'$, the quantity of charge accumulated at charge storage device 902 at $T_{TTS}'$ reduces to Q', which can degrade the SNR for a given noise performance of the image sensor. Therefore, the duration of $T_{TTS}$ can also be set based on a target SNR as well as the minimum light intensity.

Figure 17A:
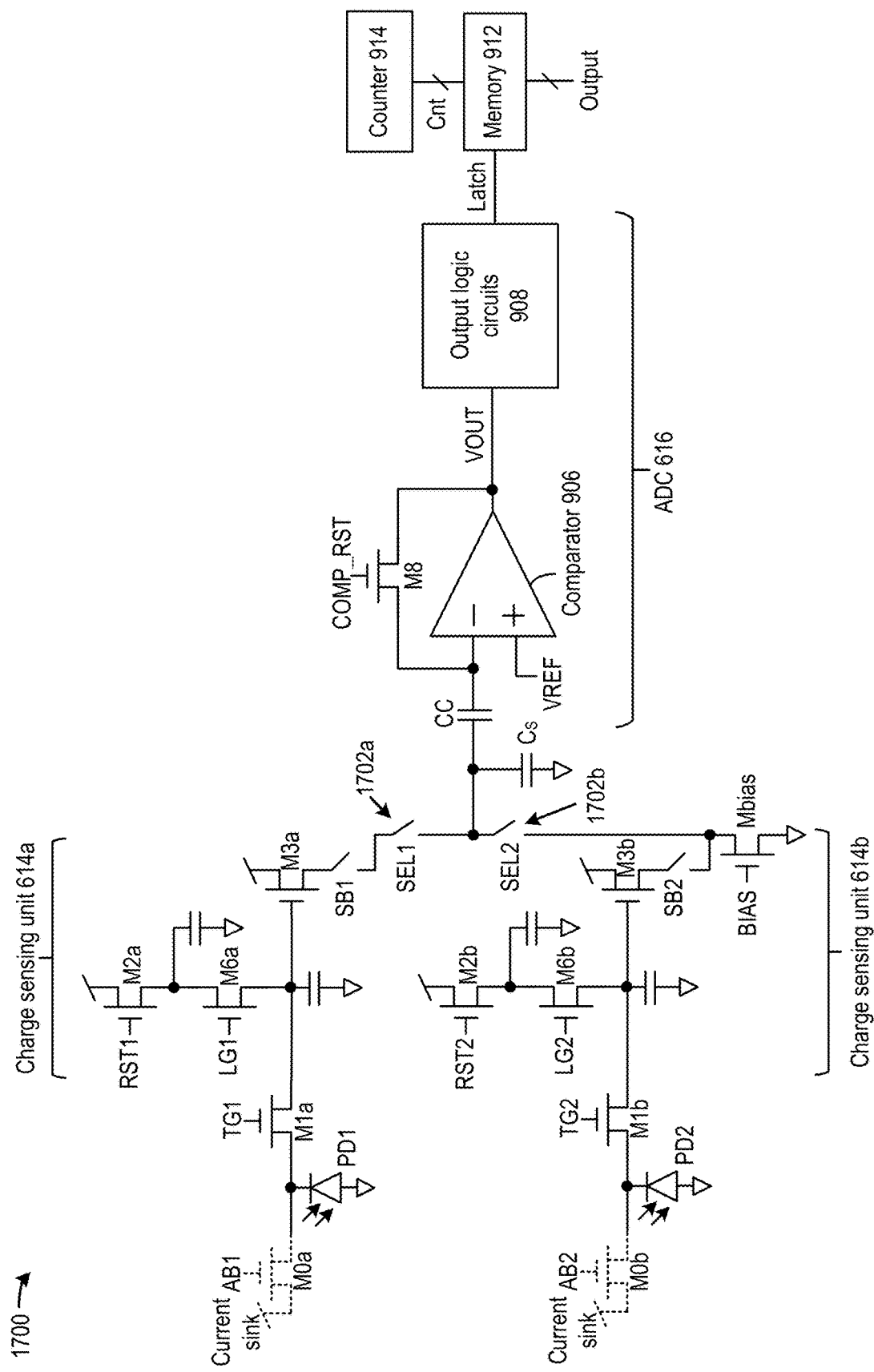
FIG. 17A, FIG. 17B, and FIG. 17C illustrate examples of an image sensor having multiple photodiodes sharing an analog-to-digital converter (ADC) and its operations.

The quantization operations described above can be performed in a multi-photodiode pixel cell where multiple photodiodes share a single ADC 616 to perform quantization operations. FIG. 17A illustrates an example image sensor 1700, including multiple photodiodes that share ADC 616. The part of image sensor 1700 illustrated in FIG. 17A can be of pixel cell 602a or can be of different pixel cells. As shown in FIG. 17A, ADC 616 and memory bank 912 can be shared among multiple photodiodes. For example, photodiode PD1, which can correspond to photodiodes 612a of FIG. 6, can be connected to charge sensing unit 616a, whereas photodiode PD2, which can correspond to photodiode 612b of FIG. 6, can be connected to a charge sensing unit 616b. The voltage buffer of each charge sensing unit can share a current source Mbias. The exposure period for each photodiode can be controlled by the optional M0a and M0b transistors (based on assertion/de-assertion of the AB1 and AB2 signals), or based on resetting via transfer switches M1a and M1b. Photodiodes PD1 and PD2 can be configured to detect different frequency components of light. Each of charge sensing units 616a and 616b can include a switchable voltage buffer which can be enabled by, respectively, an SB1 signal and an SB2 signals to connect with a current source Mbias. In addition, image sensor 1700 further includes a sampling switch 1702a, a sampling switch 1702b, and sampling capacitor $C_s$, to form a sample-and-hold circuit. Based on SEL1 and SEL2 signals, sampling capacitor $C_s$ can sample the output voltage of one of charge sensing units 616a or 616b at a time, and the sampled voltage can then be quantized by ADC 616. Compared with a case where a separate set of charge sensing unit 614, ADC 616, and memory bank 912 is provided for each photodiode, such arrangements can reduce the footprint and power consumption of the processing circuits and memory, which allows image sensor 600 to include more photodiodes to improve resolution. The control signals (e.g., RST1, RST2, LG1, LG2, SB1, SB2, SEL1, SEL2, COMP_RST) can be provided by controller 1520 (not shown in FIG. 17A).

Figure 17B:
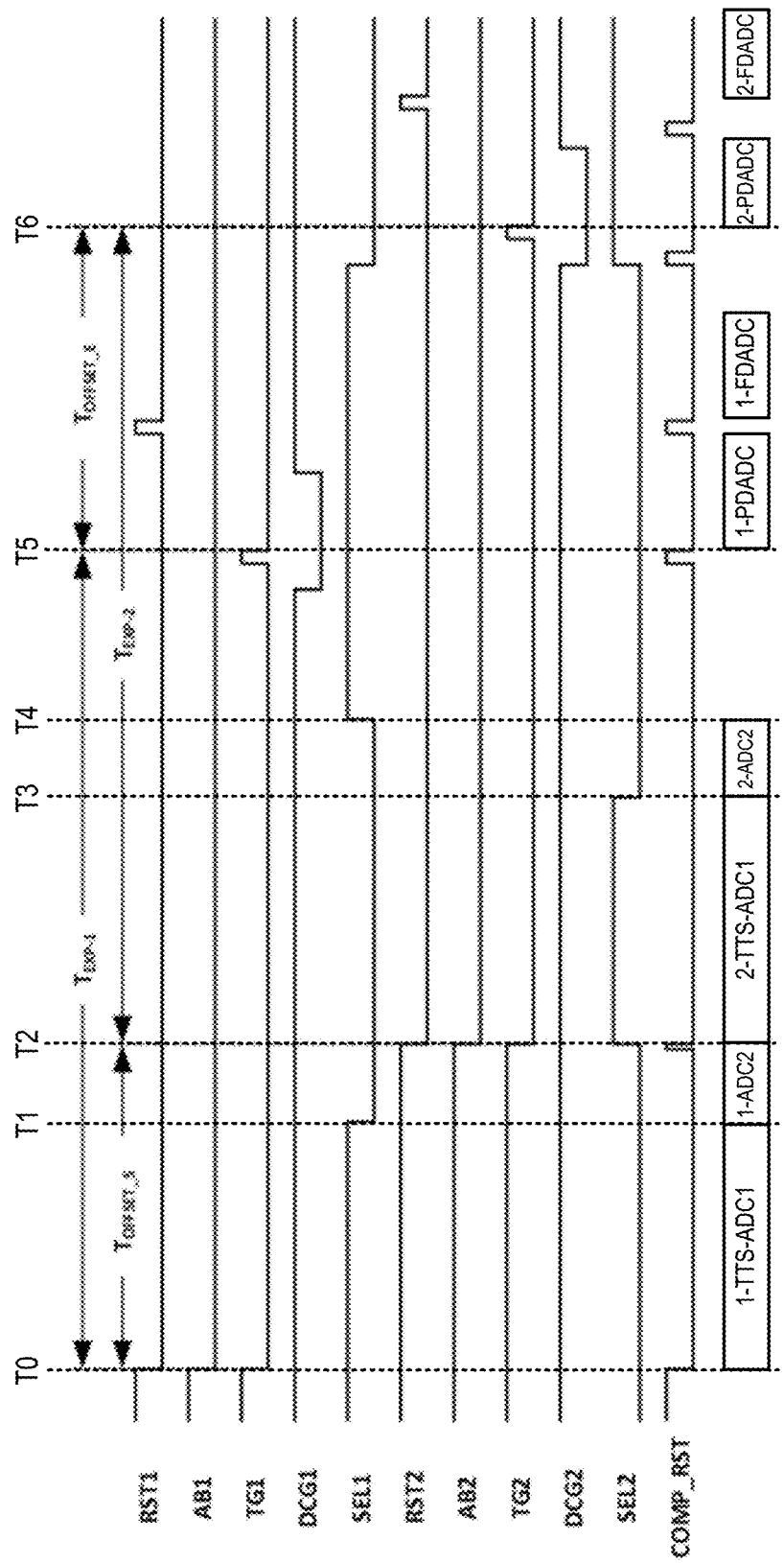

FIG. 17B illustrates an example sequence of control signals of image sensor 1700 to perform hybrid TTS and linear quantization operations. As shown in FIG. 17B, the exposure period for photodiode PD1 ($T_{EXP-1}$) starts at time T0, with AB1 signal disabled to allow photodiode PD1 to accumulate residual charge and output overflow charge to charge sensing unit 614a. A TTS operation (1-TTS-ADC1) can be performed between times T0 and T1 for photodiode PD1, during which the SEL1 signal is asserted to connect sampling capacitor $C_s$ to charge sensing unit 614a. Between times T1 and T2, SEL1 is de-asserted such that sampling capacitor $C_s$ samples and holds a voltage representing a quantity of overflow charge stored in charge sensing unit 614a at time T1, and one or more linear quantization operations (e.g., 1-ADC2) can be performed by comparing the voltage with a ramping threshold. In some examples, the 1-TTS-ADC1 operation can be omitted and multiple linear quantization operations can be performed for photodiode PD1, as described in FIG. 15B.

Between times T0 and T2, photodiode PD2 and charge sensing unit 614b can be in a reset state and does not accumulate charge, as ADC 616 is not available to quantize the charge. Charge sensing unit 614b can also be switched off (e.g., by de-asserting SB2) to reduce power consumption. Therefore, the start of exposure period for photodiode PD2, $T_{EXP-2}$, is delayed from T0 by a start offset $T_{OFFSET\_S}$ which equals the total duration of the TTS and linear quantization operations for photodiode PD1, and the exposure period $T_{EXP-2}$ starts at time T2.

Between times T2 and T3, a TTS operation (2-TTS-ADC1) can be performed for photodiode PD2, during which the SEL2 signal is asserted to connect sampling capacitor $C_s$ to charge sensing unit 614b. Between times T3 and T4, SEL2 is de-asserted such that sampling capacitor $C_s$ samples and holds a voltage representing a quantity of charge stored at charge sensing unit 614b at time T3, and one or more linear quantization operations (e.g., 2-ADC2) can be performed by comparing the voltage with a ramping threshold. In some examples, the 2-TTS-ADC1 operation can be omitted and multiple linear quantization operations can be performed for photodiode PD2, as described in FIG. 15B.

Meanwhile, between times T2 and T4, the exposure period $T_{EXP-1}$ for photodiode PD1 continues, such that photodiode PD1 can continue accumulating residual charge (if not yet saturated), or charge sensing unit 614a can continue accumulating overflow charge (if not yet saturated). The exposure period $T_{EXP-1}$ ends at time T5. Between times T5 and T6, SEL1 signal can be asserted to connect charge sensing unit 614a back to ADC 616, and the PD ADC and FD ADC operations (labelled "1-PDADC" and "1-FDADC") can be performed for photodiode PD1.

On the other hand, between times T5 and T6, the exposure period $T_{EXP-2}$ for photodiode PD2 continues, such that photodiode PD2 can continue accumulating residual charge (if not yet saturated), or charge sensing unit 614a can continue accumulating overflow charge (if not yet saturated). The end of the exposure period $T_{EXP-2}$ can be delayed from the end of the exposure period $T_{EXP-1}$ by an end offset $T_{OFFSET\_E}$, which equals the total duration of the PD ADC and FD ADC operations for photodiode PD2, and the exposure period $T_{EXP-2}$ ends at time T6. After time T6, the SEL2 signal can be asserted to connect charge sensing unit 614b back to ADC 616, and the PD ADC and FD ADC operations (labelled "2-PDADC" and "2-FDADC") can be performed for photodiode PD2.

In some examples, the start offset $T_{OFFSET\_S}$ and end offset $T_{OFFSET\_E}$ can be made equal (e.g., based on controlling the duration of 1-TTS-ADC1 operation, or based on controlling the FD ADC and PD ADC operation durations for photodiode PD2), such that the exposure periods $T_{EXP-1}$ and $T_{EXP-2}$ have the same duration. Such arrangements can be beneficial. Specifically, the duration difference between the exposure periods for different photodiodes can degrade the global shutter operation of the photodiodes, as the duration difference between the exposure periods can introduce an offset among the digital outputs, since each photodiode is provided with different durations of time to be exposed to light and to generate charge. Moreover, different photodiodes may have different dynamic ranges, as they have different durations of exposure periods to generate charge. With a longer exposure period, the upper limit of the dynamic range can be reduced as it takes a lower intensity of light to saturate the charge sensing unit, whereas with a shorter exposure period, the lower limit of the dynamic range ca can be increased as it requires a higher intensity of light to generate a detectable quantity of charge. By making the offsets $T_{OFFSET\_S}$ and $T_{OFFSET\_E}$ equal such that exposure periods $T_{EXP-1}$ and $T_{EXP-2}$ have the same duration, mismatches in the digital outputs and dynamic ranges between the different photodiodes can be reduced.

In some examples, the exposure periods $T_{EXP-1}$ and $T_{EXP-2}$ can be center-aligned. Aligning the centers of the exposure periods can reduce the motion artifacts. This is because the charge generated from an exposure period can represent an average intensity of light received by a photodiode within the exposure period. By aligning the centers of the exposure periods, it becomes more likely that the digital outputs represent the intensities of light captured by the photodiodes at the same time that corresponds to the centers of the exposure periods, rather than the intensities of light captured at different times. As a result, the motion artifacts caused by the different durations of exposure periods can be reduced or at least mitigated.

Figure 17C:
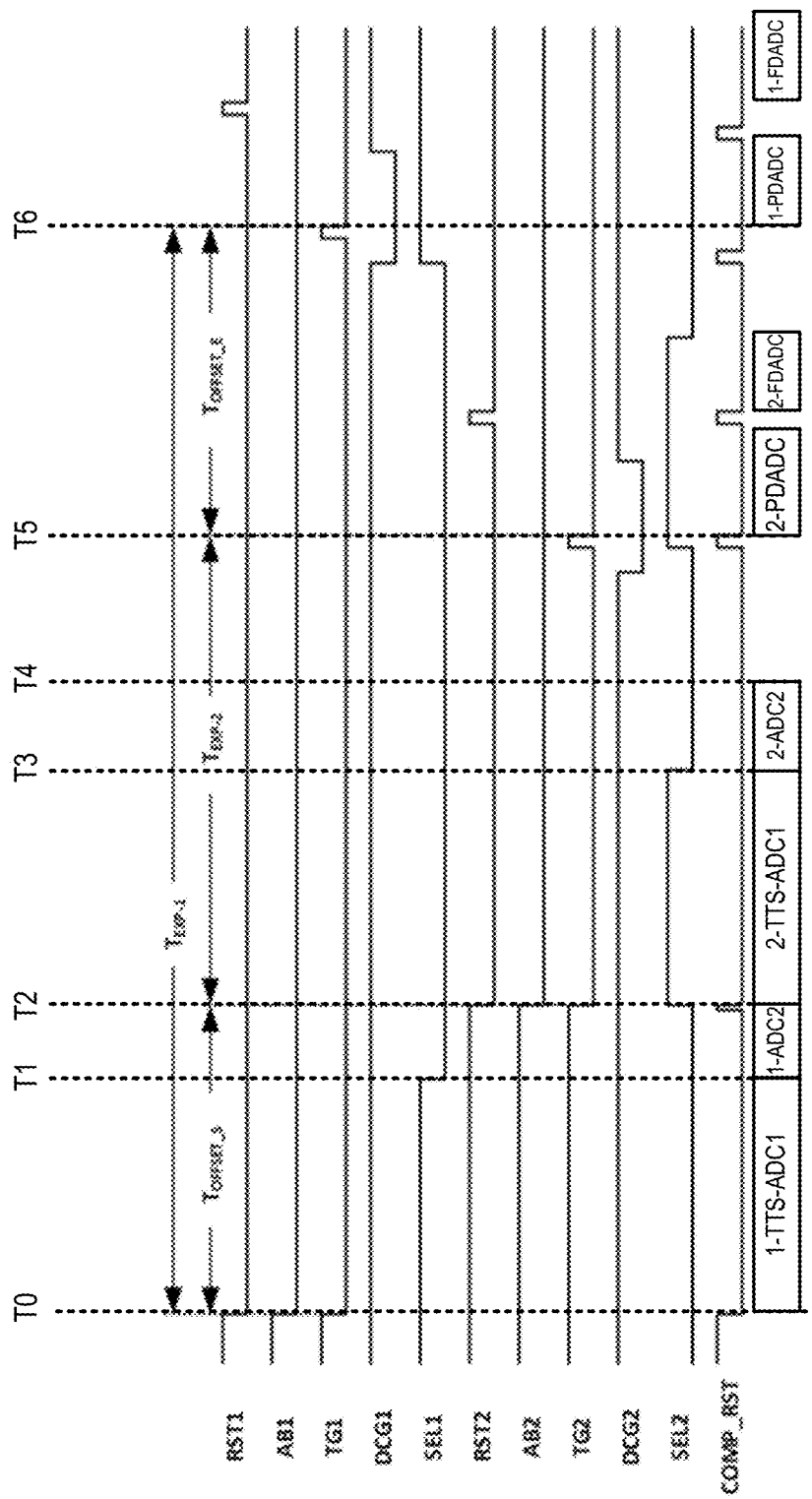

FIG. 17C illustrates another example sequence of control signals of image sensor 1700 to provide center-aligned exposure periods $T_{EXP-1}$ and $T_{EXP-2}$. In FIG. 17C, the exposure period $T_{EXP-1}$ for photodiode PD1 starts at time T0, followed by the TTS operation and linear quantization operation for the photodiode PD1 (1-TTS-ADC1 and 1-ADC2) between times T0 and T1 and between times T1 and T2. The exposure period $T_{EXP-2}$ for photodiode PD2 starts at time T2 and is delayed by a start offset $T_{OFFSET\_S}$ to accommodate for the TTS operation and linear quantization operation for the photodiode PD1, as in FIG. 17B. The TTS operation and linear quantization operation for the photodiode PD2 (2-TTS-ADC1 and 2-ADC2) can then be performed between times T2 and T3 and between times T3 and T4.

To enable the exposure period $T_{EXP-2}$ to be center-aligned with $T_{EXP-1}$, the end of the exposure period $T_{EXP-2}$ can be pulled in at time T5. The PD ADC and FD ADC operation for photodiode PD2 (2-PDADC and 2-FDADC) can then be performed between times T5 and T6. Between times T5 and T6, the exposure period $T_{EXP-1}$ for PD1 continues, thereby the end of the exposure period $T_{EXP-1}$ is delayed from the end of the exposure period $T_{EXP-2}$ by the duration between times T5 and T6, which equals the end offset $T_{OFFSET\_E}$. If the start offset $T_{OFFSET\_S}$ and the end offset $T_{OFFSET\_E}$ is made equal (e.g., based on controlling the duration of 1-TTS-ADC1 operation, or based on controlling the FD ADC and PD ADC operation durations for photodiode PD2), the exposure periods $T_{EXP-1}$ and $T_{EXP-2}$ can become center-aligned. The PD ADC and FD ADC operations for photodiode PD1 (1-PDADC and 1-FDADC) can then be performed after time T6 when the exposure period $T_{EXP-1}$ ends.

Figure 18:
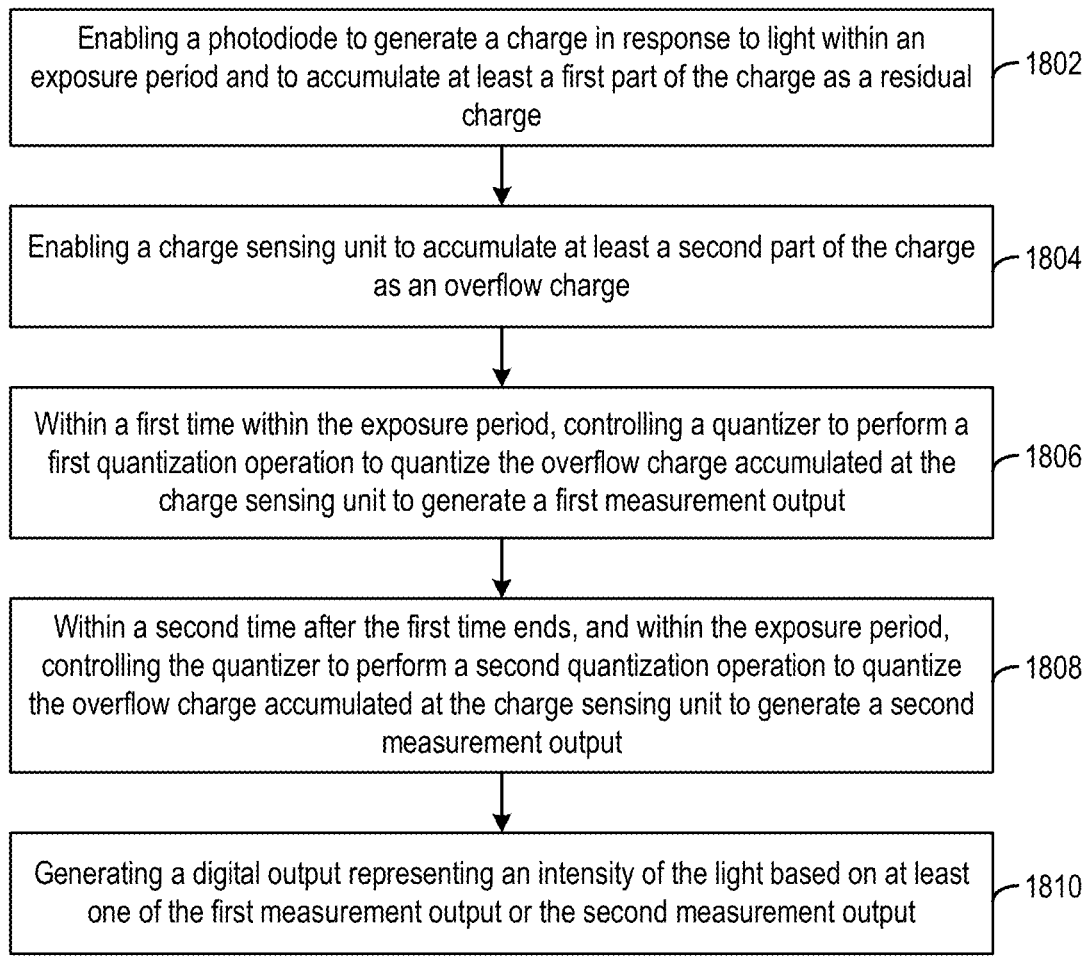
FIG. 18 illustrates a flowchart of an example process for measuring light intensity.

FIG. 18 illustrates a method 1800 for performing a light intensity measurement by an image sensor having at least a photodiode, such as image sensors 1500 and 1700 of FIG. 15A. Method 1800 can be performed by controller 1520 in conjunction with other components of image sensor 1500/1700.

Method 1800 starts with step 1802, in which the controller enables a photodiode (e.g., PD1 of FIG. 15A and FIG. 17A) to generate a charge in response to light within an exposure period (e.g., $T_{EXP}$ of FIG. 15B and FIG. 16C, $T_{EXP-1}$ of FIG. 17B and FIG. 17C), and to accumulate at least a first part of the charge as a residual charge. The controller can enable the photodiode to generate and accumulate charge based on, for example, disabling the AB gate, de-asserting the reset signal RST/RST1.

In step 1804, the controller can enable a charge sensing unit (e.g., charge sensing unit 614 of FIG. 15A, charge sensing units 614a of FIG. 17A) to accumulate at least a second part of the charge as an overflow charge. Specifically, the charge sensing unit may include a charge storage device and a buffer. The controller can set the TG signal to bias a transfer switch (e.g., M1 of FIG. 15A, M1a of FIG. 17A) in a partially-on state to enable the photodiode to accumulate the residual charge until a full well capacity is reached, and then the remaining charge can be transferred to and stored at the capacitor of the charge sensing unit to develop a voltage, which can then buffered by the buffer. Moreover, the controller can enable sampling switch 1502 to connect sampling capacitor $C_s$ with the charge sensing unit 614 to sample the buffered voltage. During the exposure period, the controller can also increase the capacity of charge storage device by asserting the LG signal to connect capacitors $C_{FD}$ and $C_{EXT}$ together.

In step 1806, within a first time within the exposure period, the controller can control the quantizer to perform a first quantization operation to quantize the overflow charge accumulated at the charge sensing unit to generate a first measurement output.

In some examples, as described in FIG. 15A, the first quantization operation can be a linear quantization operation to measure a quantity of the overflow charge. To perform the linear quantization operation, the controller can disconnect the sampling capacitor $C_s$ from charge sensing unit 614 to hold the sampled voltage at the beginning of the first time. The controller can then control ADC 616 to quantize the sampled voltage to generate the first measurement output. As part of the first quantization operation, comparator 906 of ADC 616 can compare the sample-and-hold voltage with a ramping threshold voltage to generate an output. A count value from counter 914 can be stored in memory 912 based on the output of comparator 906 as the first measurement output.

In some examples, as described in FIG. 16A, the first quantization operation can be a time-to-saturation operation to determine whether the quantity of overflow charge exceeds a saturation threshold of the charge storage device, and if it does, the time when the saturation threshold is reached. To perform the TTS operation, the controller can connect the sampling capacitor $C_s$ with charge sensing unit 614 to continuously sample the voltage within the first time. As part of the first quantization operation, comparator 906 of ADC 616 can compare the sampled voltage with a static threshold voltage representing the saturation threshold to generate an output. A count value from counter 914 can be stored in memory 912 based on the output of comparator 906 as the first measurement output.

In step 1808, within a second time after the first time ends, and within the exposure period, the controller can control the quantizer to perform a second quantization operation to quantize the overflow charge accumulated at the charge sensing unit to generate a second measurement output.

In some examples, the second quantization operation can include a linear quantization operation. To perform the linear quantization operation, the controller can disconnect the sampling capacitor $C_s$ from charge sensing unit 614 to hold the sampled voltage at the beginning of the second time. The controller can then control ADC 616 to quantize the sampled voltage to generate the first measurement output. As part of the first quantization operation, comparator 906 of ADC 616 can compare the sample-and-hold voltage with a ramping threshold voltage to generate an output. A count value from counter 914 can be stored in memory 912 based on the output of comparator 906 as the second measurement output.

In step 1810, the controller can generate a digital output representing the intensity of the light based on at least one of the first measurement output or the second measurement output. For example, if the first measurement operation is TTS and a time-to-saturation result is obtained, the controller can discard the second measurement output, but if the time-to-saturation result is not available (since the charge storage device is not saturated), the second measurement output can be provided to represent the light intensity. As another example, if the first measurement operation indicates that the charge storage device is not saturated within the first time, whereas the second measurement operation indicates that the charge storage device is saturated, the first measurement output can be provided to represent the light intensity. As yet another example, if both measurement outputs indicate no saturation, the digital output can be generated based on the first measurement output and the second measurement output. In all these cases, the first measurement output and the second measurement output can be scaled up based on, respectively, the ratio between the exposure period and the first time, and the ratio between the exposure period and the second time, to extrapolate the quantity of overflow charge the charge storage device would have accumulated at the end of the exposure period. The digital output can then be generated based on the extrapolated first/second measurement outputs.

As explained above, in a case where both the first and second quantization operations are linear quantization operations, the starting points of the first time and the second time (e.g., $T_B$ and $T_A$ in FIG. 15B) can be determined based on, for example, the duration of the exposure period $T_{EXP}$, the full well capacity of the photodiode, the capacity of the capacitor of the charge sensing unit, a range of intensities to be measured within the exposure period, and a target SNR of the image sensor, as described above with respect to FIG. 15C and FIG. 15D. Moreover, in a case where the first quantization operation is a TTS operation, the duration of the first time can be set based on various criteria, such as power consumption, target SNR of the image sensor, and For example, the duration can be set based on a target power, and a range of intensities to be measured within the exposure period, as described above with respect to FIG. 16D.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer-readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus comprising:
    a photodiode configured to generate a charge in response to light within an exposure period and to accumulate at least a first part of the charge as a residual charge;
    a charge sensing unit configured to accumulate at least a second part of the charge as an overflow charge;
    a quantizer; and
    a controller configured to:
        within a first time within the exposure period, control the quantizer to perform a first quantization operation to quantize the overflow charge accumulated at the charge sensing unit to generate a first measurement output, the first quantization operation comprising comparing a first voltage representing a first quantity of the overflow charge with a ramping threshold voltage to determine a third time when the ramping threshold voltage becomes equal to the first voltage and generating the first measurement output based on the third time;
        within a second time after the first time, and within the exposure period, control the quantizer to perform a second quantization operation to quantize the overflow charge accumulated at the charge sensing unit to generate a second measurement output, the second quantization operation comprises comparing a second voltage representing a second quantity of the overflow charge with the ramping threshold voltage to determine a fourth time when the ramping threshold voltage becomes equal to the second voltage and generating the second measurement output based on the fourth time;

determine which of the first or second measurement output to use to generate a digital output, and
generate a digital output to represent an intensity of the light based on the determined one of the first measurement output or the second measurement output.

2. The apparatus of claim 1, further comprising a sample-and-hold circuit selectively coupled between the charge sensing unit and the quantizer;
wherein the controller is configured to:
control the sample-and-hold circuit to couple with the charge sensing unit to sample a voltage output by the charge sensing unit;
at the beginning of the first time, control the sample-and-hold circuit to disconnect from the charge sensing unit to hold the sampled voltage as the first voltage, and control the quantizer to quantize the first voltage when the sample-and-hold circuit is disconnected from the charge sensing unit;
control the sample-and-hold circuit to couple with the charge sensing unit to sample a voltage output by the charge sensing unit; and
at the beginning of the second time, control the sample-and-hold circuit to disconnect from the charge sensing unit to hold the sampled voltage as the second voltage, and control the quantizer to quantize the second voltage when the sample-and-hold circuit is disconnected from the charge sensing unit.

3. The apparatus of claim 1, wherein the controller is configured to:
determine that the second quantity of the overflow charge reaches a saturation threshold of the charge sensing unit; and
generate the digital output based on the first measurement output but not the second measurement output.

4. The apparatus of claim 1, wherein the beginning of the first time and the beginning of the second time are determined based on a duration of the exposure period, a full well capacity of the photodiode, a capacity of the charge sensing unit, a range of intensities to be measured by the first quantization operation and by the second quantization operation, and a target signal-to-noise ratio.

5. The apparatus of claim 4, wherein the beginning of the first time and the beginning of the second time are determined based on an intensity of the light that causes a total quantity of the overflow charge accumulated within the exposure period to reach a saturation threshold.

6. The apparatus of claim 1, wherein the controller is configured to:
generate a first scaled measurement output based on scaling the first measurement output by a ratio between a duration of the exposure period and the first time;
generate a second scaled measurement output based on scaling the second measurement output by a ratio between the duration of the exposure period and the second time; and
generate the digital output based on at least one of the first scaled measurement output or the second scaled measurement output.

7. The apparatus of claim 1, wherein the digital output is a first digital output;
wherein the controller is configured to, after the exposure period:
control the quantizer to measure at least one of: a total quantity of the residual charge accumulated within the exposure period, or a total quantity of the overflow charge accumulated within the exposure period, to generate a second digital output; and
provide one of the first digital output or the second digital output to represent the intensity of the light.

8. The apparatus of claim 1, wherein:
the photodiode is a first photodiode configured to detect a first frequency component of the light;
the charge sensing unit is a first charge sensing unit;
the charge is a first charge;
the overflow charge is a first overflow charge;
the residual charge is a first residual charge;
the exposure period is a first exposure period;
the digital output is a first digital output to represent the intensity of the first frequency component;
the apparatus further comprises:
a second photodiode configured to generate a second charge in response to a second frequency component of the light within a second exposure period and to accumulate at least a first part of the second charge as a second residual charge; and
a second charge sensing unit configured to accumulate at least a second part of the second charge as a second overflow charge within the second exposure period;
the controller is configured to:
within a third time within the second exposure period, control the quantizer to quantize the second overflow charge accumulated at the second charge sensing unit to generate a third measurement output;
within a fourth time after the third time within the second exposure period, control the quantizer to quantize the second overflow charge accumulated at the second charge sensing unit to generate a fourth measurement output; and
generate a second digital output based on at least one of the third measurement output or the fourth measurement output; and
a first start time of the second exposure period is delayed from a second start time of the second exposure period by a start offset, the start offset being based on a total duration of the first quantization operation and the second quantization operation.

9. The apparatus of claim 8, wherein the controller is configured to:
after the first exposure period ends, control the quantizer to measure at least one of:
a total quantity of the first residual charge accumulated within the first exposure period, or a total quantity of the first overflow charge accumulated within the first exposure period, to generate a third digital output; and
after the second exposure period ends, control the quantizer to measure at least one of: a total quantity of the second residual charge accumulated within the second exposure period, or a total quantity of the second overflow charge accumulated within the second exposure period, to generate a fourth digital output.

10. The apparatus of claim 9, wherein the third digital output is generated before the fourth digital output;
wherein the second exposure period ends after the first exposure period ends; and
wherein the first exposure period and the second exposure period have the same duration.

11. The apparatus of claim 9, wherein the third digital output is generated after the fourth digital output;
wherein the second exposure period ends before the first exposure period ends; and
wherein the first exposure period is center-aligned with the second exposure period.

12. The apparatus of claim 1, wherein the quantizer comprises:
an inverter;
a first capacitor and a second capacitor, a right plate of each of the first capacitor and the second capacitor being coupled with an input of the inverter; and
a switchable feedback path coupled between the input and an output of the inverter; and
wherein the controller is configured to:
during a reset phase:
couple a left plate of each of the first capacitor and the second capacitor with a reset voltage, and
enable the feedback path to couple the input with the output of the inverter; and
during a comparison phase:
couple the left plate of the first capacitor with an output of the charge sensing unit,
couple the left plate of the second capacitor with a reference voltage, and
disable the feedback path.

13. The apparatus of claim 12, wherein the feedback path comprises one or more diodes.

14. The apparatus of claim 1, further comprising a memory to store the digital output; and
wherein the memory receives first signals having a first voltage swing during a write operation to store the digital output; and
wherein the memory outputs second signals having a second voltage swing during a read operation for the digital output; and
wherein the first voltage swing is smaller than the second voltage swing.

15. A method comprising:
enabling a photodiode to generate a charge in response to light within an exposure period and to accumulate at least a first part of the charge as a residual charge;
enabling a charge sensing unit to accumulate at least a second part of the charge as an overflow charge;
within a first time within the exposure period, controlling a quantizer to perform a first quantization operation to quantize the overflow charge accumulated at the charge sensing unit to generate a first measurement output, the first quantization operation comprising comparing a first voltage representing a first quantity of the overflow charge with a ramping threshold voltage to determine a third time when the ramping threshold voltage becomes equal to the first voltage and generating the first measurement output based on the third time;
within a second time after the first time ends, and within the exposure period, controlling the quantizer to perform a second quantization operation to quantize the overflow charge accumulated at the charge sensing unit to generate a second measurement output, the second quantization operation comprises comparing a second voltage representing a second quantity of the overflow charge with the ramping threshold voltage to determine a fourth time when the ramping threshold voltage becomes equal to the second voltage and generating the second measurement output based on the fourth time;
determining which of the first or second measurement output to use to generate a digital output, and
in response to the determination, generating a digital output representing an intensity of the light based on the determined one of the first measurement output or the second measurement output.

\* \* \* \* \*